US012739656B1

(12) United States Patent
Billman et al.

(10) Patent No.: US 12,739,656 B1
(45) Date of Patent: Sep. 15, 2026

(54) NETWORK ACTIVITY MAPPING AND POST-DISASTER AD-HOC NETWORKING USING DRONES

(71) Applicant: UIPCO, LLC, San Antonio, TX (US)

(72) Inventors: Bradly Jay Billman, Celina, TX (US); Dwayne Phillip Wilson, Crossroads, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 243 days.

(21) Appl. No.: 18/621,334

(22) Filed: Mar. 29, 2024

Related U.S. Application Data

(60) Provisional application No. 63/594,516, filed on Oct. 31, 2023.

(51) Int. Cl.
*H04W 16/18* (2009.01)
*H04W 4/90* (2018.01)
*H04W 84/06* (2009.01)
*H04W 84/18* (2009.01)

(52) U.S. Cl.
CPC ............. *H04W 16/18* (2013.01); *H04W 4/90* (2018.02); *H04W 84/06* (2013.01); *H04W 84/18* (2013.01)

(58) Field of Classification Search
CPC .. B64F 1/007; B64F 1/20; B64F 1/222; B64C 39/024; H04W 4/90; H04W 76/50; H04W 4/70; H04W 4/029; H04W 92/24; H04W 4/40; H04L 67/12; H04B 7/18584; H04B 7/18504; H02J 50/10; H02J 50/005; G08G 5/045; G08G 5/0043; G08G 5/0013
USPC ........................................................ 455/404.1
See application file for complete search history.

(56) References Cited

U.S. PATENT DOCUMENTS

| | | | |
|---|---|---|---|
| 9,622,277 | B1 | 4/2017 | Sun |
| 9,654,200 | B2 | 5/2017 | Mazzarella |
| 9,665,094 | B1 | 5/2017 | Russell |
| 9,826,415 | B1 | 11/2017 | Byme |
| 9,836,049 | B1 | 12/2017 | Tu |
| 9,848,419 | B2 | 12/2017 | Gong |
| 10,003,397 | B2 | 6/2018 | Mazzarella |

(Continued)

FOREIGN PATENT DOCUMENTS

| | | | |
|---|---|---|---|
| EP | 3327953 | A1 | 5/2018 |
| WO | 2016064700 | A2 | 4/2016 |
| WO | 2023047177 | A1 | 3/2023 |

OTHER PUBLICATIONS

Non-Final Office Action mailed Aug. 11, 2025 for U.S. Appl. No. 18/621,459.

(Continued)

*Primary Examiner* — Maria El-Zoobi
(74) *Attorney, Agent, or Firm* — Plumsea Law Group, LLC

(57) ABSTRACT

A method and system for calculating network activity patterns in a region prior to a disaster, and forming ad-hoc networks based on these patterns. The system and method are configured to perform aerial surveys of different areas prior to an outage. After an outage occurs, the system can automatically generate a deployment configuration for a set of drones that will create an ad-hoc network. The ad-hoc network can be formed as either a mesh network where there are sufficient drones available, or a messenger network, where there are an insufficient number of drones available to form the mesh network.

20 Claims, 32 Drawing Sheets

(56) References Cited

U.S. PATENT DOCUMENTS 10,029,788 B2 7/2018 Abeles
10,200,879 B2 2/2019 Byme
10,630,376 B2 4/2020 Mazzarella
10,764,763 B2 9/2020 Byme
10,793,269 B2 10/2020 Abeles
11,064,363 B2 7/2021 Fox
11,134,380 B2 9/2021 Fox
11,356,172 B2 6/2022 Chai
11,807,361 B2 11/2023 Abeles
11,891,192 B2 2/2024 Tian
11,902,342 B2 2/2024 Mills
11,923,954 B1 3/2024 Nagelberg
12,145,753 B2 11/2024 Bitar
12,174,030 B1 12/2024 Billman
12,436,543 B2 10/2025 McLaughlin
2015/0063202 A1 3/2015 Mazzarella
2015/0379874 A1 12/2015 Ubhi
2016/0028471 A1 1/2016 Boss
2016/0046387 A1 2/2016 Frolov
2016/0111006 A1 4/2016 Srivastava
2016/0204978 A1* 7/2016 Anderson .......... H04B 7/18506 370/225
2016/0253908 A1 9/2016 Chambers
2016/0275801 A1 9/2016 Kopardekar
2017/0069214 A1 3/2017 Dupray
2017/0092109 A1* 3/2017 Trundle .................. B60L 53/36
2017/0111228 A1 4/2017 Obaidi
2017/0181158 A1 6/2017 Gong
2017/0238129 A1* 8/2017 Maier ..................... H04W 4/14 455/404.2
2017/0250749 A1 8/2017 Mazzarella
2018/0002017 A1 1/2018 Abeles
2018/0103036 A1 4/2018 Fox
2018/0160316 A1 6/2018 Byme
2018/0309504 A1 10/2018 Mazzarella
2019/0035285 A1 1/2019 Priest
2019/0047701 A1 2/2019 Winkle
2019/0135430 A1 5/2019 Abeles
2019/0159037 A1 5/2019 Byme
2019/0247924 A1 8/2019 Guo
2019/0347924 A1 11/2019 Trundle
2020/0008059 A1 1/2020 Fox
2020/0322038 A1 10/2020 Mills
2020/0346751 A1* 11/2020 Horelik .................. B64U 10/13
2020/0349852 A1* 11/2020 DiCosola ................. G08G 5/55
2021/0070440 A1 3/2021 Abeles
2021/0092604 A1 3/2021 Fox
2021/0403158 A1 12/2021 Jeong
2022/0103246 A1* 3/2022 Chai .................. H04B 7/18504
2022/0361002 A1 11/2022 Bhaduri
2022/0377519 A1* 11/2022 Lei ........................ H04W 4/029
2023/0273283 A1* 8/2023 Kurras .................... G01S 1/024 455/456.1
2023/0409054 A1 12/2023 Bradley
2024/0040463 A1* 2/2024 Haustein ............... H04W 36/30
2024/0176366 A1 5/2024 Mclaughlin
2024/0259444 A1 8/2024 Mills
2024/0281002 A1 8/2024 Joshi
2025/0097796 A1 3/2025 Vivanco
2026/0010173 A1 1/2026 Mclaughlin

OTHER PUBLICATIONS

Selim, Mohamed, et al., Post-disaster 4G/5G Network Rehabilitation using Drones: Solving Battery and Backhaul Issues, 2018, IEEE Globecom Workshops, Iowa State University, Iowa State, USA, Email: {myoussef, kamal}@iastate.edu (2018).
WO2023047177A1 Google Machine Translation 2021.
Non-Final Office Action mailed Dec. 23, 2025 for U.S. Appl. No. 18/621,440.
Office Action mailed Mar. 6, 2026 for U.S. Appl. No. 18/621,378.
Notice of Allowance mailed Apr. 7, 2026 for U.S. Appl. No. 18/621,440.
Office Action mailed Mar. 5, 2026 for U.S. Appl. No. 18/621,367.
Office Action mailed Feb. 17, 2026 for U.S. Appl. No. 18/621,459.
Samer, Light-Weight Wireless Power Transfer for Mid-Air Charging of Drones 2017 11th European Conference on Antennas and Propagation (EUCAP (Year: 2017).
Autonomous Recharging and Flight Mission Planning for Battery-Operated Autonomous Drones 1034 IEEE Transactions on Automation Science and Engineering, vol. 20, No. 2, Apr. 2023 (Year: 2023).

* cited by examiner

T1
3050
3060
H1
T2
3054
3052
3070
3030
3000

NETWORK ACTIVITY MAPPING AND POST-DISASTER AD-HOC NETWORKING USING DRONES

CROSS-REFERENCE TO RELATED APPLICATION

This application claims the benefit of U.S. Provisional Patent Application Ser. No. 63/594,516 filed on Oct. 31, 2023 and titled "NETWORK ACTIVITY MAPPING AND POST-DISASTER AD-HOC NETWORKING USING DRONES", the disclosure of which is incorporated by reference herein in its entirety.

TECHNICAL FIELD

The present disclosure generally relates to methods and systems for improving network connectivity in low signal regions, and specifically to deployment of unmanned aerial vehicles (UAVs) that can be dynamically distributed to extend a network signal to disaster-impacted regions or otherwise remote or low-signal areas.

BACKGROUND

Following disasters such as floods, hurricanes, fires, and tornadoes, communication with persons on the ground can become vital. In a hazardous environment, tracking and remaining in contact with emergency personnel is critical, yet has remained challenging. This is in part due to the reliance on infrastructure that can become damaged following environmental or other large-scale disasters. Once a network base station is disabled, the ability of family and friends to reach one another, as well as call for help, is significantly impacted.

There is a need in the art for a system and method that addresses the shortcomings discussed above.

SUMMARY

In one aspect, a method of creating a custom deployment strategy for one or more unmanned aerial vehicles (UAVs) to form an ad-hoc network is disclosed. The method includes a first step of generating, by a drone communications system and in response to a prediction that a network outage will occur in a first region, instructions to conduct a network activity survey of the first region. A second step includes deploying, via a UAV repository and in response to the instructions, a first UAV to perform a first flyover of the first region, the first UAV including onboard sensors that collect a first dataset describing one or more of cell tower locations, wireless access points, and wireless network usage patterns in the first region. In addition, a third step includes receiving, at the drone communications system, the first dataset, and a fourth step includes receiving, at the drone communications system, inventory data from the UAV repository. Furthermore, a fifth step includes creating, based on the first dataset and the inventory data, a deployment strategy that identifies a configuration of the UAVs currently available in the UAV repository that can provide emergency communication services to either the greatest number of devices located in the first region or the largest area in the first region.

In another aspect, a method of creating a custom deployment strategy for one or more unmanned aerial vehicles (UAVs) to form an ad-hoc network is disclosed. The method includes a first step of receiving, at a drone communications system, a first dataset including an environmental disaster forecast, and a second step of predicting, at the drone communications system and based on the first dataset, there is a high likelihood of an impending disaster event impacting the first region that will cause a network outage. The method also includes a third step of receiving, at the drone communications system, near-real-time operational data from a cellular network service provider for one or more cell towers in the first region, and a fourth step of receiving, at the drone communications system, inventory data from a UAV repository. In addition, the method includes a fifth step of creating, based on the operational data and the inventory data, a deployment strategy that identifies a configuration of the UAVs currently available in the UAV repository that can provide emergency communication services to either the greatest number of devices located in the first region or the largest area in the first region.

In another aspect, a system for creating a custom deployment strategy for one or more unmanned aerial vehicles (UAVs) to form an ad-hoc network includes a processor and machine-readable media including instructions which, when executed by the processor, cause the processor to: (1) generate, by a drone communications system and in response to a prediction that a network outage will occur in a first region, instructions to conduct a network activity survey of the first region; (2) deploy, via a UAV repository and in response to the instructions, a first UAV to perform a first flyover of the first region, the first UAV including onboard sensors that collect a first dataset describing one or more of cell tower locations, wireless access points, and wireless network usage patterns in the first region; (3) receive, at the drone communications system, the first dataset; (4) receive, at the drone communications system, inventory data from the UAV repository; and (5) create, based on the first dataset and the inventory data, a deployment strategy that identifies a configuration of the UAVs currently available in the UAV repository that can provide emergency communication services to either the greatest number of devices located in the first region or the largest area in the first region.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments describe a system and method for providing network connectivity to poor or no signal areas. Such areas can include regions that are too distant from network base stations to establish a connection, have environmental features that block signals, or have been impacted by a disaster that has damaged the existing base stations. The system includes an aerial drone network that operates autonomously and independently to create a network of drones that can communicate with a working cell tower. In some embodiments, the system supports the passing of messages between drones and residents. In different embodiments, the proposed systems can include one or more drones (also referred to herein as UAVs) with communication being distributed across the cloud, a server, other drones, and/or in a peer-to-peer distributed drone network.

In some embodiments, a group of drones can be deployed in a pre-selected arrangement and act as communication relay devices for an ad-hoc mesh network. These drone-based relay devices are positioned at different locations in an area with little to no connectivity, extending a signal from an operational cell tower to the residents in the impacted outage region. This allows for the provisioning of emergency connectivity between an external signal source (such as a cellular tower, also referred to herein as a base station) and communication devices used by residents within the no-signal area. In one embodiment, the relay devices—also referred to herein as communication drones—are configured to detect signal strength between the closest relay device(s) in the network and automatically determine a relay device should be employed to ensure the relay device is still within range of other relay devices (but also not too close to maintain efficiency).

Figure 1:
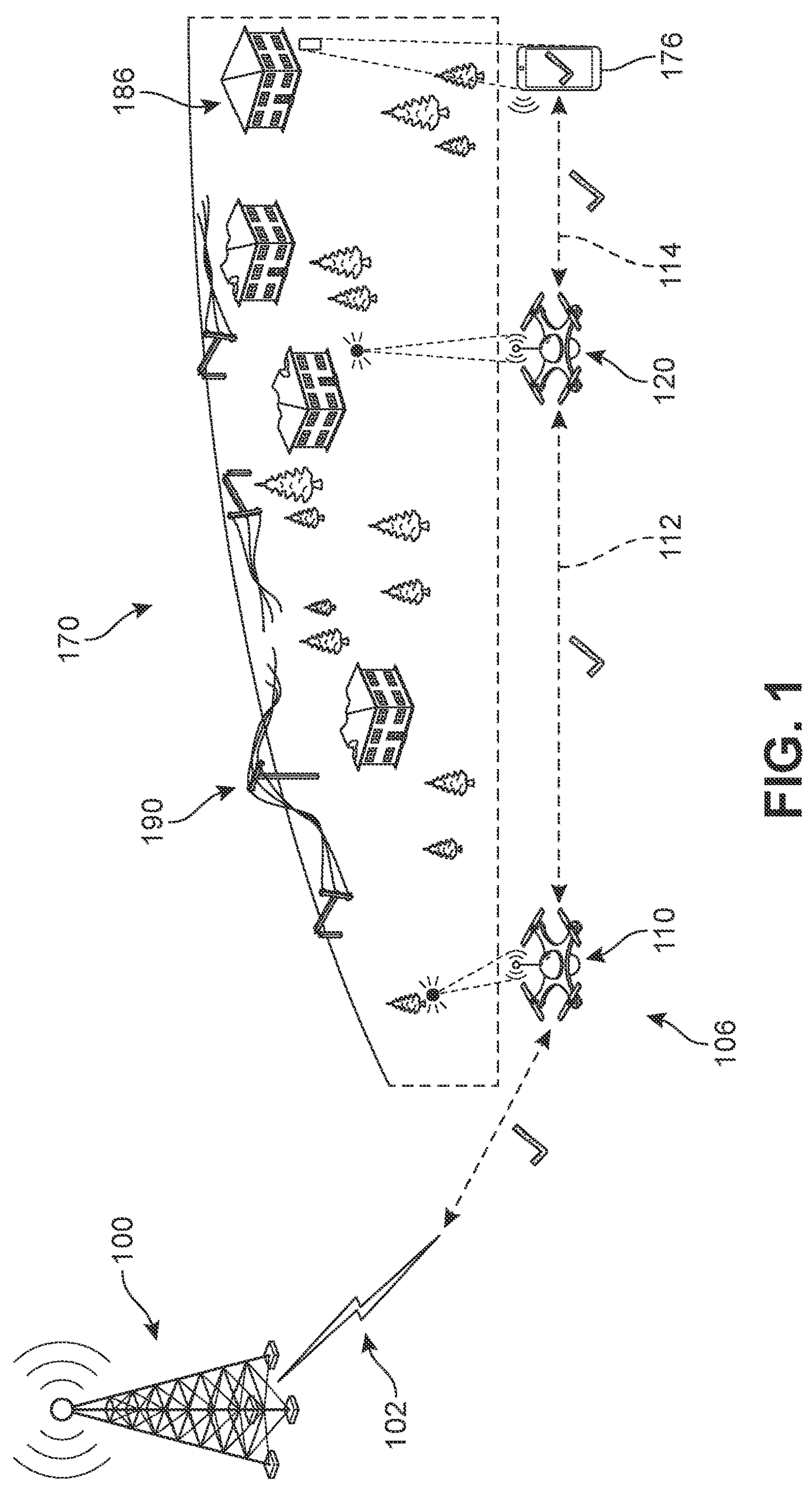
FIG. 1 depicts an overview of a scenario in which an environmental disaster occurs in a region and there is deployment of a drone-based ad-hoc mesh network to relay a network signal to the region, according to an embodiment.

For purposes of clarity, an overview of one embodiment of the proposed systems and methods is illustrated with reference to FIG. 1. In FIG. 1, an example of an implementation of the proposed system is shown as executed via a first set of drone relay devices ("first set") 106 that includes at least two communication drones. For purposes of illustration, only a first drone 110 and a second drone 120 are depicted in this drawing. The first drone 110 has been positioned within communication range of a base tower 100, and a connection 102 has been established. The second drone 120 has been positioned further away from, and out of range of, the base tower 100. The second drone 120 is activated and a signal from the base tower 100 is transmitted along a first relayed connection 112 to the second drone 120 (via the bridge, first drone 110). Away from the base tower 100, there are multiple homes 186 in a residential area 170 that has been recently impacted by a tornado or other natural disaster. As a result, power lines and telecommunications 190 have been damaged and are currently down. Without the relayed signal to second drone 120, any mobile devices in homes 186 would be unable to transmit/receive data. For example, a first mobile device 176 would have no signal without a second relayed connection 114 extending from the second drone 120 to the first mobile device 176. Thus, for the user of first mobile device 176, a communication signal is available at or around the same strength as when the user's mobile devices had connected to the area's local network when it was operational. The persons located in residential area 170 can thereby reach loved ones and other outside resources via a reliable and dynamic communication 'lifeline'.

Figure 2:
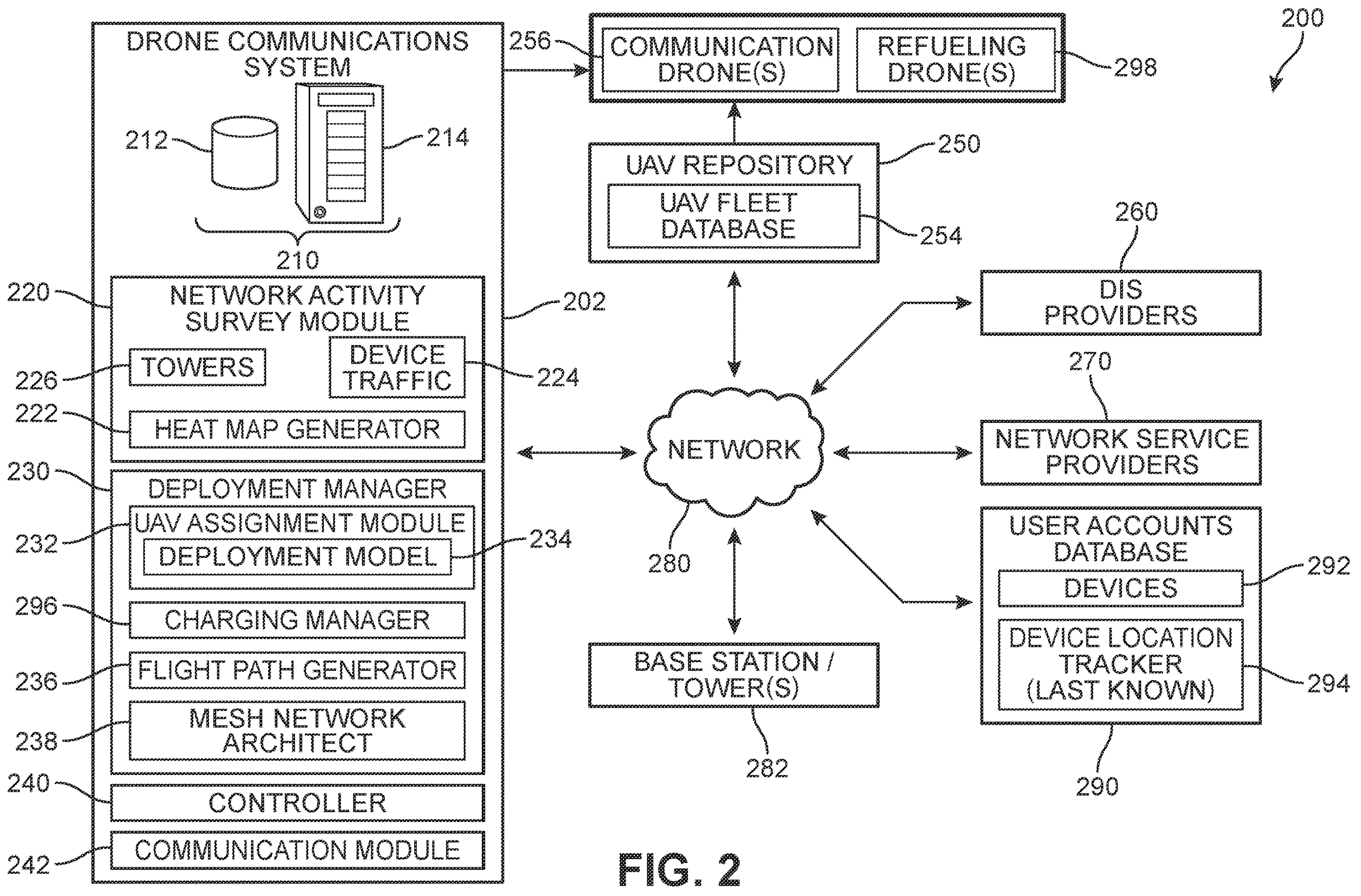
FIGS. 2 and 3 are schematic diagrams of an environment in which a drone communications system may be implemented, according to an embodiment.

FIG. 2 depicts a schematic view of an embodiment of a drone communications management environment 200 by which the proposed embodiments may be implemented. The environment 200 can be seen to include a drone communications system 202, which can include or be in communication over a network 280 with one or more of an UAV repository 250, disaster information service providers 260, a member/user accounts database 290, and base tower service providers 270.

In different embodiments, both drone communications system 202 and UAV repository 250 can include communication components (e.g., communication module 242). For example, these communication systems enable information to be transmitted between drone communications system 202 and other components of the environment 200 via network 280. Thus, the type of communication components used in each communication system can be selected according to the type of network used. In some cases, a cellular or satellite network could be used so that each communication system includes a cellular radio or other component that enables cellular communication. In other cases, network 280 could comprise any kind of local area network and/or wide area network and/or ad-hoc point-to-point or multi-casting networks. In some cases, network 280 may be a Wi-Fi and/or Bluetooth network. One or more components of drone communications system 202 could be disposed within a single computing device. Examples of computing devices that could be used include, but are not limited to: laptop computers, tablet computers, smartphones or other computing devices.

In different embodiments, drone communications system 202 includes provisions for gathering information about areas that are protected by their services, as well as data predicting network demand following a disaster that can be used to facilitate service to potential network outages in the disaster-impacted area. The drone communications system 202 may also include provisions for communicating with various other systems. In different embodiments, some of the steps may be performed by ground-based computing system(s) (e.g., drone communications system 202) and some of the steps may be performed by computing systems and components associated with the UAV repository 250, which can include or have access to modules of the drone communications system 202 and vice-versa.

As seen in FIG. 2, drone communications system 202 comprises a computing system 210. Computing system 210 can include, for example, a computer 212 and a database 214. Computer 212 may further include one or more processors and memory. Computer 212 could be any kind of computer such as a desktop computer, a laptop computer, a server, or any other kind of computer with sufficient computing resources for performing tasks such as those described herein.

In different embodiments, drone communications system 202 may also include a network activity survey module 220, which further includes a heat map generator 222. Heat map generator 222 can receive sensor data (e.g., cell tower operational data provided by tower service providers 270, member devices 292, and/or device traffic data 224). Thus, in some embodiments, the network activity survey module 220 includes provisions for analyzing received data and identifying the general patterns of network usage in some specified zone, and predicting the minimum network load/demands that would be expected in that zone following a disaster event and outage. This information can in some cases be represented via a heat map or other visual characterization of network usage across that zone. In one example, the information outputted by the heat map generator 222 or other output of the network activity survey module 220 can be used by a deployment manager 230 to determine the type of drone support required to sustain communications to the population in an impacted area.

Figure 5:
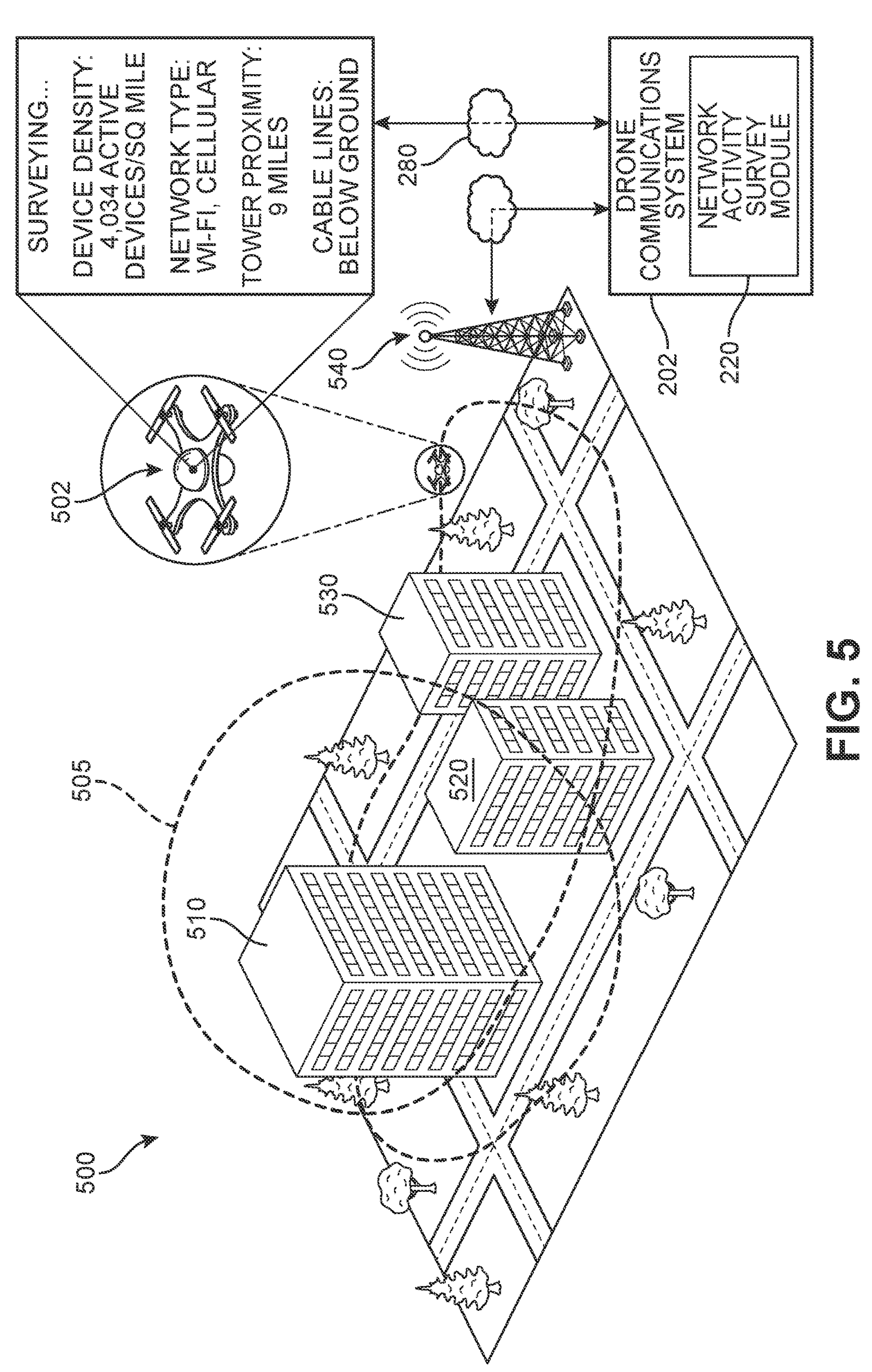
FIG. 5 illustrates a drone performing a flyover to collect network activity-related sensor data, according to an embodiment.

As a general matter, the sensor datasets (e.g., device traffic data 224) can be obtained from aerial flights performed prior to the outage event. For example, as described in FIG. 5 below, in some embodiments, data can be collected during manned or other unmanned aviation fly-bys over the target location to build a better localized report of network activity. This can include population density detection by some type of sensor suite including surface and airborne observations, radar, lightning, satellite imagery, and profilers. In some embodiments, the aerial sensors can include radiation sensors. As a general matter, when devices connect using mobile or landline data, the core datum is what is called a network event. A network event indicates when a computing device has connected to an antenna from the mobile network or other network. Available connections include calls, text and multimedia messages, as well as Internet events. The regularity of these events may differ. Thus, based on those events, it is possible to build spatio-temporal trajectories based on the transitions between antenna connections performed by mobile devices.

In different embodiments, the heat map generator 222 can estimate network events and identify how much load a broadcast signal is experiencing. For example, radiation patterns can be used to better understand how each network access point broadcasts a wireless signal. These antenna activity patterns are reciprocal, in that the transmit-power (the capability of the access point to 'speak') will be highest at the peaks, and so will the receive-sensitivity (the capability of the access point to 'hear'). Thus, the heat maps or radiation plots that are generated for a target area can serve as a general guide to identify where most of the energy (and receive sensitivity) of the wireless activity/coverage is occurring.

In some embodiments, the network activity survey module 220 can receive data describing the patterns of network demand, load, and usage in a target region. The data can alternatively or also include real-time network usage data as well historical network usage data provided from the tower service providers 270 that can be used to more precisely characterize the day-to-day device load on the network for a given area. In addition, in some embodiments, the drone communications system 202 can be in communication with registered user devices 292 in different regions, with device identifying information and device location data 294 stored in the user accounts database 290. The device location data 294 can be used to determine the number of members in an area that later experiences an outage, which can also be considered by the deployment manager 230 as a factor when assigning drones to the impacted area.

In different embodiments, these data can be then further processed by the network activity survey module 220 to determine centroids for the network activity. For example, a heat map or other a data visualization technique may be generated that shows magnitude of network activity assessed as color in two dimensions. The variation in color may be by hue or intensity, giving obvious visual cues about how the activity is clustered or varies over space. Such representations offer end-users a mechanism by which to visualize complex data and understand it at a glance. In other words, the system assigns different activity values or ranking and presents this information in an easily consumable format similar to infrared or heat maps, where the hue or intensity is more pronounced toward the portion of the structure where the activity was greatest. In another example, the pixel information from an image may be used to create a network activity intensity plane that depicts an indication of intensity of activity across a selected area.

In still other embodiments, a deep learning model can be used to estimate network activity across different portions of the region based on the collected drone sensor data and/or output of the "heat map" of probable network activity/load at different portions of the region. In other words, in different embodiments, aerial imagery may be analyzed to determine if a region has near-zero/low/moderate/heavy network usage patterns. In some embodiments, traditional visual spectrum images can be enhanced using contrast, such as black and white lines, and/or specialty lighting (illuminator) employed by the drone. In addition, the drone can include a wide range of onboard sensors (e.g., radar, sonar, FLIR) that can capture data that can be used independently or in concert with visual images. Such consolidation of data can improve the visualization of network activity in the data. Thus, in different embodiments, each drone can carry image sensors as well as multi-spectral or multi-sensor devices, which can collect data that will better train the model described herein. In some embodiments, the model can be used to identify or estimate the approximate number of computing devices, residents, and network load.

In some embodiments, satellite imagery can be input to a deep learning network activity detection model in order to generate bounded regions in which the varying load levels of network activity are located. The high-resolution imagery is then further processed to determine centroids for the activity/population and the probable extent of the activity as it radiates outward from the centroid. In other words, the system can assign different network demand values or ranking and presents this information in an easily consumable format similar to infrared or heat maps, where the hue or intensity is more pronounced toward the zones where the activity is greatest.

In different embodiments, the network activity survey module 220 includes machine vision algorithms may be applied to identify an object in the digital image. In some embodiments, the network activity survey module 220 may include computer vision algorithms such as image analysis algorithms that may use a feature detector or a combination of detectors. For example, a texture detector and edge detector may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. The images can be analyzed to identify each cellular tower or other base station in the region to help determine network patterns.

In different embodiments, drone communications system 202 may also include a deployment manager 230. Deployment manager 230 may include any program or algorithm that is used to determine what grouping or assortment of UAVs ("UAV party") for use at one or more specified target locations would be appropriate and accommodate the needs of that area based on the parameters identified by the network activity survey module 220. In some embodiments, the deployment manager 230 includes an unmanned aerial vehicle (UAV) assignment module 232 that can automatically determine an optimal unmanned aerial vehicle (UAV) configuration for emergency network coverage missions and generating instructions for the dispatch of drones in the assigned configuration to a designated area, for example, after a disaster such as a hurricane, fire, tornado or flood. In some embodiments, a deployment model 234 can evaluate the values of various dynamic parameters in order to output a custom deployment strategy, as will be discussed in FIG. 3 below. In some embodiments, the deployment strategy also takes into account the capacity and location of all nearest working base station/tower(s) 282 in the region, which can significantly affect how the drones should be arranged over the impacted region and/or the path each drone will traverse.

In different embodiments, the strategy can include one or both of what will be referred to herein as a shuttle messenger network (or "carrier pigeon network"), and a mesh network. Each type of network will be discussed in greater detail below. As a general matter, the messenger network can be employed in cases where there are too few drones to provide the impacted area with a mesh network. In contrast to the relatively stable positioning of drones in a mesh network, a messenger network includes drones that perform multiple 'hops' between one waypoint and another. In cases where the strategy depends on a messenger network, a flight plan and path generator 236 can, based on the strategy provided by the deployment manager 230, create one or more individual flight plans and paths, where each flight path details the navigation of one drone that can shuttle data to/from a base station and distribute the data to the recipients within signal range of the flight path. In some embodiments, the flight path identifies the set of waypoints that a given drone will canvass, where each waypoint represents a data exchange/transfer station for residents in and around that waypoint before returning to an operational network base station (e.g., cell tower).

In cases where the strategy depends on a mesh network, such as in a region encompassing an area for which there are a sufficient number of drones available to spread across the area and provide adequate network coverage, a mesh network architect module 238 can, based on the strategy provided by the deployment manager 230, generate a graph or map that identifies the position each drone will assume to provide an optimal coverage zone to the impacted area. In some embodiments, a controller 240 receives the itinerary and communicates with the UAV fleet database 254 to update the UAV schedules and assignments for each communication drone 256 that it manages in its inventory. Once an UAV configuration has been assigned, the controller 240 can provide instructions to the selected UAVs via communication module 242 for individual drones to execute or for the drone party to distribute among its members.

Furthermore, in some embodiments, as will be discussed below with respect to FIGS. 28A-31, the drone communications system 202 can include provisions for mid-air, on-site, or remote refueling of the communications drones that have been deployed for purposes of ad-hoc networking. For example, in FIG. 2, a charging manager 296 can assess each deployed drone's battery levels at the time of dispatch and determine, based on the drone's battery type and previous battery usage history, an estimated time the battery level for a drone will fall below a pre-designated threshold. The charging manager 296 can then schedule, via the AV assignment module 232, the deployment of a charging or refueling drone 298 to a site near the drone at or around the time when that drone battery is predicted to fall below the threshold.

Figure 3:
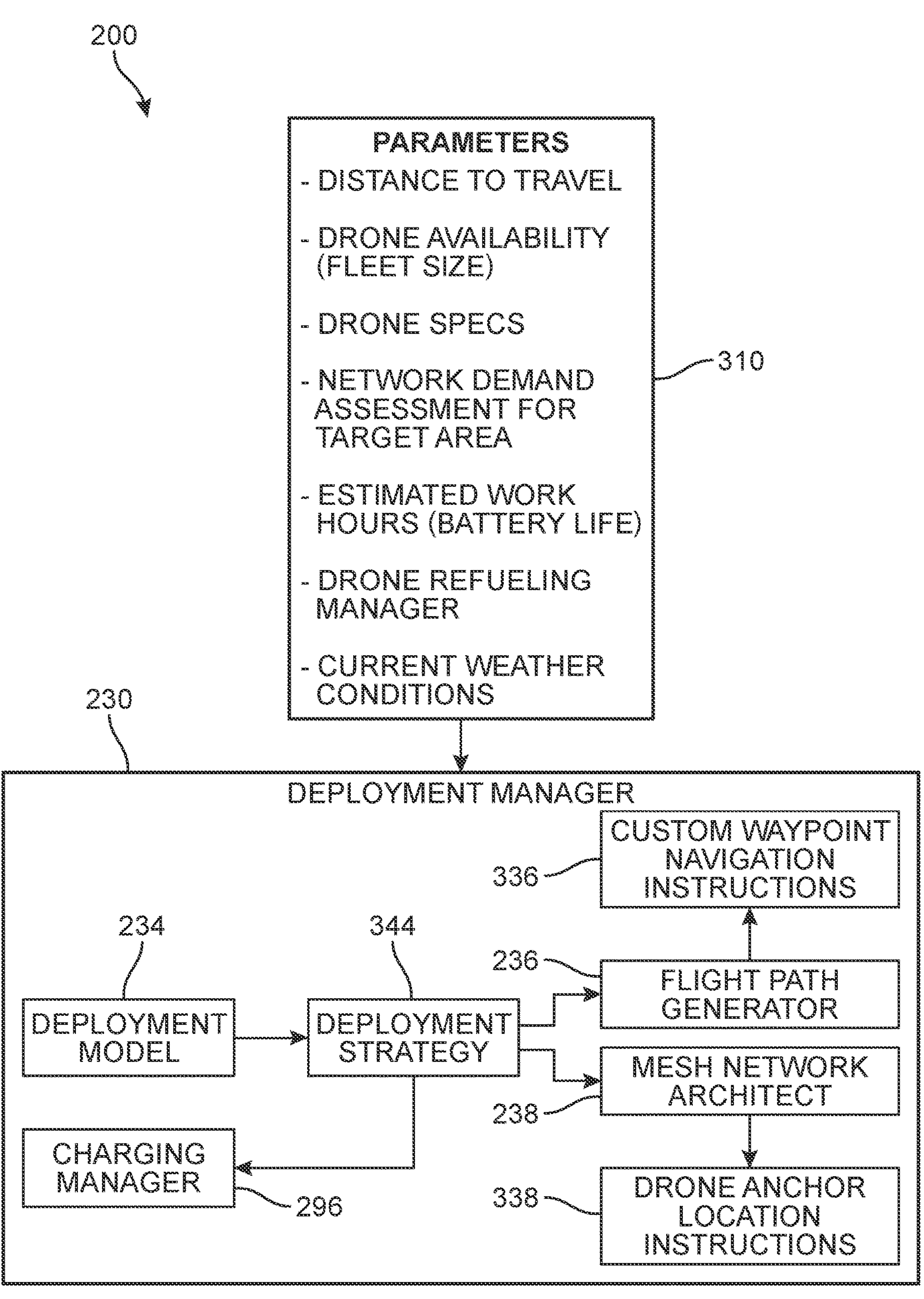

As one example, referring to FIG. 3, it can be seen that in different embodiments, the components of environment 200, including network activity survey module 220 can provide one or more parameters 310 that allow the deployment manager 230 to make intelligent recommendations and decisions regarding the arrangement, number, and make-up of the UAVs that are to be assigned to a given target. In different embodiments, the parameters 310 can include data that reflect or estimate values for parameters such as (a) distance to cover, which measures the traveling time and/or distance that must be covered by each UAV (and/or how much battery life is needed for a successful trip there and back again), including the square feet coverage indicating the amount of area that needs to be covered or traversed by the UAV after it arrives at its target position; (b) drone availability, such as how many drones are currently available in the drone repository and ready for flight, as well as time before dispatch indicating how long of a window of time is available before the UAVs must be deployed, which can be used to recharge UAVs that are not fully charged, or await the return of other UAVs from another location, thereby increasing the number of UAVs that are available for the upcoming deployment event; (c) drone specs (the type, model, capacity, and abilities of each individual drone that is available); (d) network demand assessment for target area, including what is the predicted network load for the impacted area that must be carried by the ad-hoc network; (e) estimated work hours indicating the amount of time that the UAVs would be expected to operate continuously at the target site before being replaced with a new drone or refueled; (g) drone refueling manager data, including the proximity of the refueling stations and refueling drones, how many are available, and how much fuel can be guaranteed for a particular duration; and (h) current weather conditions which can impact whether some less resilient drones can be deployed.

In another embodiment, the system can also consider the number of batteries in each UAV, battery chemistry, the amount of charge in the battery, etc. to help optimize response radii and maximize product time and return-to-waypoint times. For example, in some emergencies, there may be a goal of optimizing for no less than 10% charge and no greater than 90%, while in cases where the network outage is expected to affect a vulnerable population or an area with human casualties and/or more time sensitive emergencies, the system may identify a deployment strategy that puts the UAVs at risk of thermal runaway cascade, or other damage. Thus, the system can be configured to receive data regarding holistic energy charge/re-charge considerations relative to existing resource allocation, timing of disaster, etc., data which can then be used to optimize interventions.

In some embodiments, the deployment model 234 of the deployment manager 230 can receive these parameters 310 (including up-to-date information regarding current UAV inventory 254 for the UAV repository 250, as shown in FIG. 2) and used to define a custom deployment strategy 344 for the area that has been identified as experiencing an outage (i.e., a dead zone). In some embodiments, deployment model 234 includes a neural network or other machine learning model configured to receive these inputs and determine, with reference to established reference models for different regions, which configuration or distribution of UAVs would be most likely to fulfill the requirements and perform the needed network support of the target area. The deployment strategy 344 can specify the network type (i.e., either a messenger network type or mesh network type) that is best suited to the given circumstances and demand. The network type decision can determine whether the flight path generator 236 will then output custom waypoint navigation instructions 336 for transmission to the UAV repository (if the deployment strategy 344 selects the messenger network), or whether the mesh network architect 238 will then output drone anchor location instructions 338 for transmission to the UAV repository (if the deployment strategy 344 selects the mesh network).

In different embodiments, when a request for an ad-hoc network is received by the drone communications system 202 and a mesh network is identified as the feasible network type, the mesh network architect 238 can, with reference to navigation data for the impacted area, automatically identify a set of coordinates or general location tags as proposed drone sites ("drone node distribution") for a party of drones to form the mesh network. Similarly, in cases where a messenger network is designated, the flight path generator 236 can generate a sequence of waypoints for each drone that will be participating.

In some embodiments, the deployment model 234 will also assess the type of environment through which the signal must be deployed, such as mountainous, hilly, elevation, vegetation, flat, underground, forest, underwater, and other geographical features such as the local surface or terrain, landforms, buildings, and overall topography etc. when determining what type of network is better suited to the given scenario and which drones. Such information will be accessed from a regional topographic map that can be accessed by the deployment model 234. The deployment model 234 will typically provide an arrangement of drones that maximizes efficiency by relying on the least number of drones over the shortest distances between a base station and the target zone.

In some embodiments, the deployment strategy 344 can identify individual drones from the available drones that should be initially deployed to create the ad-hoc network, whether mesh or messenger. For example, in some embodiments, the UAV repository 250 includes one or more warehouses or mobile repositories that can store and manage a mixed assortment of UAV devices. In some embodiments, the drones can be launched from orbit or from an aerial glider or platform, or an in-ground or below-ground-based location. In different embodiments, the UAV repository 250 can receive instructions carried by deployment strategy 344 to release a specially selected UAV payload or party that includes drones that each include some operational feature or component to perform a required task in creation of the ad-hoc network.

In addition, as described in greater detail below, in some embodiments, the deployment manager 230 can include provisions for sustaining the drones that have been deployed to ensure an uninterrupted networking experience for residents in the area. For example, in FIG. 3, in some embodiments, the deployment strategy 344 can identify or estimate, for each drone assigned to the drone party, what its battery life/duration of operation will be based on the functions/tasks that it has been given to perform. In other words, two drones may have identical, full-charged batteries, but one of the drones may be assigned to travel a farther distance before reaching a hover point or a resting platform (node site) on a structure in a mesh network, while the second drone flies a much shorter distance before reaching its own node site in the mesh network. Thus, the first drone may be estimated to lose power much sooner than the second drone. The deployment strategy 344 can work with charging manager 296 to generate a charging schedule that can cause the automated deployment of one or more refueling drones to areas near the designated drone. The drone can then "dock" or otherwise connect to the refueling drone and refuel without leaving the mesh network. Similarly, where the communication drones are being dispatched to serve as carrier pigeons, each drone will at some point require a refueling. Rather than require the communication drone to return to their launching site (e.g., UAV repository), the deployment manager 230 can schedule deployment of a refueling drone to an area in close proximity (e.g., within one mile) to the communication drone at the time the battery level for the communication drone is estimated/predicted to fall below the threshold. In some embodiments, the communication drones can directly update the drone communications system their real-time battery levels via the ad-hoc network, and the drone communications system can then respond as needed (dynamically) with instructions to deploy a refueling drone when the drone's update indicates the battery's low threshold is approaching.

Figure 4:
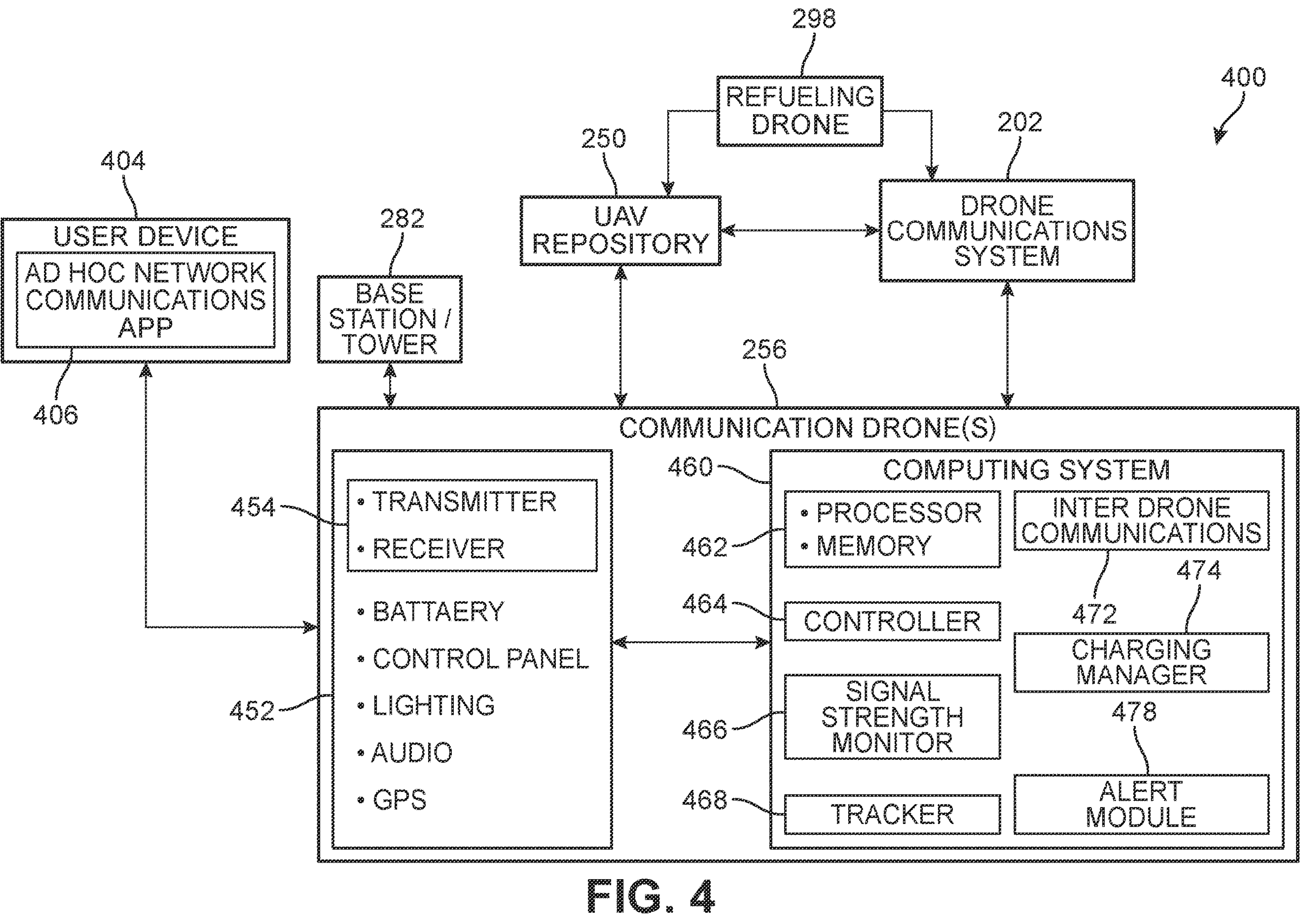
FIG. 4 is a schematic flow diagram showing an example process for deployment management, according to an embodiment.

In order to provide the reader with a greater appreciation of the embodiments, FIG. 4 depicts another view of environment 200 that provides expanded details regarding the communication drone(s) 256 and their interactions with other components and systems in environment 200. As noted above, the proposed embodiments disclose UAVs that are configured to communicate among each other, as well as with other networked devices such as cell towers and mobile phones. In different embodiments, each UAV can be interconnected over one or more networks as well as with a user mobile computing device 404 and (operational) base station 282. In some embodiments, such networks could include one or more Wide Area Networks (WANs), Wi-Fi networks, Bluetooth or other Personal Area Networks, NFC-based networks, cellular networks, as well as other kinds of networks. It may be appreciated that different devices could communicate using different networks and/or communication protocols. The UAVs can include onboard computing or smart devices, as well as simpler IoT devices, configured with a communications module 454 comprising a transmitter and receiver. The communication module 454 may include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. In some embodiments, the communication module 454 includes a radio signal receiver and transmitter. The radio signal receiver and transmitter can transmit radio signal information to other UAVs, user devices, cell towers, the UAV repository 250, and/or remote server where components of the drone communications system 202 can reside.

In many cases, the communication module is a wireless connection; however, wired connections may also be used. For example, the communication module may include a wired serial bus such as a universal serial bus or a parallel bus, among other connections. In addition, each communication drone 256 (UAV) can include provisions for communicating with, and processing information from, other nodes, network sources (such as base station 282), and user devices (such as user device 404). Each communication drone 256 may include an onboard computing system 460 comprising one or more processors and memory collectively computing components 462. Memory may comprise a non-transitory computer readable medium. Instructions stored within memory may be executed by the one or more processors. In addition, each communication drone 256 may include a communication system such as a radio or other provisions for communicating using one or more communication methods. In particular, communication system includes provisions for communicating with other nearby drones and/or user devices over networks. For example, each communication system could include a Wi-Fi radio, a Bluetooth radio, and/or a cellular network radio. Furthermore, instructions received from the UAV repository 250 and/or drone communications system 202 can be executed via controller 464.

In some embodiments, an end-user can interact with the proposed system, for example via a mobile ad hoc network communications application ("application" or "app") 406. In some embodiments, the application 406 can be downloaded to be accessible locally on the user device 404. The application 406 can offer a device registration and profile interface ("interface") for accessing and modifying settings for interacting with any available ad-hoc mesh network, as well as monitor flight paths and alerts for local drones. In some embodiments, the application 406 can be configured to connect a user's device (for example, via a Wi-Fi, Bluetooth®, or cellular connection) with communication drone 256 when an ad-hoc network is formed in their area.

In different embodiments, the application 406 can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video, or other such information presentation.

As noted earlier, each communication drone 256 can include a plurality of hardware components 452, including but not limited to communication module 454 (including the transmitter and receiver), battery, an optional control panel, optional lighting elements, and optional audio elements such as a speaker and/or microphone. Furthermore, the system can be configured to receive location data from each registered node. In FIG. 4, communication drone 256 includes a GPS or other location sensor that can transmit in real-time or near-real-time the current location of the drone. This data is received by the processor and shared with a tracker module 468 that can maintain an ongoing record of the drone's current position as a set of coordinates, or its position relative to a particular landmark, or relative to another drone, or other type of geodata that indicates a general area in which the drone has traveled. In some embodiments, the tracker module 468 shares information with a flight path navigation system associated with app 406. The navigation system may comprise any system capable of providing directions and/or other kinds of routing information between two or more locations. In some cases, after receiving updated data from a drone, navigation system can provide directions to the user that guide them to the nearest mesh network, working cell tower, or present details about the drone's upcoming scheduled flight stops.

Figure 26:
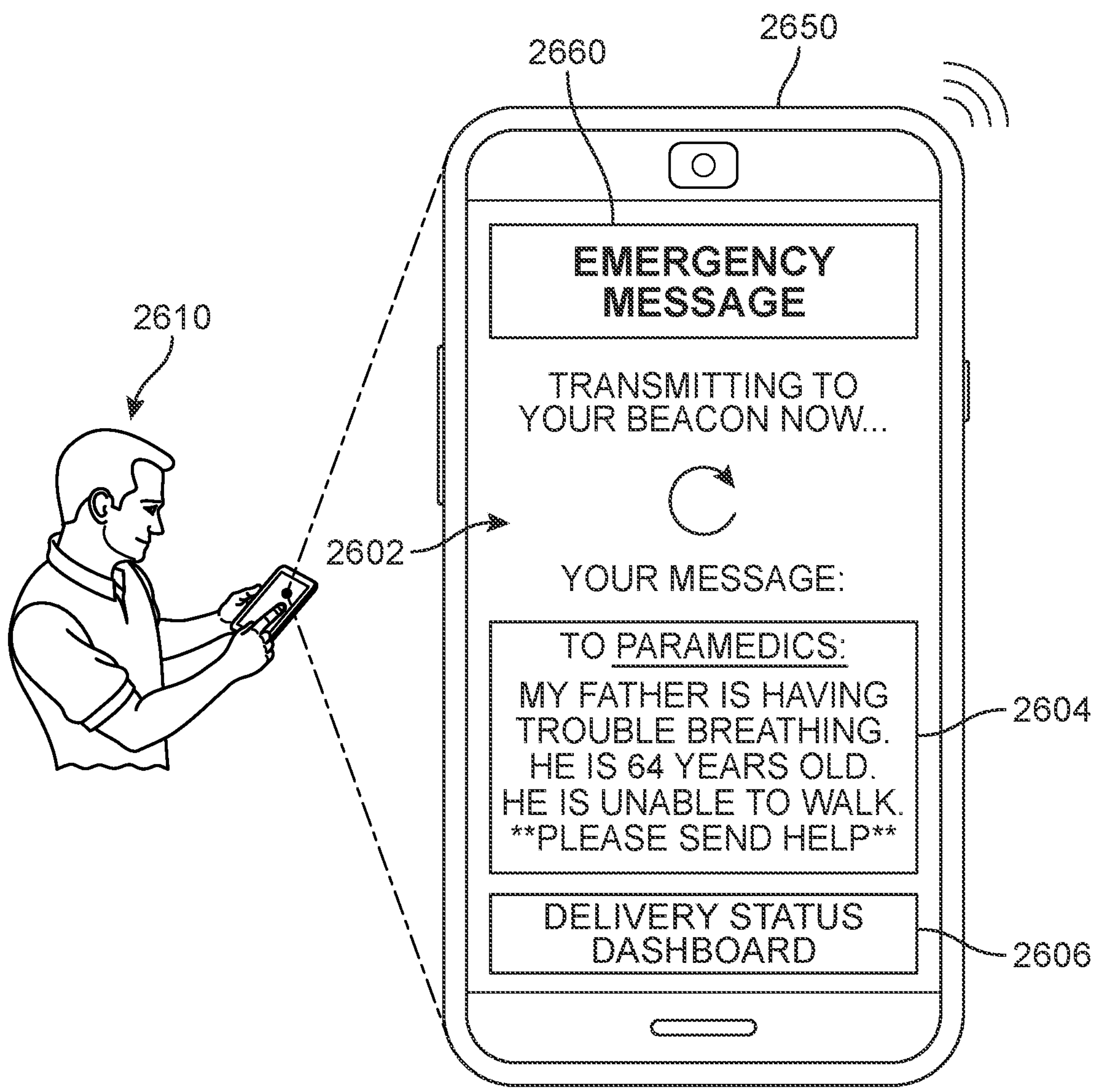
FIG. 26 depicts an example of a user in an outage-impacted region requesting their message be transmitted and identified as an emergency message via the communications app, according to an embodiment.

In some embodiments, each communication drone 256 can also directly measure its' connectivity to another drone, to the tower, and/or to a user device via a signal strength monitor 466. The monitor 466 can communicate with an alert module 478 to cause an alert to be presented via the communication drone 456, such as by way of flashing lights, or lights of a particular color, and/or by audio notifications that can be observed by residents of the area to notify them of the implementation of an ad-hoc network. In cases where the drone also includes a display or screen, alerts and other information can also be displayed directly on or around the exterior housing of the drone itself for the persons on the ground to receive emergency instructions and guidance. In some embodiments, alerts can be generated in response to a specific type of data/message received from a user device indicating an emergency condition (see, for example, FIGS. 26 and 27).

In some embodiments, a drone can initiate and maintain a connection with a related drone (drones that are identified and known by the system to recognize other drones in the drone party) via inter-drone communications module 472. In one example, if the communication drone 256 locates a drone, tower, or device, it can produce an alert if the signal strength between the two sides is dropping that can be conveyed to the drone communications system 202 and cause a change in the deployment strategy and a rearrangement of the drone formation and/or a replacement or recharge event to repair or bolster the connection.

In addition, in some embodiments, if the charge for an onboard battery for communication drone 256 falls below a preselected threshold, a charging manager 474 can override any instructions and cause the drone to either (a) switch to a low power mode and/or (b) travel to the nearest charging station. In some embodiments, the charging station can be provided via UAV as well, as will be discussed in FIGS. 28A-32 below.

For purposes of clarity to the reader, FIGS. 5, 6, 7, 8, and 9 present a sequence of drawings illustrating an example of an implementation of some features of the drone communications system ("system") prior to an outage and directly following an outage. As discussed earlier, in different embodiments, the system can include provisions to collect and/or perform a survey of a region prior to a disaster and potential imminent outage in that region. For example, in some embodiments, the system can receive information from disaster information service providers and/or regional weather forecast service providers indicating an approach of a natural disaster that is expected to impact a first area. In response, the system can automatically initiate a survey protocol with instructions that causes one or more drones (available in the UAV repository) to perform an aerial inspection of the first area prior to the disaster. It can be appreciated that such "pre-disaster flights" can be used to collect data that can be useful when later determining the drone deployment strategy for providing an ad-hoc network.

In some embodiments, the first area can include multiple zones of habitation, such as urban zones, rural zones, and intermediate zones that fall between the two. The system can include provisions for identifying an optimal survey pattern and assortment of drones for canvassing as much of the first area as possible before the disaster. For example, in FIG. 5, a first UAV 500 has been deployed in response to instructions generated at the network activity survey module 220 for the system 200 to canvass an urban zone 500 in the first area. Because the urban zone 500 includes a higher density of occupants, the first UAV 500 is assigned to perform a first flight plan 505 that allows for the collection of sensor data from individual buildings (e.g., first building 510, second building 520, and third building 530) that may be residences, office spaces, warehouses, or other high activity spots. A nearby base station 540 can also be pinged and requested to send activity data, with the expectation that the base station 540 may soon be out of operation. In some embodiments, the first UAV 500 can detect and/or capture various types of information 504, including mobile device activity, radiation data, etc. that can be shared over network 280 with network activity survey module 220 for processing. In some embodiments, the first UAV 500 can determine the location of any cell towers and/or other wireless network access points in its target zone and share its assessment with the system 200.

Figure 6:
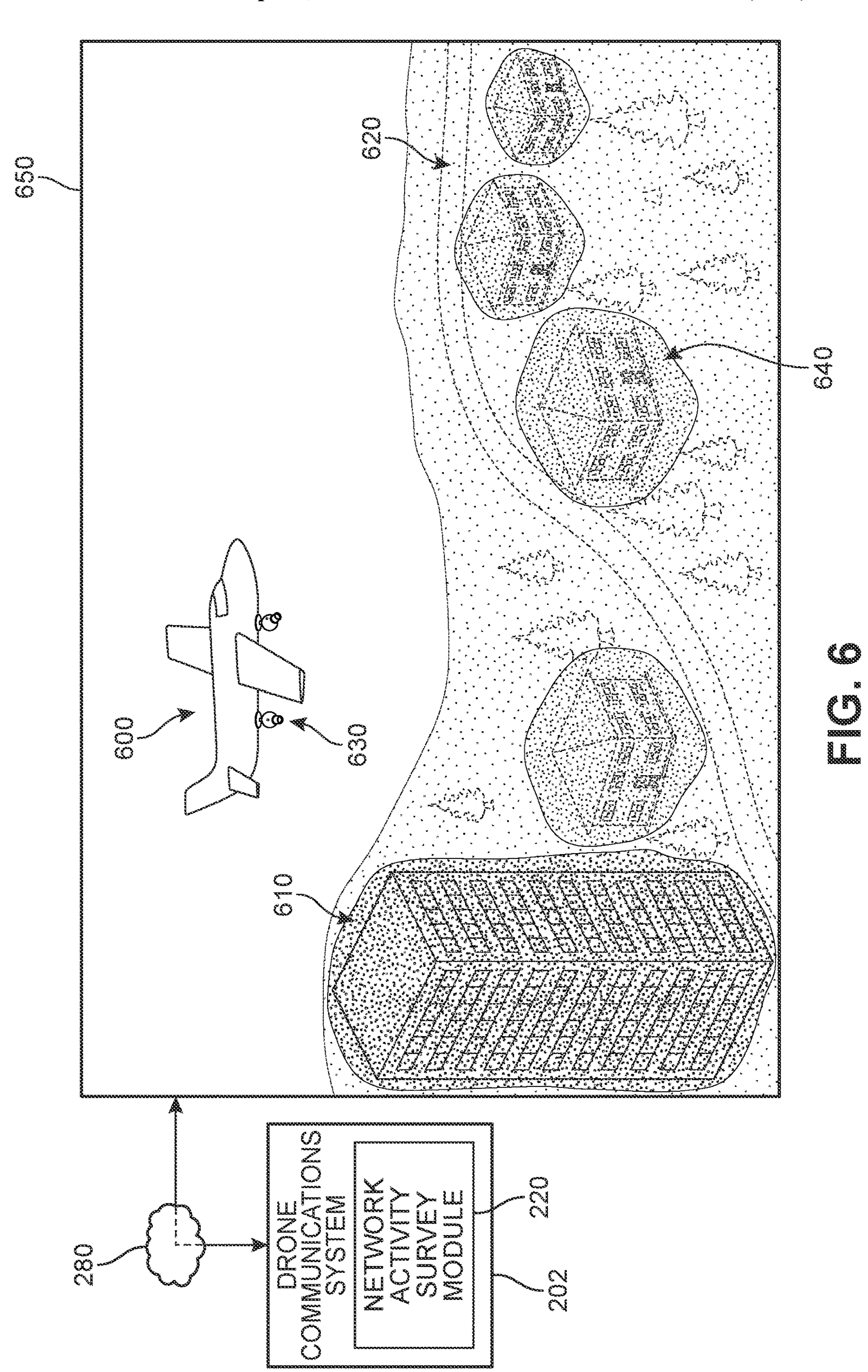
FIG. 6 is an example of a heat map generated based on sensor data collected by an aerial drone, according to an embodiment.

Similarly, as shown in FIG. 6, a second UAV 600 has also been deployed by the system 202. The second UAV 600 has been instructed to canvass another portion of the first area, and is depicted flying over an intermediate zone 650 in the first area. In some embodiments, the flight path of the second UAV 600 can also be automatically generated by the network activity survey module 220 to cater to the known geography and population of the intermediate zone 650. As it passes over the intermediate zone 650, it may fly a relatively less circuitous path (more direct) due to the drop in density of the population in this zone, ensuring coverage of a fourth building 610 as well as a group of homes 640 scattered nearby. The second UAV 600 collects one or more types of sensor data, including radiation data, via onboard sensors 630. This data may be combined at the system 202 to help the system 202 identify the areas of greatest need and design the deployment strategy to accommodate the greatest need.

As noted above, in different embodiments, each UAV deployed to survey the target area could determine the location of cell towers and other wireless access points. Furthermore, the UAV could also determine usage patterns and identify the general wireless demand, device density, and/or wireless traffic for each given geographic area that it flies over. In some cases, based on the data collected by the UAVs, the system 202 can generate virtual heat maps of wireless demand and wireless resources prior to the disaster. An example of such a virtual heat map 620 is presented in FIG. 6, where heavier stippling indicates a larger wireless demand or load, and lighter stippling indicates a relatively smaller wireless demand or load. In different embodiments, this pre-disaster mapping can be used by the system 202 to more efficiently determine how the wireless activity changes after a disaster, and can be used to initially determine the optimal configuration (positions) of the communication drones in the most effective location when the outage occurs.

Figure 7:
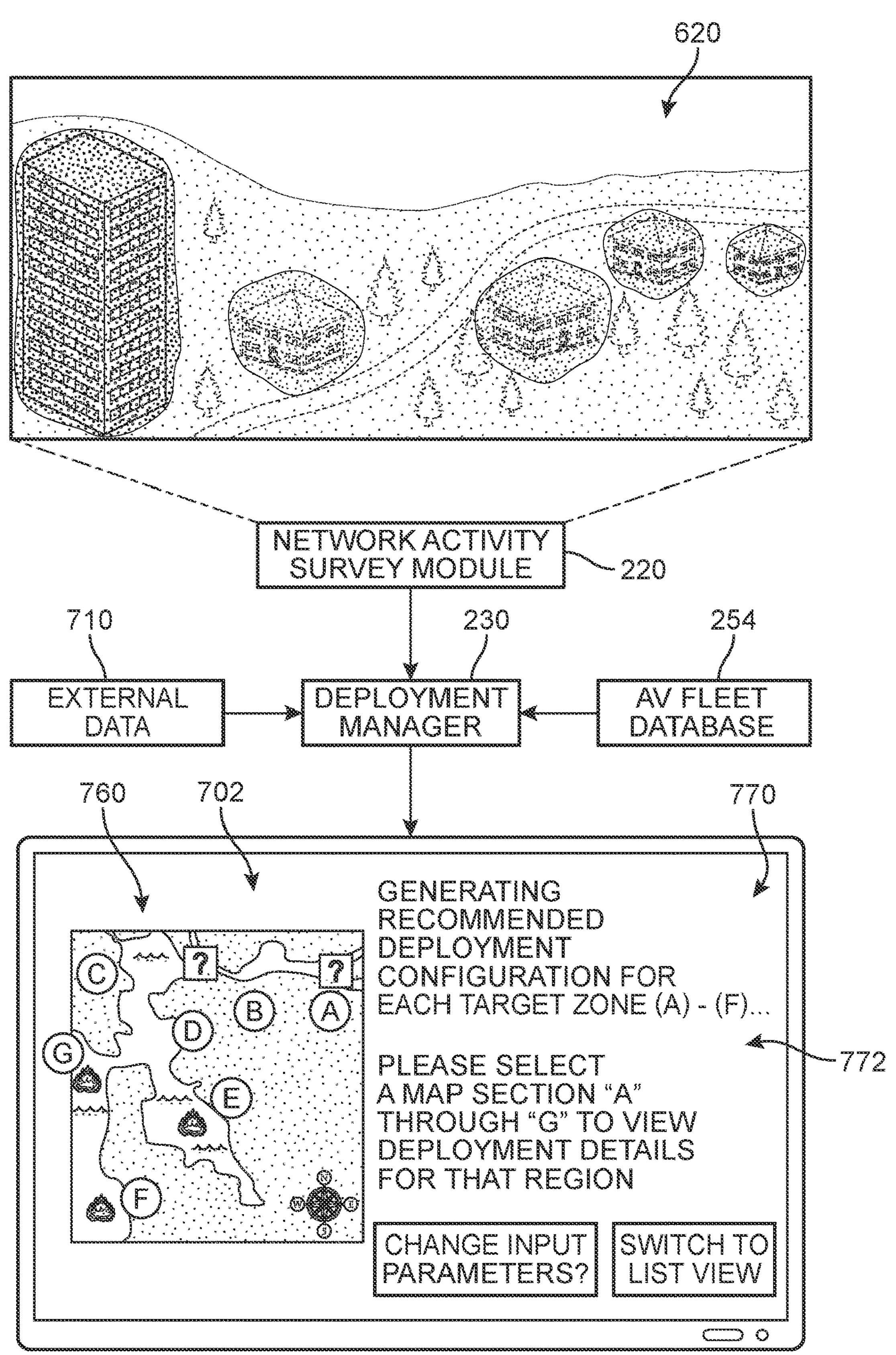
FIG. 7 is a schematic flow diagram showing an example process for using heat map data to help determine a deployment strategy, according to an embodiment.

For example, referring to FIG. 7, the heat map 620 has been generated at the network activity survey module 710 based on the data collected by the second UAV 600 as depicted in FIG. 6. Following a disaster, the heat map 620 is passed to the deployment manager 230, which also receives inventory records (drone availability data) from the UAV fleet database 254, as well as external data 710 such as cell tower usage data, cell tower outages, and member device data. In some embodiments, the deployment manager 230 can process this array of data and output a drone deployment configuration as part of its deployment strategy. One example of this process is presented with reference to a computing device display 770, on which a regional map 760 identifying multiple impacted areas (e.g., A, B, C, D, E, F, G) is shown, as part of a first user interface 772. The first user interface 772 can be used to view the auto-generated drone deployment strategy applicable to all areas affected by the outage.

Figure 8:
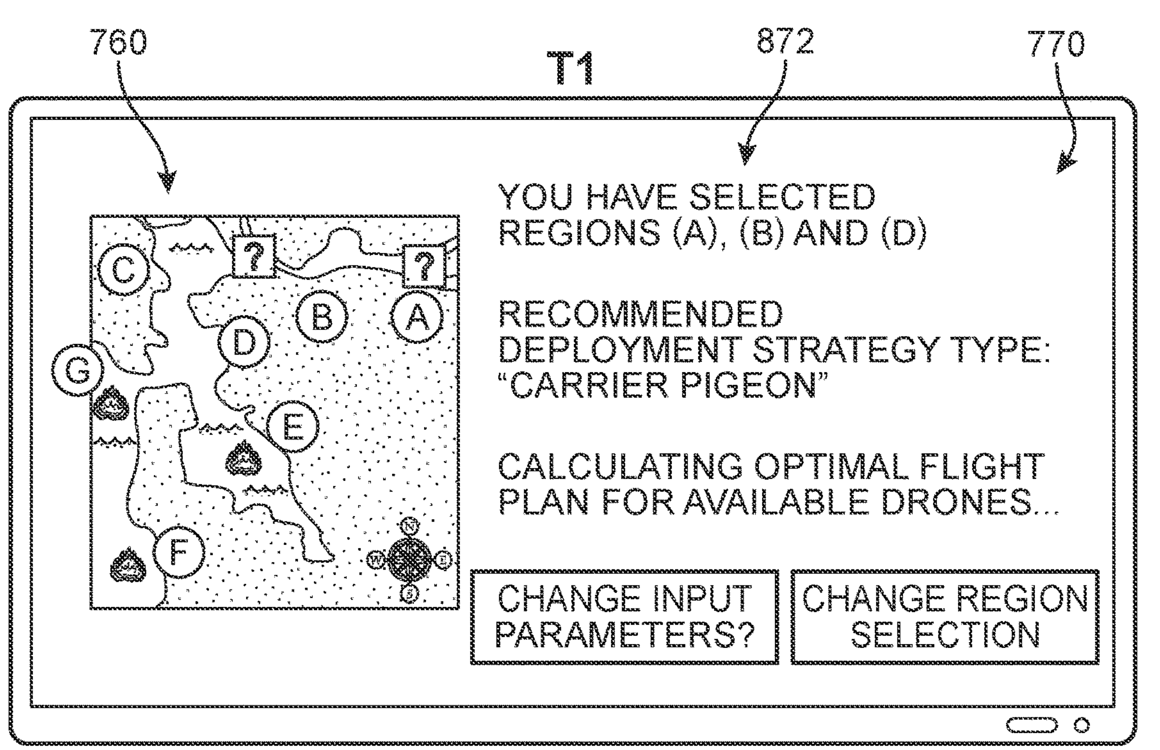
FIGS. 8 and 9 illustrate example user interfaces for a deployment manager of the drone communications system, according to an embodiment.
Figure 9:
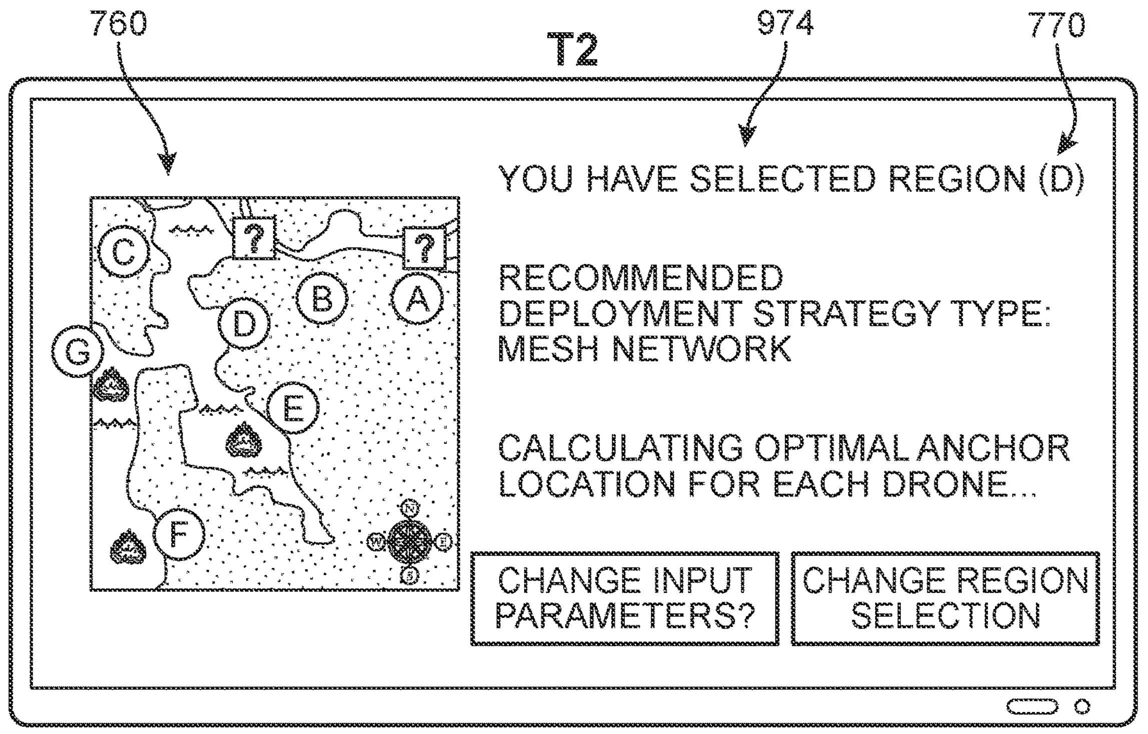

In other cases, the system 202 may modulate its response to create a time-staggered deployment strategy. In other words, there may be too few drones to cover all areas in which an outage has occurred. As shown in FIG. 8, at a first time T1, the system can generate an initial deployment strategy based on the messenger network type that targets multiple areas (e.g., A, B, D) and carries messages to/from these areas, depicted via a second user interface 872. In some embodiments, the system can allow end-users to review the individual flight paths that have been outputted for each drone to execute. With the passage of time, areas A and B may be evacuated and/or cell towers in those areas repaired, allowing for the drones serving those areas to be retrieved/recalled. As shown in FIG. 9, these drones can then be re-assigned to target the area (area D) that remains affected by the outage, as depicted in a third user interface 974. Because there is only one area requiring assistance at this second time T2, the total number of drones now available is sufficient to generate a deployment strategy implementing a mesh network type of ad hoc network, which offers more consistent/continuous coverage than the messenger network. In some embodiments, the system can allow end-users to review the individual "anchor locations" identifying the coordinates where each drone will travel to collectively form the mesh network.

In different embodiments, the system can communicate with the available drones at the UAV repository, and these drones would also communicate with one another, to verify the size of the drone fleet (determine how many other available drones have the appropriate communications hardware and software for a given area). The system also confirms the wireless communications needs (or a best estimate) of a given area. In some embodiments, once these two pieces of information are known, the system can determine what kind of ad hoc network arrangement would best suit the wireless needs, given the available drone fleet. In addition, the system can take into account, as a disaster approaches a region and is predicted to impact network communications, the expected outage area and accompanying regional features (e.g., flat, mountainous, rocky, forest, etc.). This information can be used to fine-tune the calculation of the number of drone communication devices needed to reach a particular position relative to the nearest secured (i.e., unaffected) base tower and that base tower's power and range. It can be appreciated that, if enough drones are available, the deployment strategy selected by the deployment model would instruct the drones to establish a drone mesh network (e.g., see FIGS. 17-21 below). This calculation can be based in part on the likely maximum intervals of distance between the drones that would reliably enable connectivity. In some embodiments, the drones selected for deployment in a mesh network are pre-programmed to recognize one another, allowing for simplified drop-and-go network building. Once a drone arrives at its designated location and is turned 'on' it can be configured to automatically search for a partner drone—or cellular base tower or other such network providing source—in its vicinity. Each drone would be wirelessly connected to a neighboring drone, reaching back to a drone which directly bridges to a nearby base tower. On the other hand, if fewer drones are available, the deployment strategy selected by the deployment model would instruct the drones to establish a "Carrier Pigeon" messenger network (e.g., see FIGS. 10-16 below).

Figure 10:
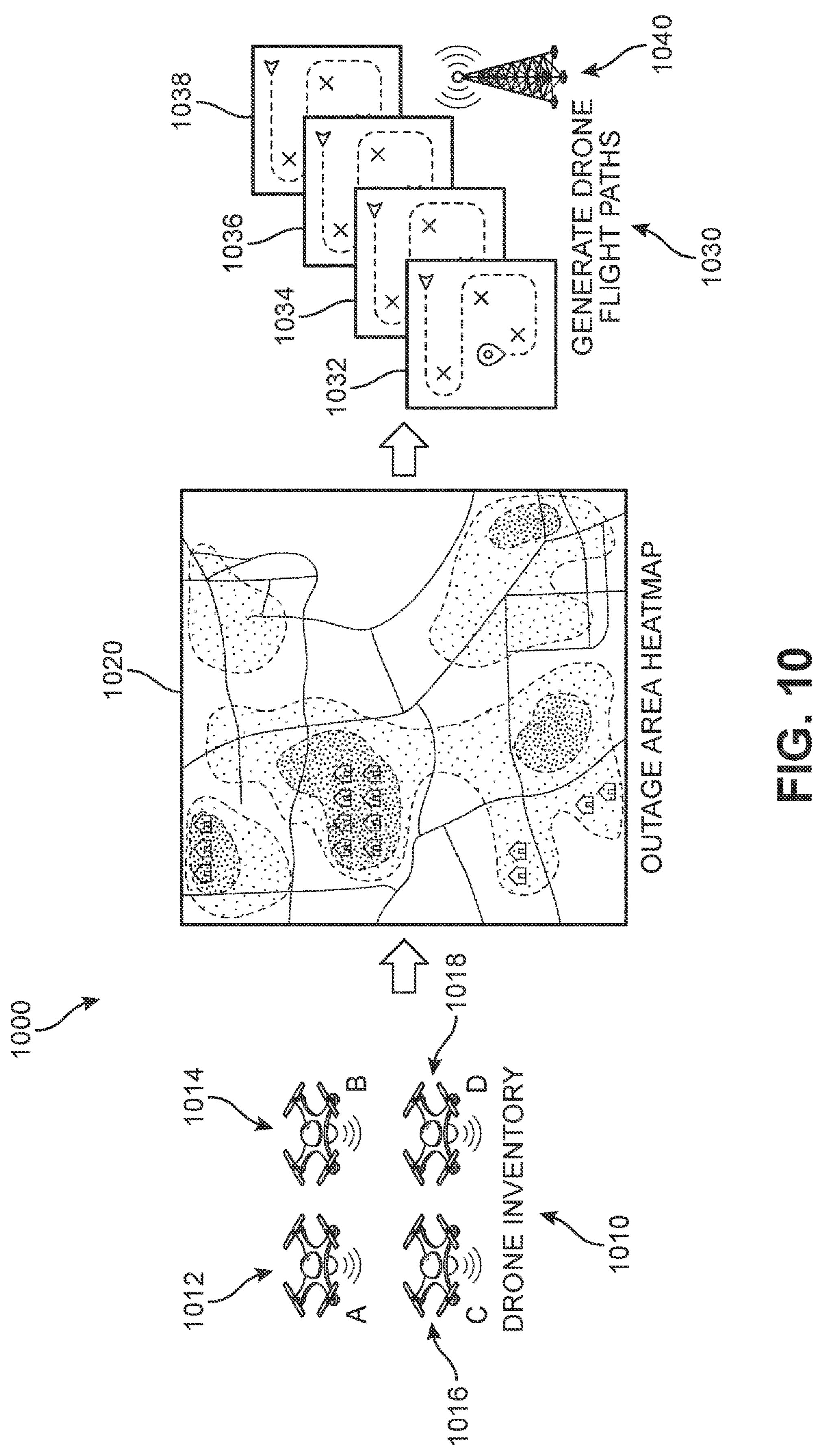
FIG. 10 is a schematic flow diagram showing an example deployment strategy directed to a messenger network and the corresponding generation of individual flight paths for each drone in a drone party, according to an embodiment.

Additional details regarding the implementation of an ad-hoc messenger network will now be provided with reference to FIGS. 10-16. In FIG. 10, the initial development of a deployment strategy by the drone communications system is depicted in a schematic flow diagram 1000. In this case, it can be understood that the deployment model has determined that there are not enough drones to create a complete drone mesh network. In response to this determination, the deployment model works to maximize network availability to the greatest number of residents and/or devices in the impacted area. In one embodiment, the system can communicate with the available drones and, based in part on the previously determined wireless demand load (patterns representing where and how many members need wireless service, such as the cellular service provider data, survey data, and/or heat maps), create a flight plan for each drone to shuttle from a working cell tower to the various clusters of residents/devices. In some embodiments, the flight path can be point-to-point, while in other cases, the flight path may be a meandering path to serve the largest number of persons possible. Eventually, the flight path would lead the drone to a position where it would be able to communicate with a cell tower.

As a general matter, a drone flight plan refers to a predetermined combination of instructions, including coordinates, speed, altitude, direction, heading, gimbal actions, camera actions, and more that serve the purpose of guiding a drone in accomplishing a flight, and carrying out a particular mission. The flight plan can include (a) a flight path: determined most commonly using a series of longitudes/latitudes and altitudes (waypoints) that automatically navigates the aircraft; (b) speeds that the drone should travel throughout the flight plan, which can be used to generate timetables and predict arrival times, and/or to zoom to specific waypoints to perform specific tasks, such as 'hover' or '360'; (c) heading, whereby the drone doesn't have to face in the direction it is moving; for example, the network connectivity may be improved if the drone is oriented toward a Point of Interest (POI) which can be set; (d) gimbal actions; (e) camera actions; (f) situational behavior with instructions as to what the drone should do in the event of a lost link or at the end of each flight.

As shown in FIG. 10, a set of one or more drones (e.g., first drone "A" 1012, second drone "B" 1014, third drone "C" 1016, and fourth drone "D" 1018) can be selected from the available inventory and assigned by the system to form a drone party 1000. In different embodiments, each of the drones can include components to support all possible wireless protocols including cellular, WiFi, Bluetooth®, satellite, ultra-wideband (UWB), or any other communications protocol. Each drone can also include a memory or storage to store collected messages during flight beyond the range of a working cell tower, then transmit those messages to the cell tower when the drone is in range, as described below.

In different embodiments, the drone party 1000 can collectively work to provide emergency communication services to an impacted area 1020 (represented as a heatmap showing the zones of network activity). The system can generate a set of custom flight paths 1030 that will provide coverage to as much of the impacted area 1020 as possible based on the number of drones available for deployment and their individual performance capabilities. More specifically, a customized flight path will be generated for each individual drone that takes into account the network coverage needed and the specs of that drone device (e.g., its battery life, its wireless signal range, its relay range, its top speed, its memory size, etc.). Thus, the first drone 1012 is assigned a first flight plan 1032, the second drone 1014 is assigned a second flight plan 1034, the third drone 1016 is assigned a third flight plan 1036, and the fourth drone 1018 is assigned to a fourth flight plan 1038, where each flight path travels over a different set of coordinates or waypoints until returning to an operational cell tower 1030, providing its message shuttle service over a broader swath (e.g., to the maximum number of residents) of the impacted region 1020.

Figure 11:
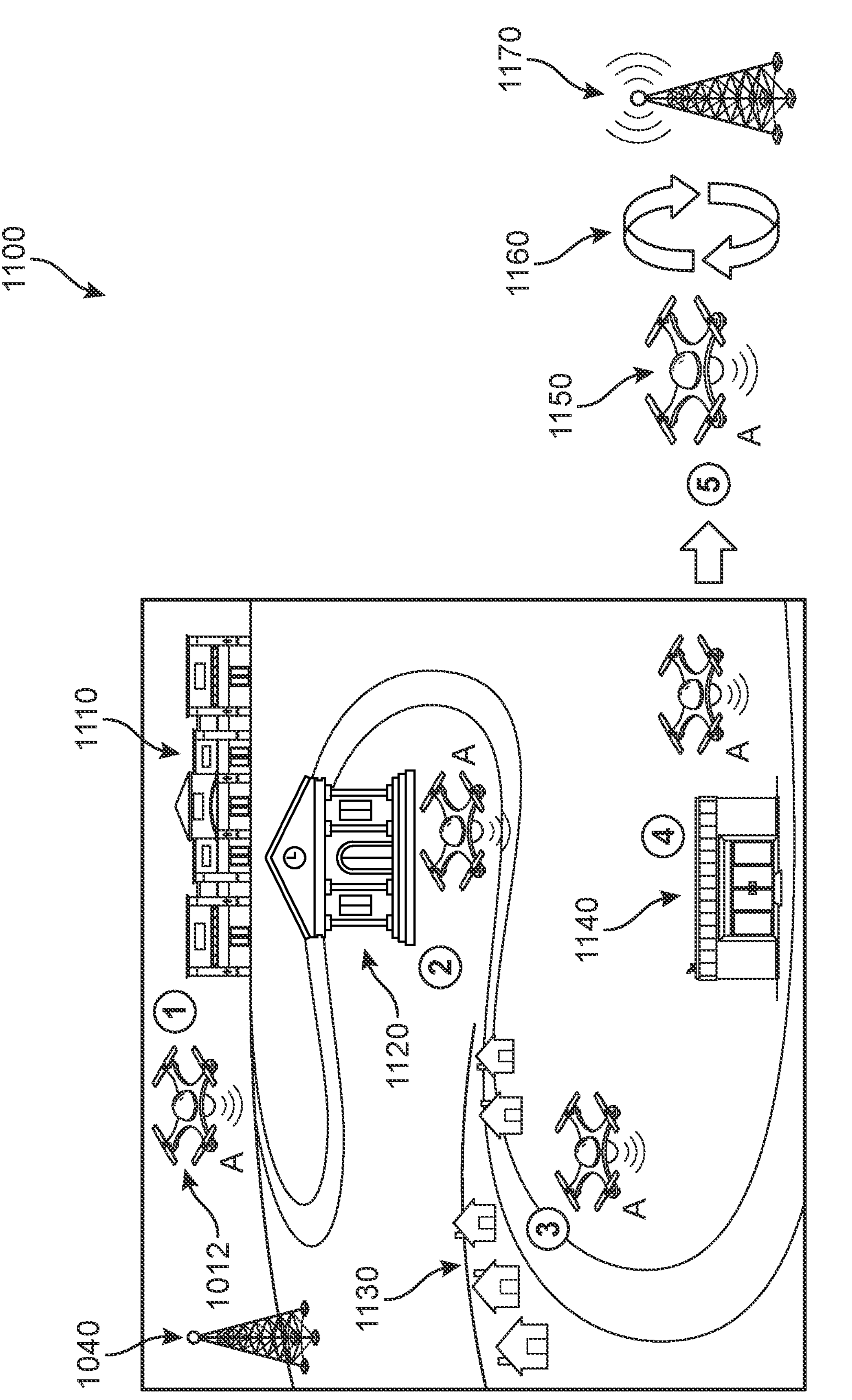
FIG. 11 depicts an example of a communication drone performing a waypoint-to-waypoint journey to transmit and receive messages in a region in which an outage has occurred, according to an embodiment.
Figure 12:
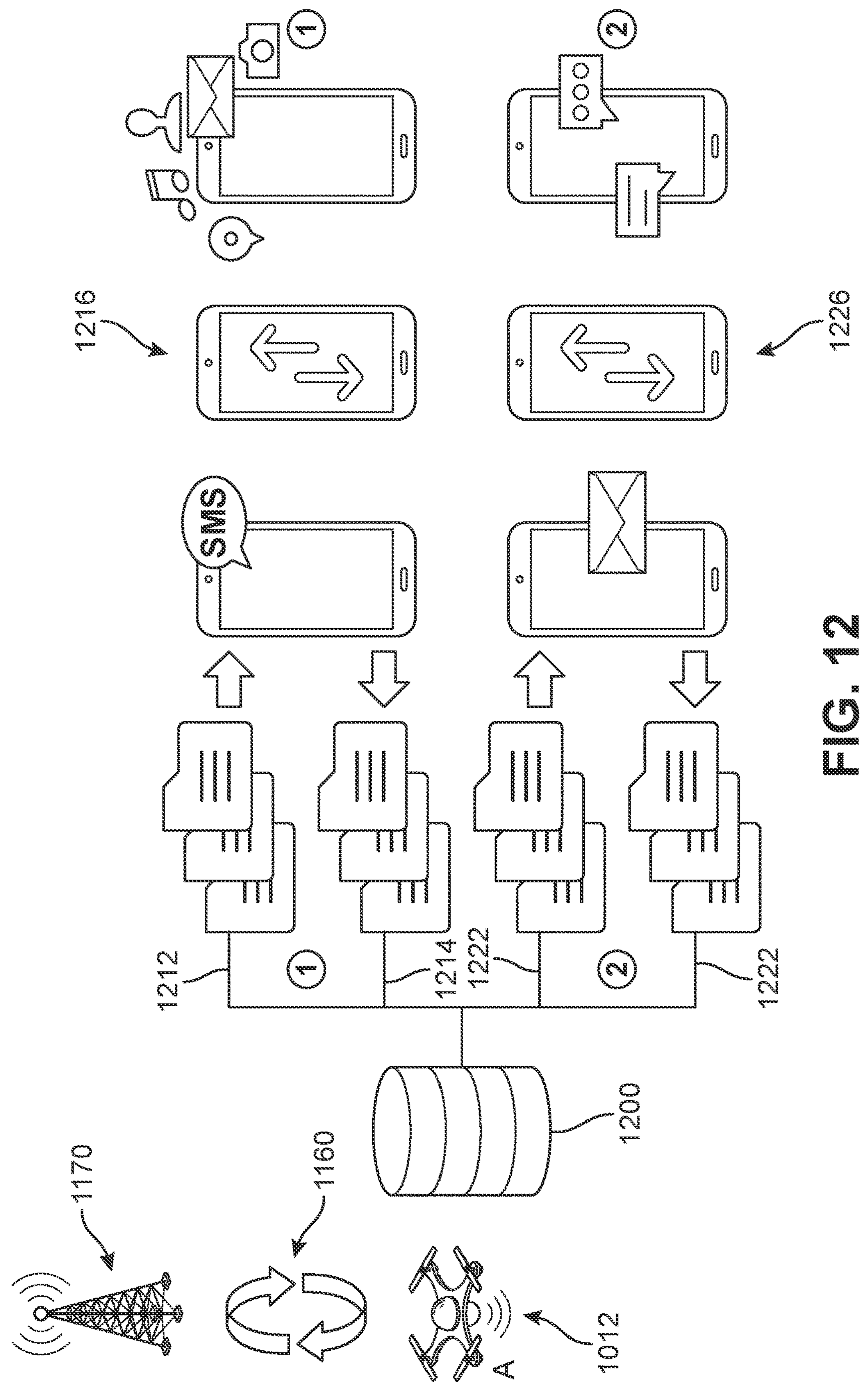
FIG. 12 is a schematic flow diagram showing an example of a communication drone performing a data exchange session with an operational base station/cellular tower, according to an embodiment.
Figure 13:
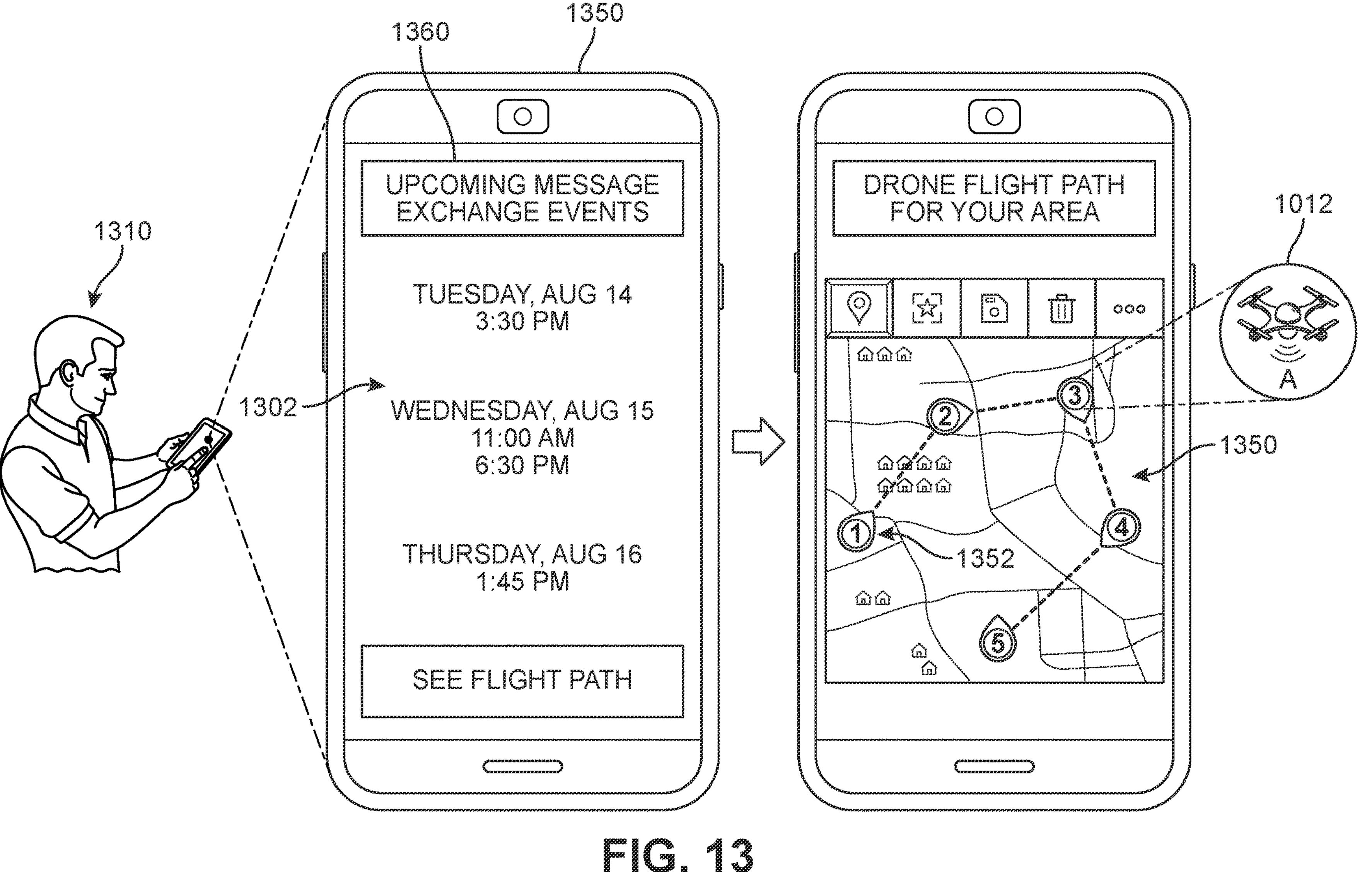
FIG. 13 depicts an example of a user in an outage-impacted region accessing the scheduled flyby times and a graphical tracker for their designated communication drone, according to an embodiment.
Figure 14:
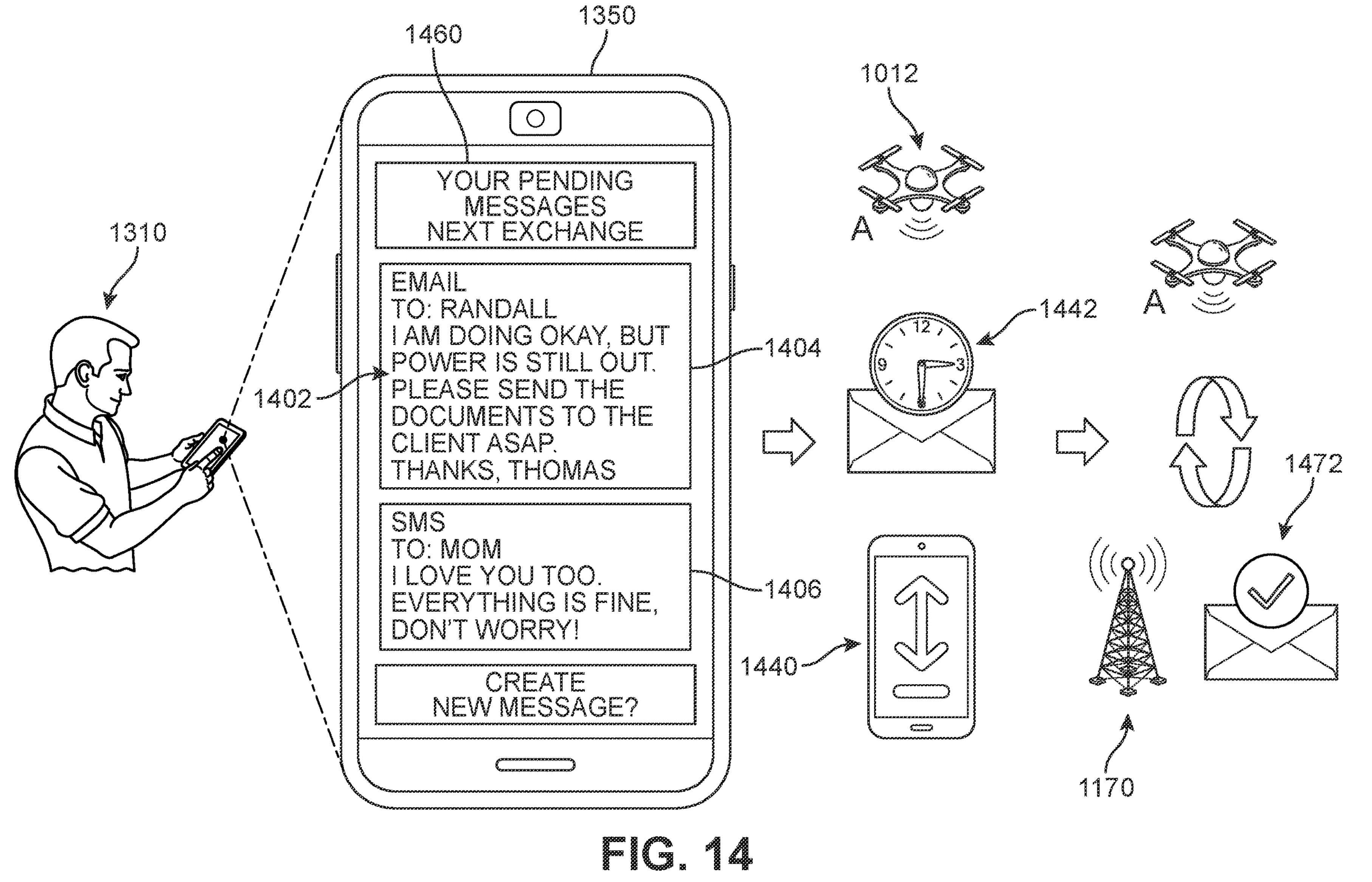
FIG. 14 depicts an example of a user drafting outgoing content via a communications app that can be stored until a communication drone arrives to carry their content to an operational base station, according to an embodiment.

An example of the message "shuttling" process is depicted in FIGS. 11 and 12. In FIG. 11, the first drone 1012 is depicted as it executes its assigned flight path across five waypoints (1, 2, 3, 4, 5) to provide service to an outage zone 1100. The outage zone 1100 includes a currently non-operational tower 1040 that had previously provided residents with communication services. The system has determined that the outage zone 1100 includes several clusters/areas where data exchange services are required, and has identified these five waypoints as corresponding to the sites where the most residents would be served. As the first drone 1012 traverses its flight path, it can begin by arrival at the first waypoint (1) linked to a first exchange target 1110 (e.g., a hospital, university campus, etc.). In some embodiments, the first drone 1012 can hover (or land) at or near the first exchange target 1110 for some pre-set duration (e.g., 2:30 μm to 3:15 μm) to permit residents with sufficient time to ensure their individual devices connect to the first drone 1012 and upload and/or download their messages and other content. For example, a first resident 1112 is shown at a first time T1 initiating a link with the first drone 1012 upon its arrival at the first waypoint (1). At each waypoint, the first drone 1012 provides access to its local network and enables users in its signal range to retrieve data stored in its memory for delivery to that user, and/or send data that will be stored in its memory for shuttling to a designated operational cell tower 1170.

After the first drone 1012 completes its data exchange session at the first waypoint (1), it will automatically navigate to the second waypoint (2) on its scheduled itinerary to arrive at a second time T2 near a second exchange target 1120 (e.g., a government center, school, apartment building, etc.) and again remain in that location for a pre-set duration (e.g., 3:30 μm to 4:00 μm). It can be understood that the pre-set duration the drone remains in one location can differ from the pre-set duration the same drone remains at another location. For example, in cases where the density of persons or devices is greater, the amount of time the drone is instructed to remain can be longer than in a location where the density of persons or devices is lower. Thus, in different embodiments, the flight path generated by the system can include not only the specific waypoints that are to be traversed, but the duration that the drone should remain there before traveling to its next waypoint. Furthermore, when a timetable is created to reflect the drone's expected journey, the time spent both in transit from one waypoint to the next as well as the time that the drone is scheduled to spend at each waypoint will be factored in to provide an accurate estimate of its movements.

After the first drone 1012 completes its data exchange session at the second waypoint (2), it will automatically navigate to the third waypoint (3) on its scheduled itinerary to arrive at a third time T3 near a third exchange target 1130 (e.g., a residential hub close to many houses, etc.) and remain in that location for a pre-set duration (e.g., 4:10 μm to 4:30 μm). In one example, the third exchange target 1130 can include a playground for a housing community where residents may visit around the scheduled drone arrival time to participate in the data exchange event with their mobile device. Finally, after the first drone 1012 completes its session at the third waypoint (3), it will automatically navigate to the fourth waypoint (4) on its scheduled itinerary to arrive at a fourth time T4 near a fourth exchange target 1140 (e.g., a community center, restaurant, shopping strip, etc.) and remain in that location for a pre-set duration (e.g., 4:40 μm to 5:15 μm). From here, the first drone 1012 can travel to its final destination at the fifth waypoint (5) in a position 1150 that is in signal range of the operational cell tower 1170.

From position 1150, the first drone 1012 can automatically perform a data transfer 1160 that moves all of the data provided by the residents at the previous waypoints from its onboard (local) memory to the network for delivery to devices in other locations. The data transfer 1160 process is depicted in FIG. 12, where memory 1200 for the first drone 1012 is shown engaging in multiple exchange events with operational cell tower 1170. In this example, the data transfer 1160 includes a first transfer packet in which first drone 1012 transmits from memory 1200 a first dataset 1212 from a first set of devices 1216 that had connected to the first drone 1012 at the first waypoint (1) to the operational cell tower 1170, and a second transfer packet in which the first drone 1012 receives a second dataset 1214 from the operational cell tower 1170 and stores it in memory 1200 for first set of devices 1216 that are expected to 'pick up' their messages at the first waypoint (1). In addition, the data transfer 1160 includes a third transfer packet in which first drone 1012 transmits from memory 1200 a third dataset 1222 from a second set of devices 1226 that had connected to the first drone 1012 at the second waypoint (2) to the operational cell tower 1170, and a fourth transfer packet in which the first drone 1012 receives a fourth dataset 1224 from the operational cell tower 1170 and stores it in memory 1200 for second set of devices 1226 that are expected to 'pick up' their messages at the second waypoint (2). Additional datasets can be exchanged corresponding to each waypoint/data transfer station that the drone attended. In different embodiments, the first drone 1012 can receive any messages or content that have been directed to the residents associated with its target delivery area and store them in its memory. When the first drone 1012 initiates its next loop through of the flight path (which may be run in a reverse direction from waypoint 5 to 4 to 3 to 2 to 1 this time) it can shuttle/transmit these new messages to the individual recipients at each location. This is an iterative process that can be repeated multiple times, until the outage is resolved and/or the drone battery needs to be recharged, allowing for a regular exchange of data from the outage area to the "outside world".

It can be appreciated that in some cases, end-users (those who reside in the impacted areas) can benefit from information that can facilitate the message shuttling exchange experience. In different embodiments, the system includes provisions for notifying users of the messenger drone's expected arrival times and flight path. For example, referring to FIG. 13, in some embodiments, the first drone 1012 can include a notification module that allows the drone to inform users of its most up-to-date flight information each time the drone arrives at a location, including the drone's flight schedule (regular time intervals when the drone will be in range of the waypoint nearest the person). In this example, a first user 1310 has a first mobile device 1350 on which communication app 1360 is installed. The first user 1310 can open the communication app 1360 and view schedule information 1302 regarding the next data exchange sessions that are scheduled to occur at or around his location. Furthermore, in one embodiment, the drone can also provide a downloadable flight path data that the user's mobile app can automatically convert into a graphical drone tracker/map. Thus, when the first user 1310 selects an option to "See Flight Path" the communication app 1360 can present a graphical interface 1350 that shows the user the selected drone's flight path, by depiction of individual waypoints. In some embodiments, the user can click on a waypoint to view the times at which the drone is scheduled to serve that location, in some embodiments, the user can return to a main menu and select other drones that are serving the impacted region to see if there are alternative opportunities to exchange data in locations outside of those on his regular drone's flight path. In some embodiments, the communication app 1360 can automatically connect to the drone when it comes within signal range of the mobile device 1350 and download the most up-to-date tracking and schedule information for the drone.

In different embodiments, the first user 1310 can in some cases prepare in advance one or more messages for pick-up by the drone. For example, moving to FIG. 14, the first user 1310 can learn of the time for the next scheduled message exchange session and, in anticipation of an upcoming session, draft a first message 1404 and a second message 1406, each to a different recipient. In some embodiments, the user's communication app 1360 can include a buffer feature where these messages 1402 are stored locally until the drone's arrival. In one example, the communication app 1360 can include a pending messages interface 1460 that allows the user to review and/or edit their drafted messages, or add more messages to their outbox.

Figure 15:
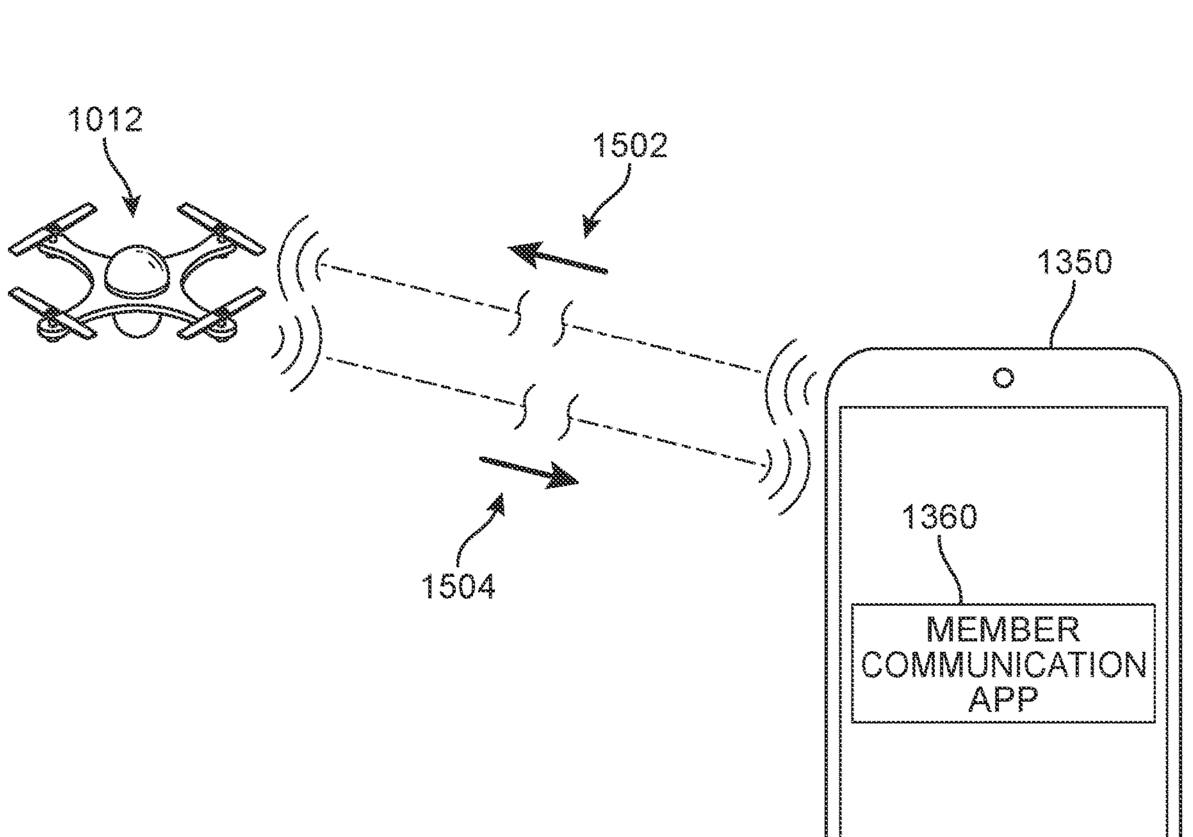
FIG. 15 depicts an example of a communication drone pulling and delivering messages to a local computing device, according to an embodiment.

In such cases, a message exchange session 1440 can occur at a subsequent time 1442 (e.g., at 3:30 μm) via first drone 1012, which receives the buffered outbox messages. For example, these messages can be held by the app and then automatically transmitted to the drone when the drone is in range. This is depicted in FIG. 15, where the first drone 1012 is shown in transmission range of the first mobile device 1350, and generates an outgoing signal 1504 (trigger/notification). The communication application 1360 receives the outgoing signal 1504 and, in response, automatically causes the content in its outbox (buffer) to send the messages to the first drone 1012 in a message transmission 1504. Returning to FIG. 14, the first drone 1012 can then continue to travel along its custom flight path until returning to the operational cell tower 1170 where the user's messages can be passed along for delivery 1472 to their designated recipients. In some cases, the drone can signal to edge devices in the system that it is approaching or the drone can demand pull messages from edge devices as the drone flies by in range. These same features can function in reverse for the drone to transmit messages to members from the cell tower.

Figure 16:
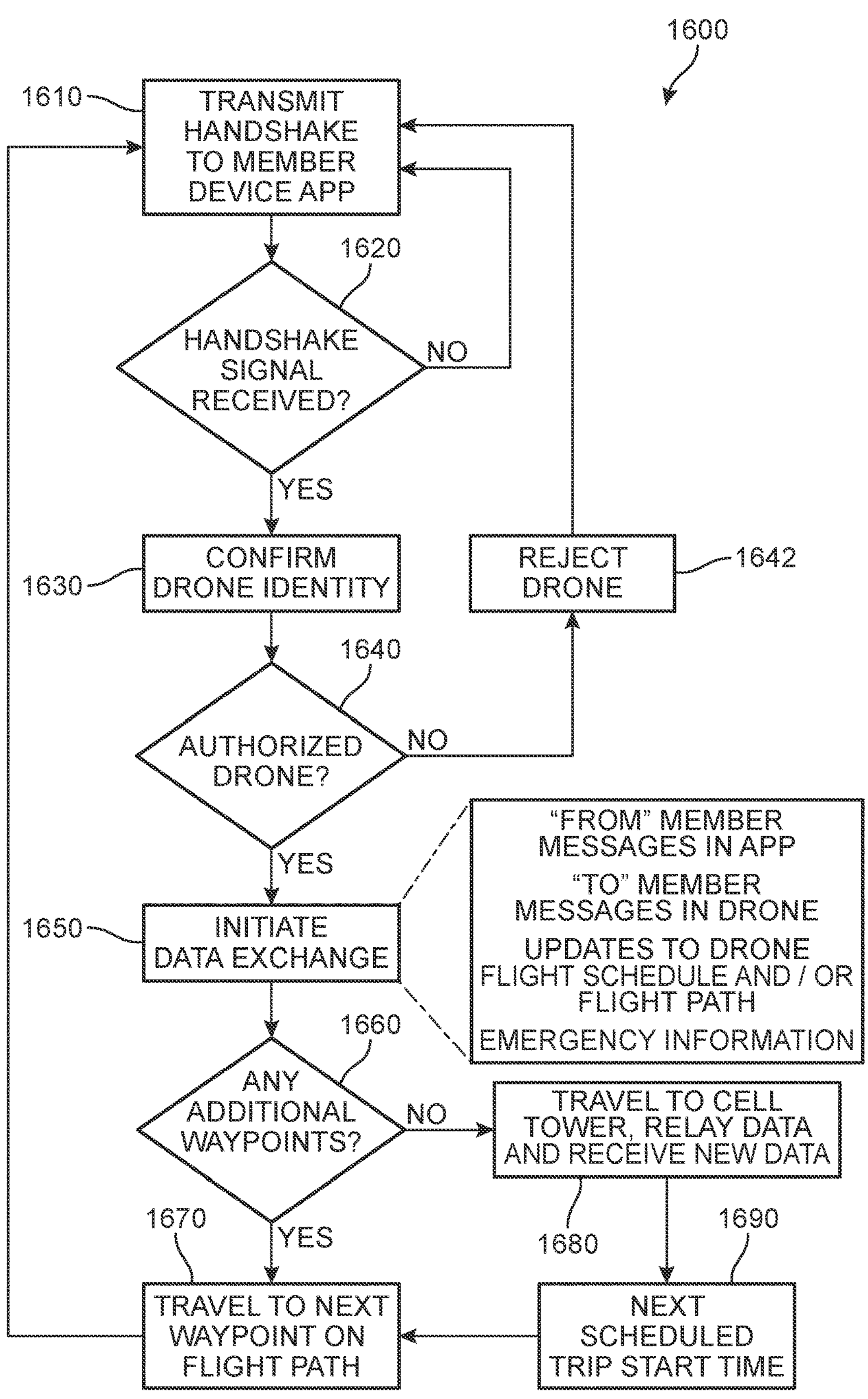
FIG. 16 is a flow diagram showing an example process by which a communication drone and a local computing device transmit information to one another, according to an embodiment.

For purposes of clarity regarding the data exchange process, a schematic flow diagram 1600 is provided in FIG. 16. In this drawing, the drone can be understood to have arrived at one of its designated waypoints. In a first stage 1610, the communication app and/or or drone can transmit a handshake signal (e.g., in response to detection of a drone by the user's local device, or in response to detection of arrival at the waypoint by the drone) where the handshake signal requests a connection between the two systems. The handshake signal can be received from/at the drone in a second stage 1620. If no drone is nearby, the local device can continue transmitting the handshake signal. In a third stage 1630, the received handshake signal is used to confirm the drone's identity by the communication app and vice versa. If the relationship is verified at fourth stage 1640, the user's local device proceeds in a fifth stage 1650 to transmit to the drone any messages that were prepared in advance by the user and/or request data from the drone's onboard memory including messages that were directed to them and the most recent drone schedules. If verification does not occur, the connection is rejected at step 1642. In a sixth stage 1660, the drone can determine whether there are any additional waypoints on its itinerary, and travel to those locations in a seventh stage 1670. Once the drone has completed its route, it can return to the cell tower in an eighth stage 1680 to relay the data it has received and pick up any new messages. The cycle can be restarted at a ninth stage 1690, whereby the drone begins its travel along its sequence of waypoints yet again to shuttle new data between residents and the working cell tower.

Figure 17:
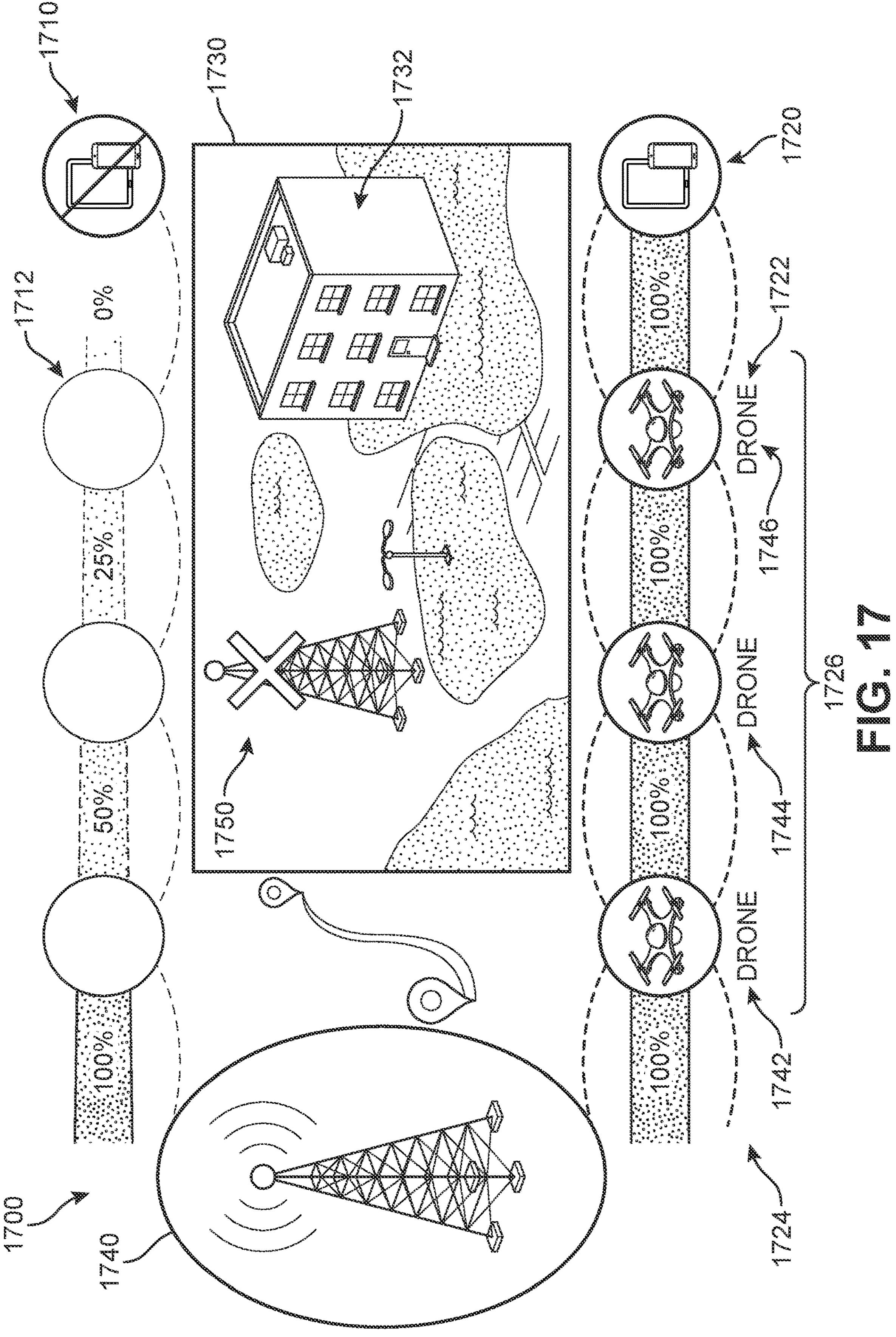
FIG. 17 depicts an example of an ad-hoc mesh network formed by a party of drones deployed by a drone communications system in an outage-impacted region, according to an embodiment.

Additional details regarding the implementation of an ad-hoc mesh network will now be provided with reference to FIGS. 17-22. In FIG. 17, for purposes of clarity, an overview of one embodiment of a mesh network operation is illustrated. In FIG. 17, the example implementation system is shown as executed via a first UAV array 1724 using a first set of drones ("first set") 1726. In this example, the first set 1726 includes a first drone 1742, a second drone 1744, and a third drone 1746. An apartment building 1732 including many occupants are located a disaster-struck region 1730, where a local base station 1750 has been disabled following floods, and default or normal networks have become unavailable for use by local devices 1710, as represented by a first signal schematic 1712 (network outage resulting in a dead zone at the region 1730). The first signal schematic 1712 depicts how, as one travels farther from a more remote (working) base station 1740 located outside of the region 1730, its signal strength drops more and more until the local devices 1710 cannot pick up a signal or connect to its network.

In contrast, once a mesh network is formed by the first set of drones 1726, the signal emanating from the remote base station 1740 is maintained at or around the same strength as if computing devices 1720 were in close range of the remote base station 1740. This can be observed in a second signal schematic 1724, which represents the deployment of a plurality of drones 1722 from the first UAV array 1724. Traveling toward the target area where apartment building 1732 is located, the drones can relay the signal forward to maintain and extend the network range of the remote base station 140 even into the region 1730. In this example, the first drone 1742 maintains a direct connection with the remote base station 1740. As we move further away, toward the target area, we are now outside of the standard signal range of the remote base station 140. However, the second drone 1744, which connects to the first drone 1742, and which in turn is connected to the remote base station 1740, allows the signal to be carried (relayed) across the two drones and provide network services to those in range of the second drone 1744. Similarly, moving deeper into region 1730, there would be no network, but for the third drone 1746 now being connected to the second drone 1744, which allows the residents of apartment building 1732 to access network services within the disaster-struck region 130 and maintain a reliable communication 'lifeline'.

Thus, as a general matter, mesh networking refers to a type of network topology in which a node (UAV) transmits its own data as well as serves as a relay for other nodes. In other words, all nodes are configured to cooperate in the distribution of data in the network. The proposed system is thereby configured to provide users with a type of ad-hoc mesh network that can dynamically respond to changes in network availability in real-time. In computer networking, a term 'ad hoc network' refers, in general, to a network connection established for a single usage session that can be a few hours. However, it can be appreciated that the session can be set up to last a few days to weeks or longer. The wireless standards (Bluetooth, cellular, NFC, Wi-Fi, etc.) allow direct communications among network devices within the transmission range of their wireless interfaces. Each node is configured to exchange their own data, but also to relay the traffic of other network nodes. In some embodiments, the nodes can be deployed to allow the nodes to form a mesh-like wireless network that allows each node to communicate with each other through multi-hop communications. In such cases, when a mesh node fails, it can simply be replaced by a new one, and the mesh network will recognize the new mesh node and automatically reconfigure itself. In some embodiments, in addition to the standard routing and relay functionality, the nodes have the intelligence to dynamically adapt the network topology to provide optimal service.

Figure 18:
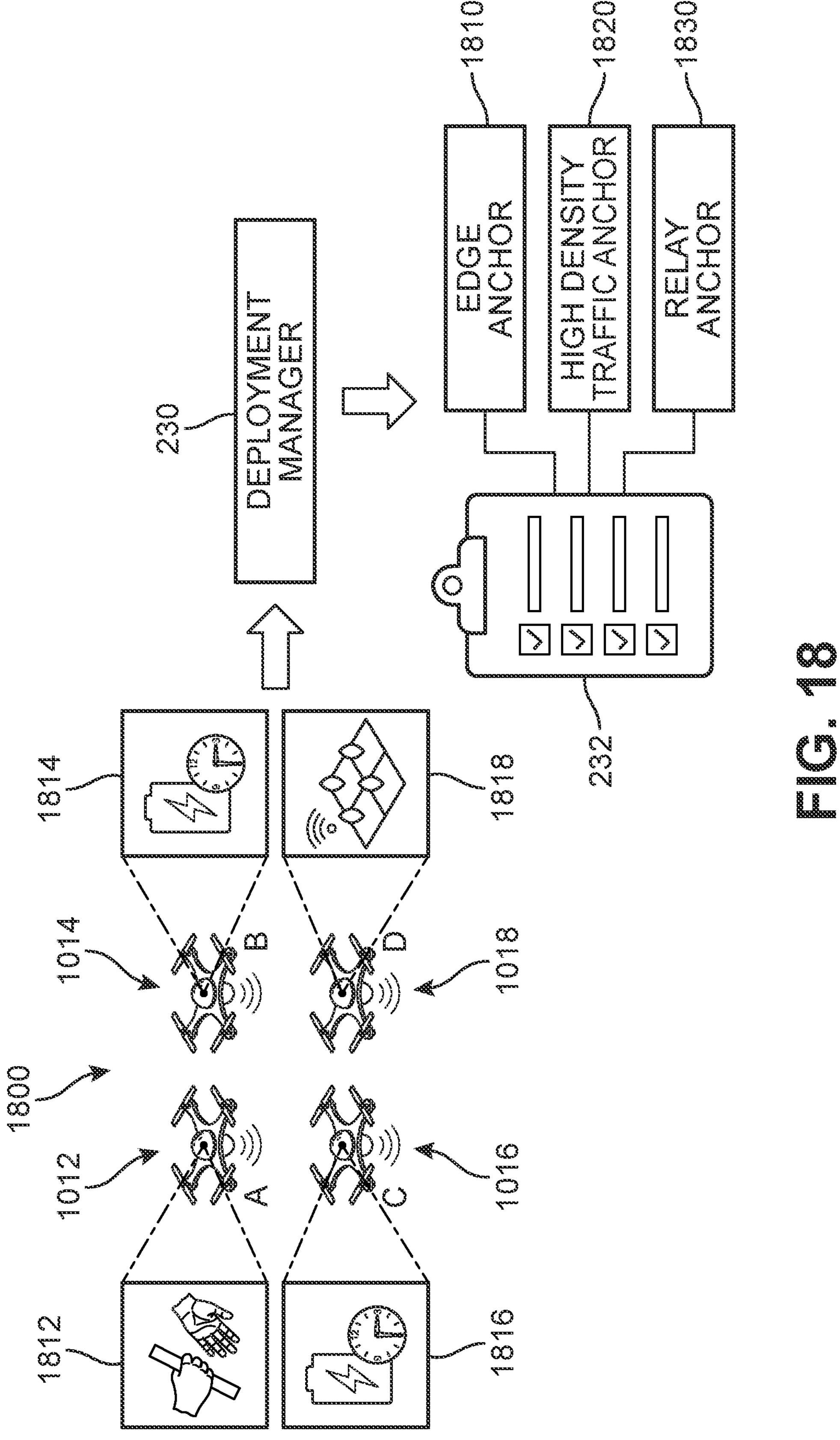
FIG. 18 is a schematic flow diagram showing an example of a drone party selection by the drone communication system, according to an embodiment.

Thus, as introduced earlier, the deployment manager of the drone communications system can determine, based on the area/extent of the outage and the predicted or expected network demand/load in that area, whether there are enough drones available in the UAV repository to establish a drone mesh-based ad-hoc network over the impacted region. As shown in FIG. 18, the deployment manager 230 can evaluate current inventory 1800 in the context of the size and demand distribution of the outage. The inventory 1800 in this case can be understood to include a plurality of drones that comprise at least first drone 1012, second drone 1014, third drone 1016, and fourth drone 1018, among others. In different embodiments, each drone can further be defined as a drone model with a different combination of specifications ("specs"), such as battery life and flight time, camera/sensors capacity and quality, memory/storage, stabilization, Gimbal, takeoff weight, dimensions, acceleration, maximum hover times, frequency, charging time, reach and flight range on its current battery life and when the battery is fully charged (where flight range is how far the drone can travel based on its battery level/life), onboard accessories, network signal range and power, speed, propellant, size, antenna type, and hovering accuracy. In this example, the first drone 1012 is of a first drone type 1812 that has a first combination of specifications, the second drone 1014 is of a second drone type 1814 that has a second combination of specifications, the third drone 1016 is of a third drone type 1816 that has a third combination of specifications, and the fourth drone 1018 is of a fourth drone type 1818 that has a fourth combination of specifications. Each drone type can be associated with a spec that represents its 'strongest' or most sophisticated feature. For purposes of illustration, the first drone type 1812 can be understood to include strong communication or networking capabilities (relative to the other drones available in the inventory 1800), the second drone type 1814 can be understood to include relatively strong battery life or capacity (relative to the other drones available in the inventory 1800), the third drone type 1816 can also be understood to include relatively strong battery life (relative to the other drones available in the inventory 1800), and the fourth drone type 1818 can be understood to include a strong wireless range (relative to the other drones available in the inventory 1800).

Data describing these characteristic specs associated with each individual drone type (e.g., labels with the drone type identified) can be provided to the drone communications system as part of the reported inventory 1800. In some embodiments, the deployment manager 230 can, via UAV assignment module 232, generate a mesh network assignment that takes into account not only how many drones are available, but the types of drones that are available, when generating the architecture/make-up of the mesh and assigning each drone to a particular location in the mesh. In some examples, the mesh can be made up of many drones where each drone plays a pre-defined 'role'. For example, once the deployment manager 230 determines there are sufficient drones available to establish a wireless mesh network to serve all (or a majority of) residents in a given service area, the UAV assignment module 232 can assign some of the available drones to function as a wireless access point that communicates directly with a resident's wireless device, while other drones would be assigned to act as relay drones to relay messages from a working cell tower to other drones located closer the residents. In some embodiments, the UAV assignment module 232 can assign each drone to play one of a first role 1810 ("edge anchor"), a second role 1820 ("high-density traffic anchor"), and a third role 1830 ("relay anchor").

Figure 19:
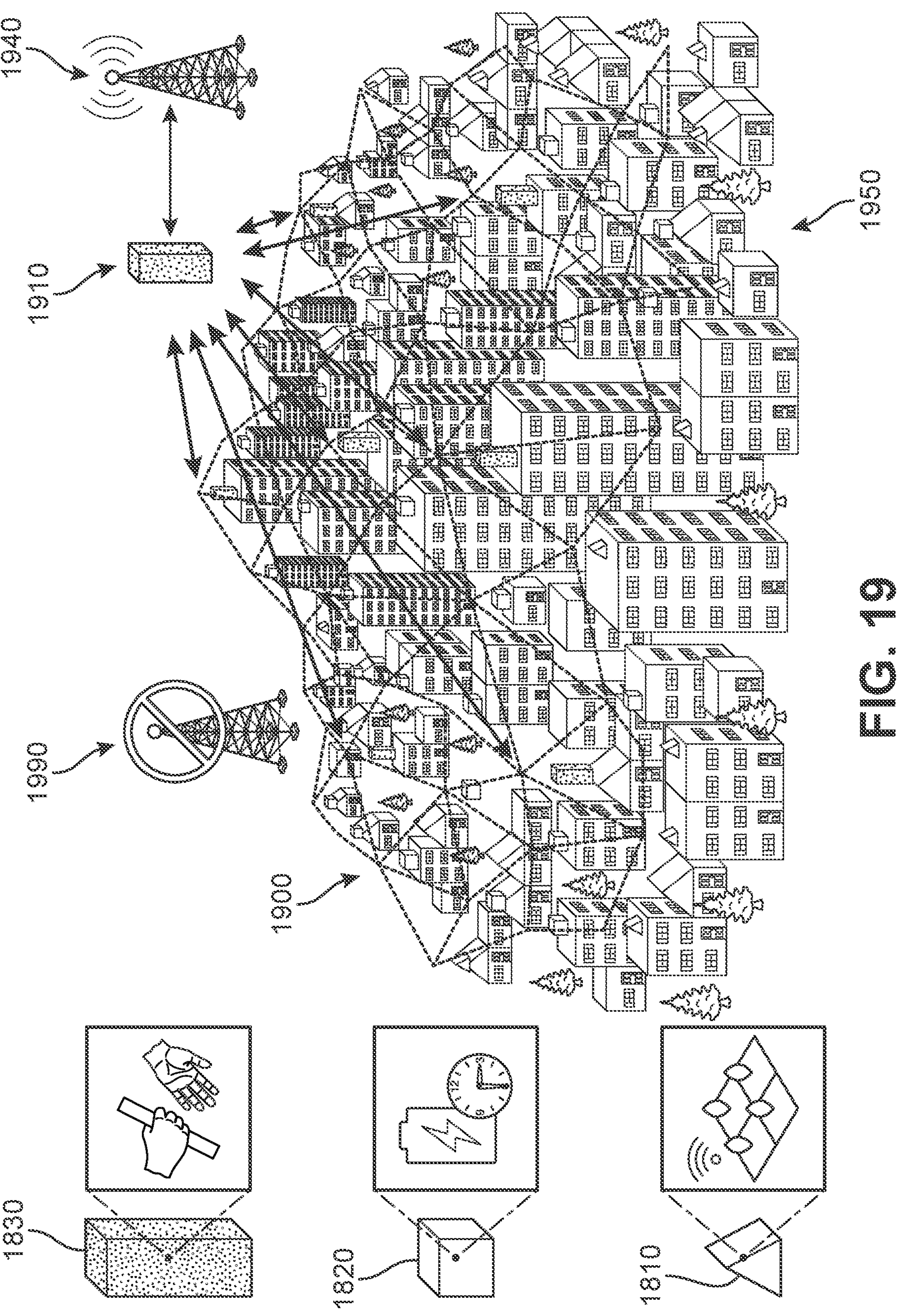
FIG. 19 depicts an example of an outage-impacted region in which a drone party with drones of varying capacities and specs has been deployed to form an ad-hoc mesh network, according to an embodiment.

In other words, in some embodiments, the system could coordinate the drones and deploy them to locations where they would be best suited. One example of this process is illustrated in FIG. 19, where a local cell tower 1990 has been disabled, resulting in an outage zone 1950. In this schematic overview of an ad-hoc mesh network 1900, it can be seen that the drones with very fast networking or communications capabilities—best suited as relay drones handling a high volume of internet traffic—have been assigned primarily to sites in the mesh network 1900 that require the third role 1830. In addition, those drones with longest wireless range—best suited as edge drones expanding the size of the wireless coverage umbrella—have been assigned primarily to sites in the mesh network 1900 that require the first role 1830. Furthermore, those drones with the longest battery life—best suited for placement near high density internet traffic, like on top of an apartment building—have been assigned primarily to sites in the mesh network 1900 that require the second role 1820. In this case, a first drone 1910 with the strongest relay capacity has been assigned to communicate directly with the operational cell tower (base station 1940) nearest to outage zone 1950. Other drones with relatively strong relay functionalities have also been distributed and positioned to serve mainly as carriers/shuttles of data from the other drone types to the first drone 1910. Along the outer edges of the mesh network 1900 those drones with the farthest range allow the mesh network 1900 to reach users beyond the boundaries of those outer drones. The intermediate drones in the mesh network 1900 perform the grunt work of transmitting to and receiving data from devices in their range, which can deplete battery life, and so those drones with the greatest battery capacity have been distributed across these mesh locations (sites). In other words, the drone communications system includes provisions for determining the most optimal use of its resources (the drones in the UAV repository) and, in response, arranging the drones across specific sites to maximize the efficiency and efficacy of the resultant network service.

In different embodiments, the drone communications system can further include provisions for managing a drone fleet for sustained operation. For example, in some embodiments, one or more drones can be instructed to replace a drone that is low on power. In some embodiments, the drone inventory can include an excess number of drones (i.e., beyond that required to form the system-designed mesh network). In such case, one drone that falls below some pre-designated power threshold (e.g., 20% or some other amount of fuel that is required for the drone to be able to return to its home base station or a recharging portal) can be automatically 'swapped' with a fresh drone. In some embodiments, the drone can communicate its fuel levels to the drone communications system via the mesh network, and receive instructions in the same way. In other cases, the battery life of each deployed drone can be estimated before deployment and, as time passes and the drone's predicted battery life falls below the pre-selected threshold, the drone can execute pre-loaded instructions (part of the flight plan generated by the drone communications system) to return to its home base/recharging portal, and a fresh (fully or mostly charged) drone can be automatically tagged in to take the place of the departing drone.

Figure 20:
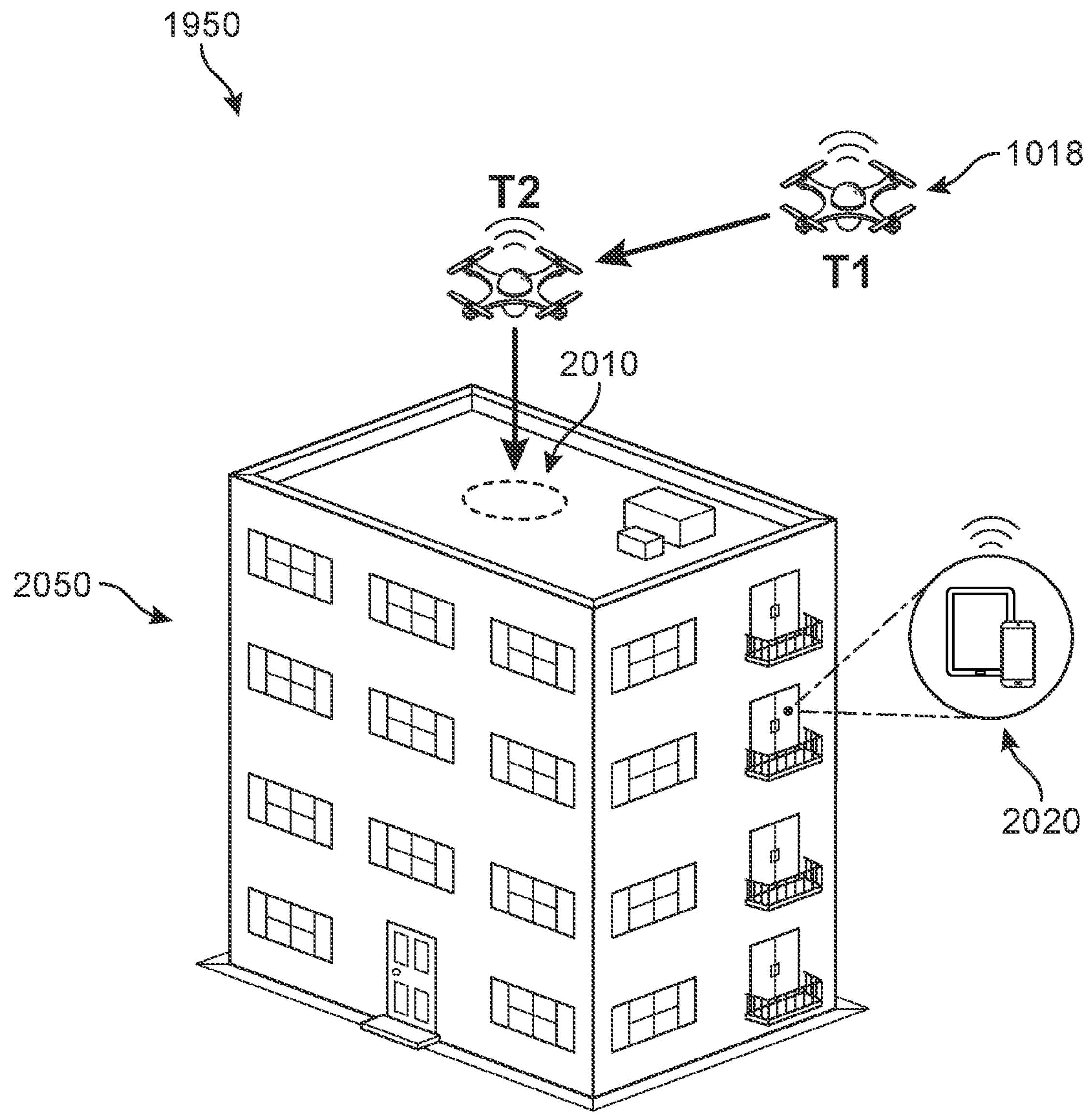
FIG. 20 illustrates an example of a drone landing on a structure of sufficient altitude so as to allow the drone to perform its role in the ad-hoc mesh network while resting on the structure, according to an embodiment.
Figure 21A:
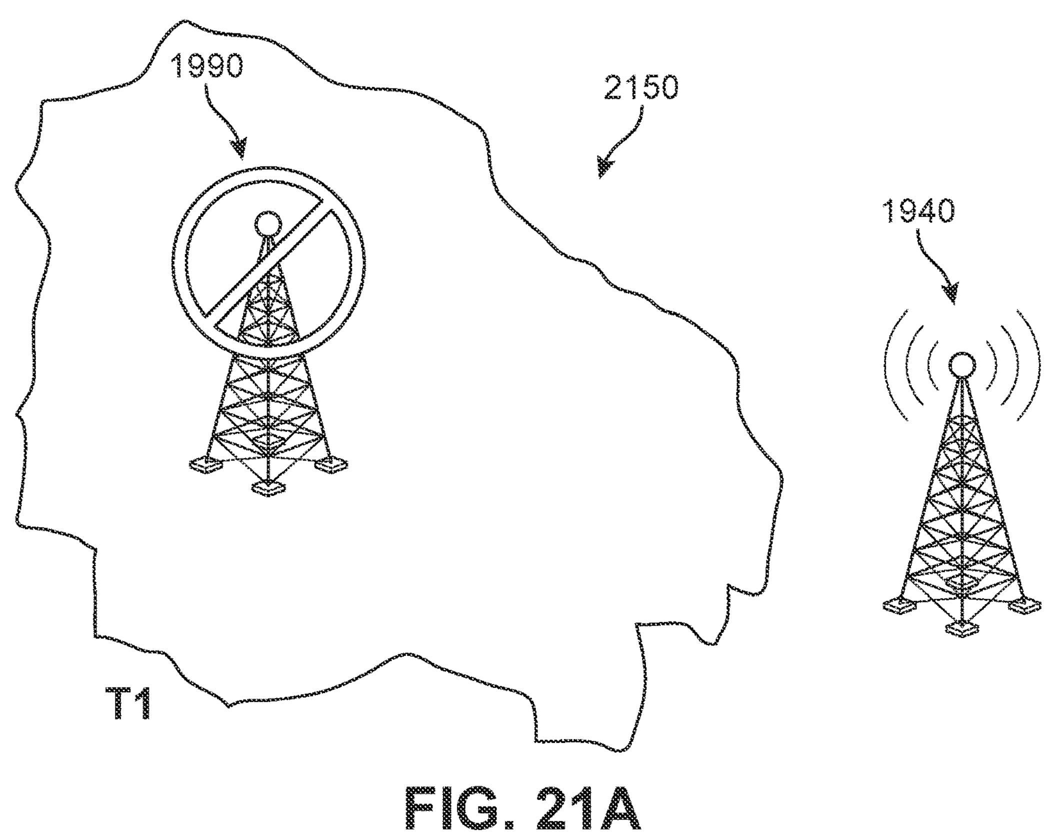
FIGS. 21A, 21B, and 22 are a sequence illustrating how an ad-hoc mesh network may be initially configured, and then dynamically adjusted, to accommodate changes in network demand, according to an embodiment.
Figure 21B:
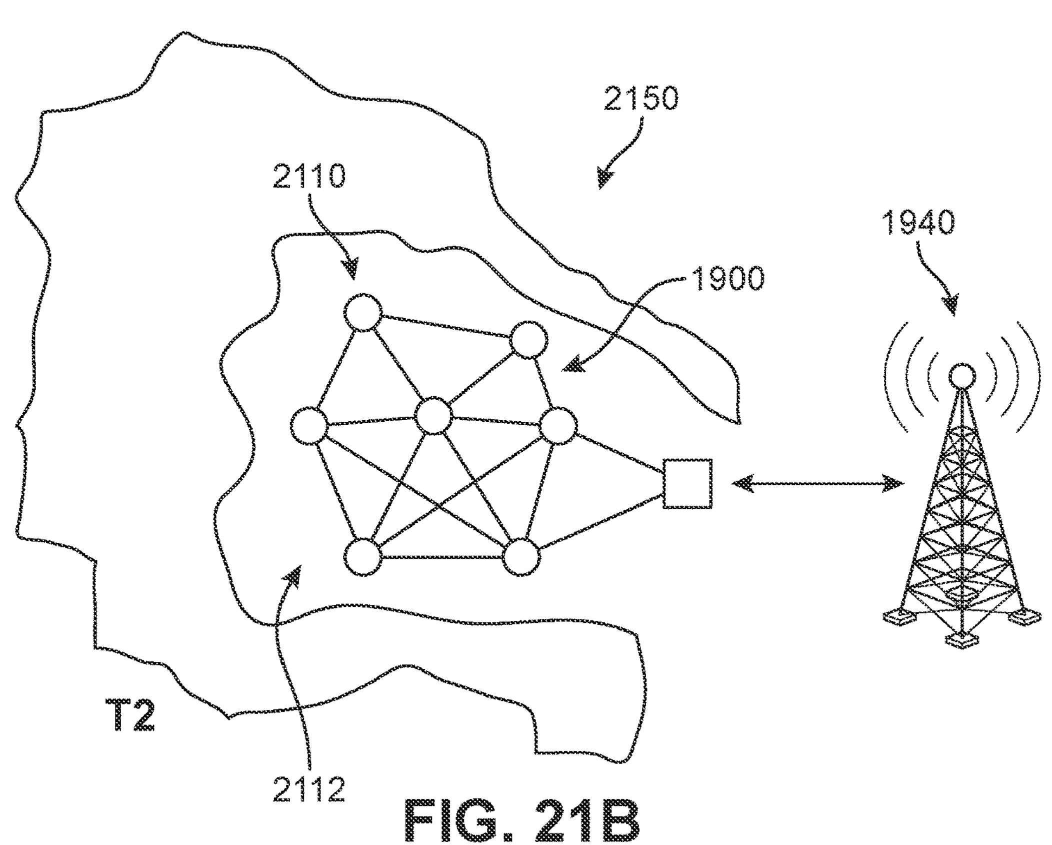

In still other embodiments, the drone communications system can include instructions in its flight plan for one or more of the drones in the deployed drone party to find nearby elevated perches to land as they take their respective positions in the mesh network. In FIG. 20, an example is shown in which the fourth drone 1018 is approaching at a first time T1, a first mesh service location (site) assigned to the fourth drone 1018 for contribution to the mesh network's range. The fourth drone 1018, employing onboard sensors such as cameras and proximity detectors, can identify the closest building with a landing zone 2010 (e.g., rooftop) that is within its service location, such as a first building 2050 in the outage zone 1950. At a second time T2, the fourth drone 1018 has traveled the relatively small distance to landing zone 2010, and at a third time T3 (not shown) will land on the rooftop. The fourth drone 1018 connects with its neighboring drones forming the mesh network to transmit/receive signals for benefit of computing devices 2020 in the area. In other examples, the drone can identify other tall structures such as cell phone towers, water towers, etc. on which they can safely land in order to conserve power while providing wireless service to an area. In some embodiments, the drones would verify whether these 'perches' would allow them to maintain wireless communication with relay drones and users before stationing on the selected perch.

It can be appreciated that, as conditions on the ground change, the network demands in an area can shift. In such cases, the drone communications system can automatically generate an updated deployment strategy by which the mesh network can dynamically accommodate the needs of the impacted area. For example, referring to FIGS. 21A, 21B, and 22, a map view of a region 2150 in which an outage has occurred is depicted. At a first time T1, shown in FIG. 21A, the disaster event has just caused the local cell tower 1990 to become disabled. The drone communications system receives an indication of the outage or some request for emergency/ad-hoc network services. In response, the system deploys the drones (as depicted in FIGS. 18 and 19) to create the mesh network 1900 (shown in FIG. 21B) and provide communication services to the impacted area. Initially, the system may determine that the heaviest network traffic portion of the region 2150 should be served, and so a first mesh configuration 2110 is established, thereby restoring communications service to a first portion 2112, while the remainder of the region 2150, much less populated, continues as a dead zone, thereby maximizing the number of people who can benefit from the ad-hoc network.

Figure 22:
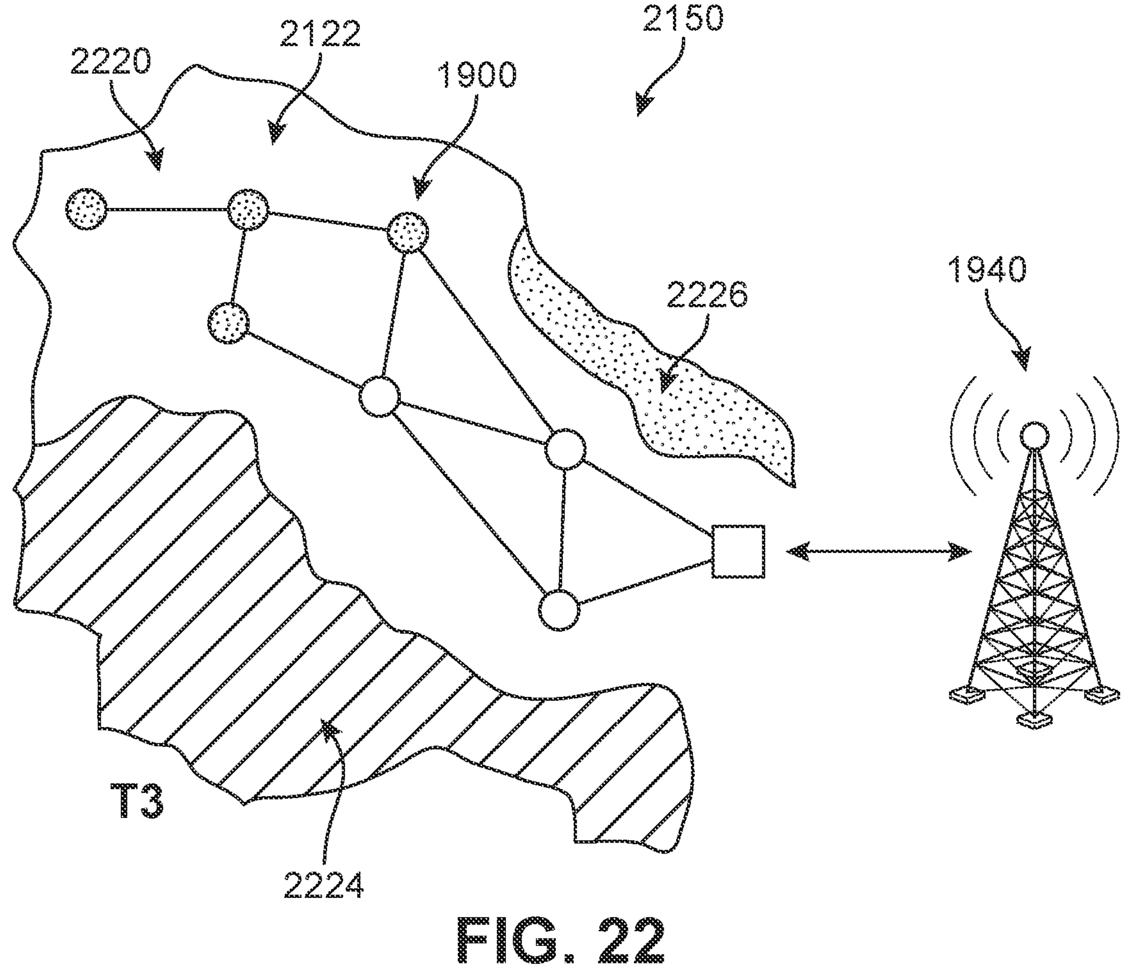

However, over time (e.g., 1-2 days) repair crews on the ground begin the process of restoring damaged network lines, as in a second portion 2226 shown in FIG. 22. In addition, residents of a third portion 2224 can be evacuated, and no longer require network services in that area. In response to this updated coverage/network demand information, the drone communications system can automatically modify the arrangement of the drones to a different, second configuration 2220 that targets the remaining areas of the region 2150 that continue to require assistance. In other words, individual drones can be re-assigned to new locations to shift the mesh network into a different formation and extend coverage into a different area by rearranging some or all of the drones to new sites. Thus, as power and internet are restored in one neighborhood, the drones that comprise the mesh can move away from that neighborhood to better serve areas that are still without power and internet. Similarly, as data is received confirming the presence of a neighborhood where all of the residents have been rescued, the drone network can shift away from that neighborhood to other neighborhoods that still need the drone network service.

Figure 23B:
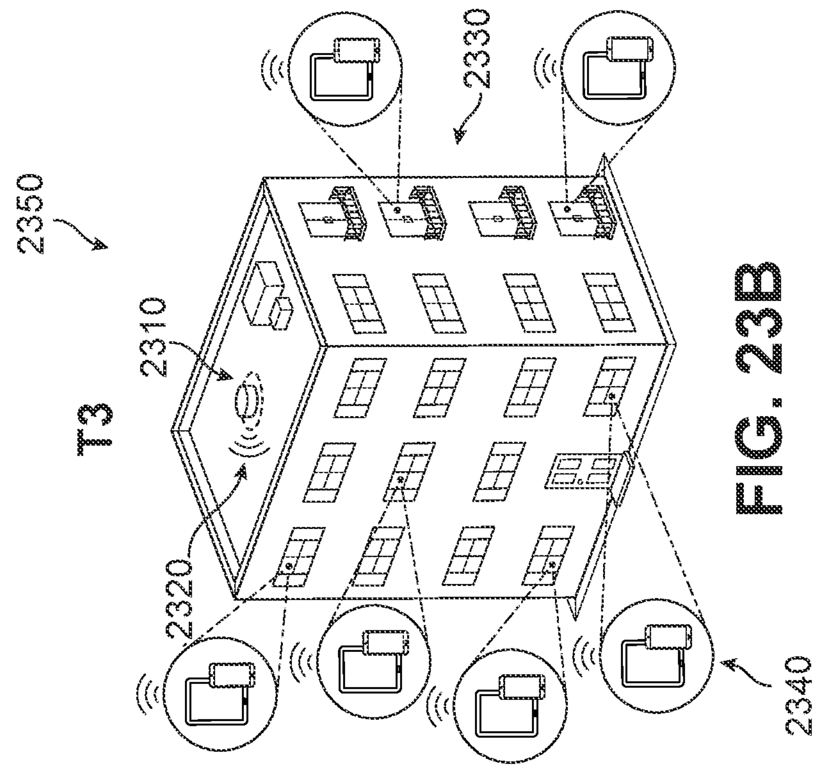
FIGS. 23A and 23B depict an example of a communication relay device as it is delivered to a structure, according to an embodiment.
Figure 23A:
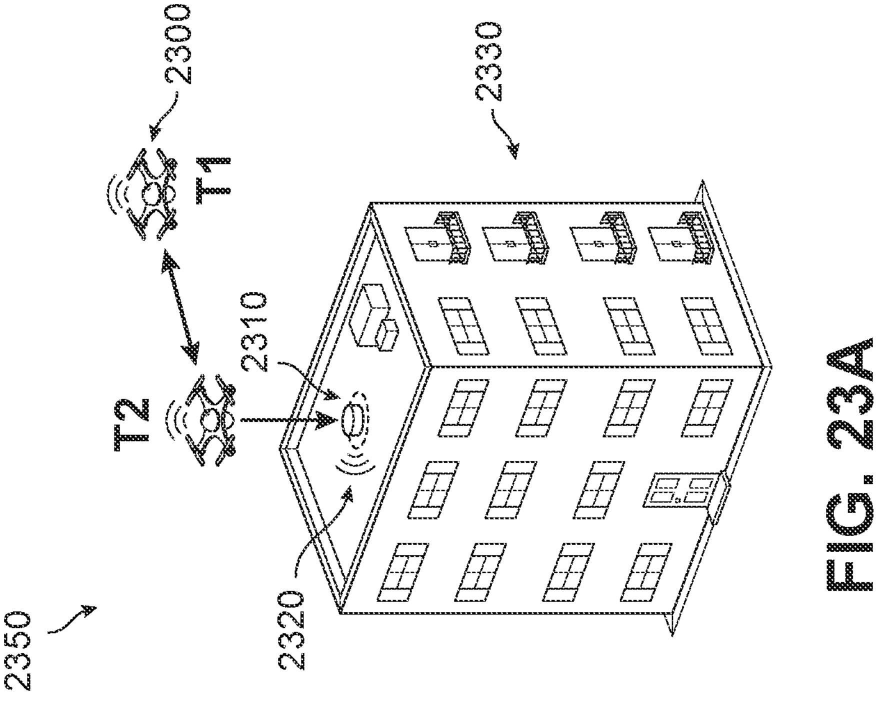

Additional details regarding the implementation of an ad-hoc mesh network employing one or more stationary communication relay devices will now be provided with reference to FIGS. 23A-27. In FIGS. 23A and 23B, for purposes of introduction, an overview of one embodiment of a mesh network deployment or distribution of communication devices is illustrated. As discussed, in some embodiments, the drone communications system can create a mesh network to provide emergency communication services at an outage location. In order to improve the stability and coherence of such a network, as well as extend its longevity and lower costs of operation, in some embodiments, the mesh network can employ one or more non-aerial vehicle communications devices, also referred to herein as a communications puck (or simply "puck"), or a communications node device. In different embodiments, these devices can serve some similar functions as a Wi-Fi hotspot device. In some embodiments, the puck can include all of the same communications capabilities as the communications drones described above, but rather than be housed in a mobile vehicle, would be provided as a portable stationary device that can be deposited in the designated mesh sites as part of the assignments generated by the drone communications system. In some embodiments, a drone can carry one or more of these pucks and strategically place the pucks in optimum locations. One example is on the roof of an apartment building or in a townhouse community. The pucks could provide wireless service to nearby members within range of the puck.

For purposes of illustration, in FIG. 23A, a fifth UAV 2300, carrying a first communications puck 2310, is shown approaching a second building 2330 in an impacted region 2350. At a first time T1, the fifth UAV 2300 performs, via onboard sensors, a survey of its local area at or near the site/coordinates designated by the deployment strategy and flight plan, and determines there is a stable, safe landing zone 2320 atop of second building 2330. At a second time T2, the fifth UAV 2300 has moved to a position directly above the landing zone 2320 and dropped or disposed communications puck 2320. At a third time T3 depicted in FIG. 23B, the fifth UAV has departed from the area, leaving the communications puck 2320 to self-activate (or activate in response to a control signal generated by the fifth UAV indicating successful deposit of the communications puck 2320) and transmit a signal seeking to connect to any nearby mesh devices including other communication drones and other communications pucks. Thus, in different embodiments, these pucks can be left at multiple sites per the flight plan created by the drone communication system and each puck can serve as a node of the ad-hoc mesh network described above (e.g., see FIGS. 17-22). Computing devices 2340 that are within range of the network emanating from the communications puck 2320 can then transmit data via the communications puck across other nodes of the mesh network to an operational base station.

In still other examples, the same device could be distributed to serve as a memory receptacle for local messages and other content in the context of a messenger (shuttle) network, as described above (e.g., see FIGS. 10-16). In some embodiments, the puck could be stationed at a site that would serve residents in a target location (e.g., housing community, government building, etc.). The puck would then be available and accessible in a continuous mode to any local computing devices to receive and store messages. In other words, rather than require end-users to be in range during a scheduled stop by a UAV as it shuttles from one waypoint to another, the end-user would be free to draft and send their content to the local puck, and then depart the premises. The puck would then hold the messages in secure storage until a UAV shuttle made a scheduled stop within communication range of the puck. These messages-representing several hours or days of content from a large group of residents or neighborhood-could then be retrieved by the UAV shuttle and stored in its onboard memory. In addition, once an aerial drone flies by, the puck can receive messages from the drone and later send those messages to members in range.

Figure 24:
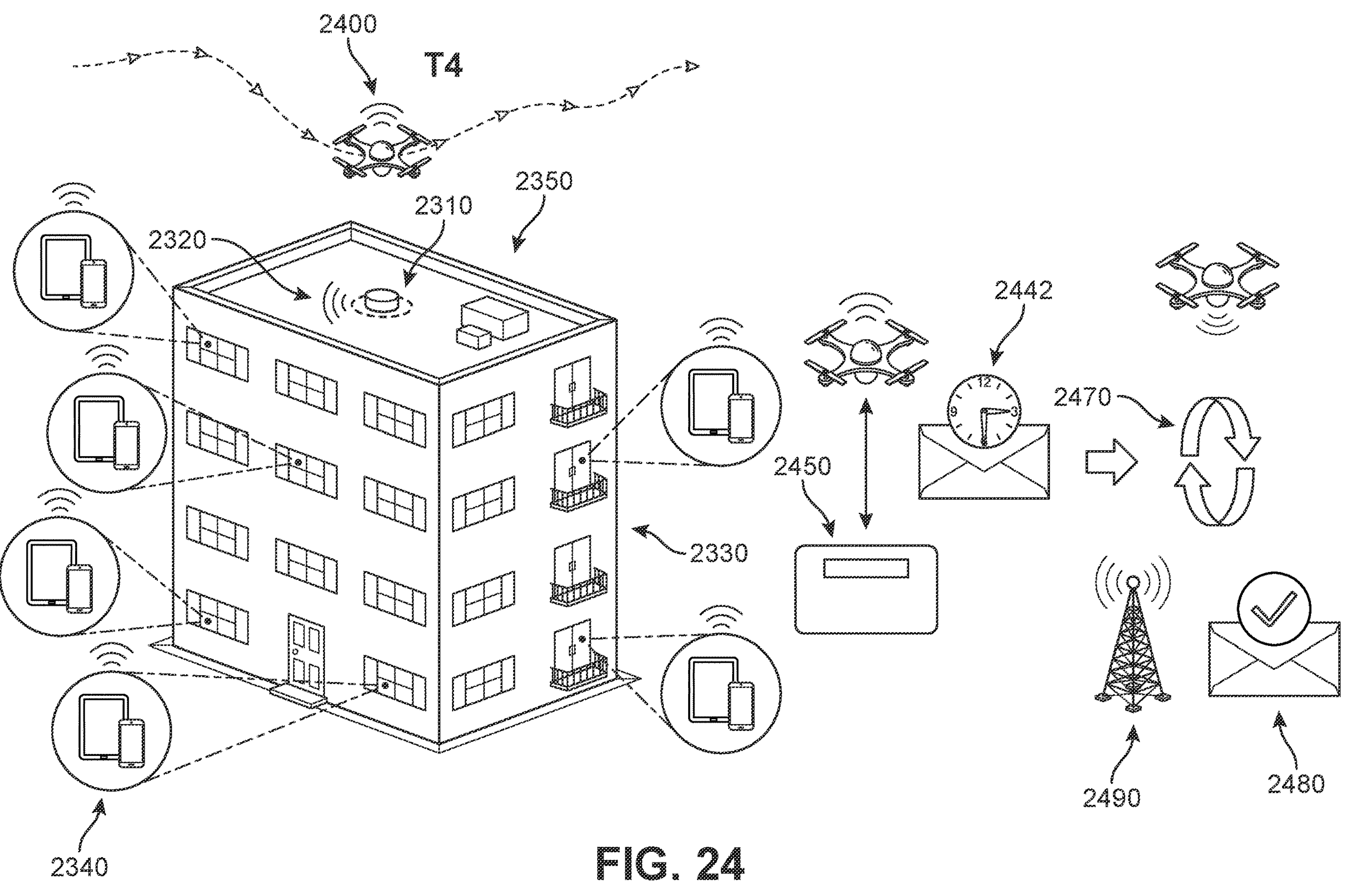
FIG. 24 is a schematic flow diagram showing the transmission of data between the communication relay device and local computing devices, and the subsequent passing of this data to a cell tower, according to an embodiment.

One example of this process is depicted in FIG. 24, where the puck 2310 is again deposited at landing zone 2320, but the second building 2330 is no longer at a site that is part of a mesh network. Instead, the puck 2310 serves as a waystation that includes a network and memory for purposes of wirelessly receiving data from local computing devices 2340 that will be held pending the arrival of a shuttle drone 2400. This is depicted as occurring at a later fourth time T4, as the shuttle drone 2400 triggers retrieval of messages 2442 from a memory 2450 of the puck 2310. The shuttle drone 2400 then continues to its next waypoint. When it arrives at the waypoint that is in range of an operational cellular tower 2490, the shuttle drone 2400 performs a data transfer session 2470 by which the messages 2442 that had been 'picked up' by the shuttle drone 2400 are successfully transmitted outside of the impacted region 2350 and delivered to the designated recipients 2480.

Figures 25A, 25B:
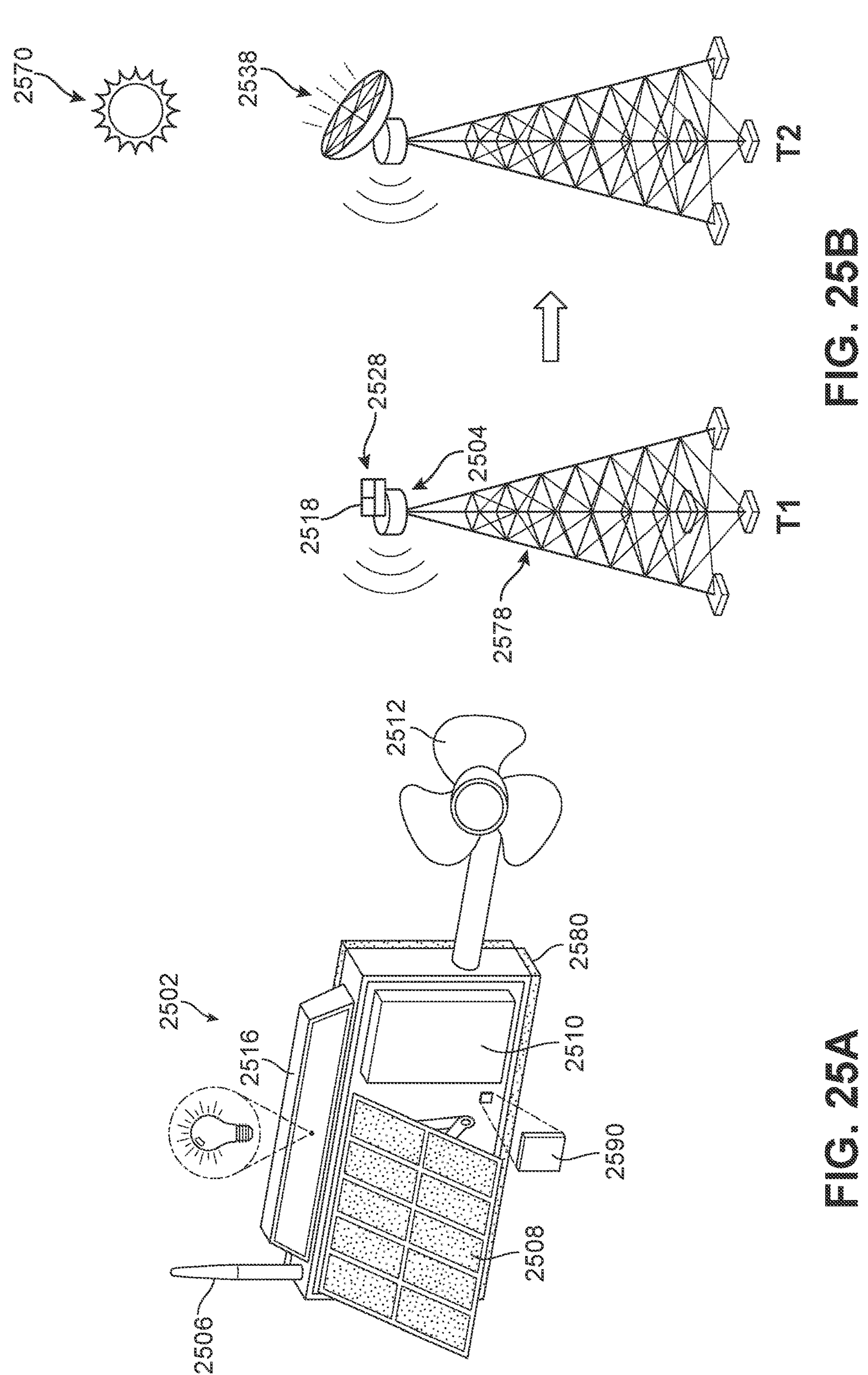
FIG. 25A depicts an example of a communication relay device or "puck", according to an embodiment.
FIG. 25B shows an example process by which a solar panel for a deployed communication relay device may be unfolded to capture solar energy, according to an embodiment.

Referring now to FIG. 25A, one example of a puck communications device ("puck") 2502 is provided. It should be understood that the depicted device is only an example, and the described components and functionality of said device can be provided in a different configuration than the one shown in FIG. 25A. In addition, the size, shape, and form factor of the puck 2502 can vary from that depicted in the drawings, and can for example include a substantially flat three-dimensional shape, or a cylindrical shape, a rectangular-prism shape, and/or an irregular shape. In some embodiments, the size of the puck can vary based on the size/model of the battery, processor, memory, antenna, and charging components. In different embodiments, the puck 2502 can be installed on a tower, roof, balcony, along the side of a building, a billboard, tree, or other tall structure that promotes communication with a UAV as it is flying by. The puck 2502 can be self-supporting (e.g., with a set of legs or a base) or can be affixed to an already existing structure (e.g., via a magnetic material 2580). For example, some pucks can include a magnetic bottom or side so the puck can be magnetically attached/secured to any metal object or surface or building. In FIG. 25A, a magnetic portion extends and covers the bottom of the puck 2502 as well as a side surface of the puck 2502, allowing the puck 2502 to be deployed and magnetically fastened via its bottom or its side against a metal surface.

The hardware assembly of the device can optionally include user control components (e.g., a power on/off switch, range adjustment, mode selector, charging indicator light, etc.) and/or one or more sensor(s). In some embodiments, a puck can also include a fire or heat resistant coating, be water-resistant or waterproof, and/or include provisions for floating, such as an automatically triggered self-inflating tube or bag, or a foam casing that is buoyant.

In different embodiments, the proposed puck apparatus can include a high-capacity battery that enables continuous operation over several days or multiple weeks. The battery can be charged before the puck is deployed and/or on site via solar panels disposed along an exterior surface of the puck and/or solar panels connected by wire to a charging cord connected to the puck's battery. In one example, the puck can be deposited in a site and pose/orientation that maximizes its solar panels' solar exposure.

In some embodiments, the puck 2502 includes provisions for powering the device components, as well as enabling communication between the device and a local user device, a central server, and/or a UAV. In some embodiments, power source 2510 is a rechargeable battery, which may be recharged by a charger cable connected to the local electric supply, wirelessly, or a solar powered battery that can be charged by solar cells. In one embodiment, the device 2502 includes one or more solar panel(s) 2508 distributed across an external surface of the device, and is connected to power source 2510 (e.g., onboard battery) for charging. As one non-limiting example, referring briefly to FIG. 25B, some pucks—such as a solar-powered puck 2504, deposited on and secured to a tower 2578, can include a solar apparatus 2518. The solar apparatus 2518 at a first time T1 is in a stowed configuration 2528—for example, when the solar-powered puck 2504 is being transported via a UAV either during deployment or post-disaster retrieval and recovery of the pucks (streamlining the packaging and ease of transport on the UAV), or at nighttime, or other weather conditions that are not conducive to solar charging activity. At a second time T2, solar panels folded within the solar apparatus 2518 can unfold or otherwise deploy, shifting to a charging configuration 2538 that can capture solar energy and increase the puck's operational run time.

However, returning to FIG. 25A, various other embodiments also contemplate alternate or additional independent power supplies including, but not limited to: batteries and re-chargeable power sources (e.g., energy harvesting sensors/batteries), kinetic energy mini-generator devices, vibration harvesting devices, or a wind turbine 2512, and the like. In some embodiments, the hardware assembly of the puck can be completely self-contained, locally including the necessary software to work without a network (internet) connection. In one example, the solar panel 2508 can be used to charge the battery 2510 when the sun is shining, and the wind turbine 2512 can be used to charge the battery at night where there is a breeze.

In optional embodiments, the puck 2502 also includes an image sensor, such as a camera. The camera can be a still camera or a video camera. In some embodiments, the camera can be used to identify information about the puck's surroundings and any person who may attempt to interact with the puck 2502. In one embodiment, the puck 2502 includes a weather detection system which can include one or more of a barometer, a temperature gauge, a thermal detector, an air quality gauge, a humidity gauge, a wind speed detector, and a UV detector. Other onboard sensors can include smoke/fire/heat sensors, carbon monoxide/dioxide sensors, infrared sensors, ambient light sensors, temperature sensors, humidity sensors, and the like, each of which may be configured to send messages to the UAV during its flyover for updating the drone communications system with a local conditions report.

In another embodiment, the puck 2502 can incorporate one or more internet of things (IoT) device(s) ("smart sensors"). Smart sensors could comprise any of a variety of different IoT devices, such as one or more of a pressure sensor, chemical sensor (for detecting smoke, carbon monoxide or other chemical compositions), temperature sensor, magnetometer, smoke/flame detectors, moisture sensor, electrostatic sensor, volume/sound sensors, light sensors, aerosol characterization sensors, and other smart devices that may include one or more sensors. Supplemental data from smart sensors can be received by the remote server and used to determine areas of concern with more precision.

Furthermore, in order to perform its target/primary functions, puck 2502 can include a device to transmit and receive information, such as a radio signal receiver and transmitter 2506. The radio signal receiver and transmitter can transmit radio signal information to a computing device in proximity to the puck 2502, as well as to a UAV and/or remote server. Thus, each puck will include a transmitter and a receiver, and is configured to function as a communications bridge for other devices. In one example, each puck has an antenna that enables inter-puck/drone (puck-to-puck or "mesh") communication. The strength and range of the antenna can vary, but will typically provide a range up to and beyond four miles.

In addition, each puck can include provisions for communicating with, and processing information from, other computing devices. Thus, the puck 2502 include one or more processors and memory 2590. Memory 2590 may comprise a non-transitory computer readable medium. Instructions stored within memory may be executed by the one or more processors. In addition, as noted above, each device may include a communication system such as a radio or other provisions for communicating using one or more communication methods. For example, each communication system could include a Wi-Fi radio, a Bluetooth radio, and/or a cellular network radio.

In some embodiments, the nodes can include additional components, such as lighting apparatus 2516 and speaker devices. The lighting apparatus 2516 can assist communities by serving as an emergency beacon when urgent conditions or events are indicated by one or more resident's messages/content. In different embodiments, some pucks can be configured to change colors or provide some other indication that it has received an emergency message from a local computing device. In one embodiment, a puck can emit a red light to indicate that it has received an emergency message that requires priority and to expedite response (drone message retrieval) times. UAVs in the area that observe this red beacon can immediately respond or inform the drone communications system and/or emergency service providers of the emergency. As one example, referring to FIGS. 26 and 27, a first resident 2610 with a mobile computing device 2650 (e.g., smartphone) within signal range of a puck is shown requesting, via communications app 2660, that an emergency message 2604 regarding their father's health be transmitted. The communications app 2660, in response to the user's indication that this message corresponds to an emergency event/condition, presents a notification 2602 that the message will be immediately transmitted. The first resident 2604 can monitor the status of the message via a dashboard option 2606 and learn whether and when the content of the message has been retrieved by a UAV of the ad-hoc network, and if any emergency services have been deployed to their location.

Figure 27:
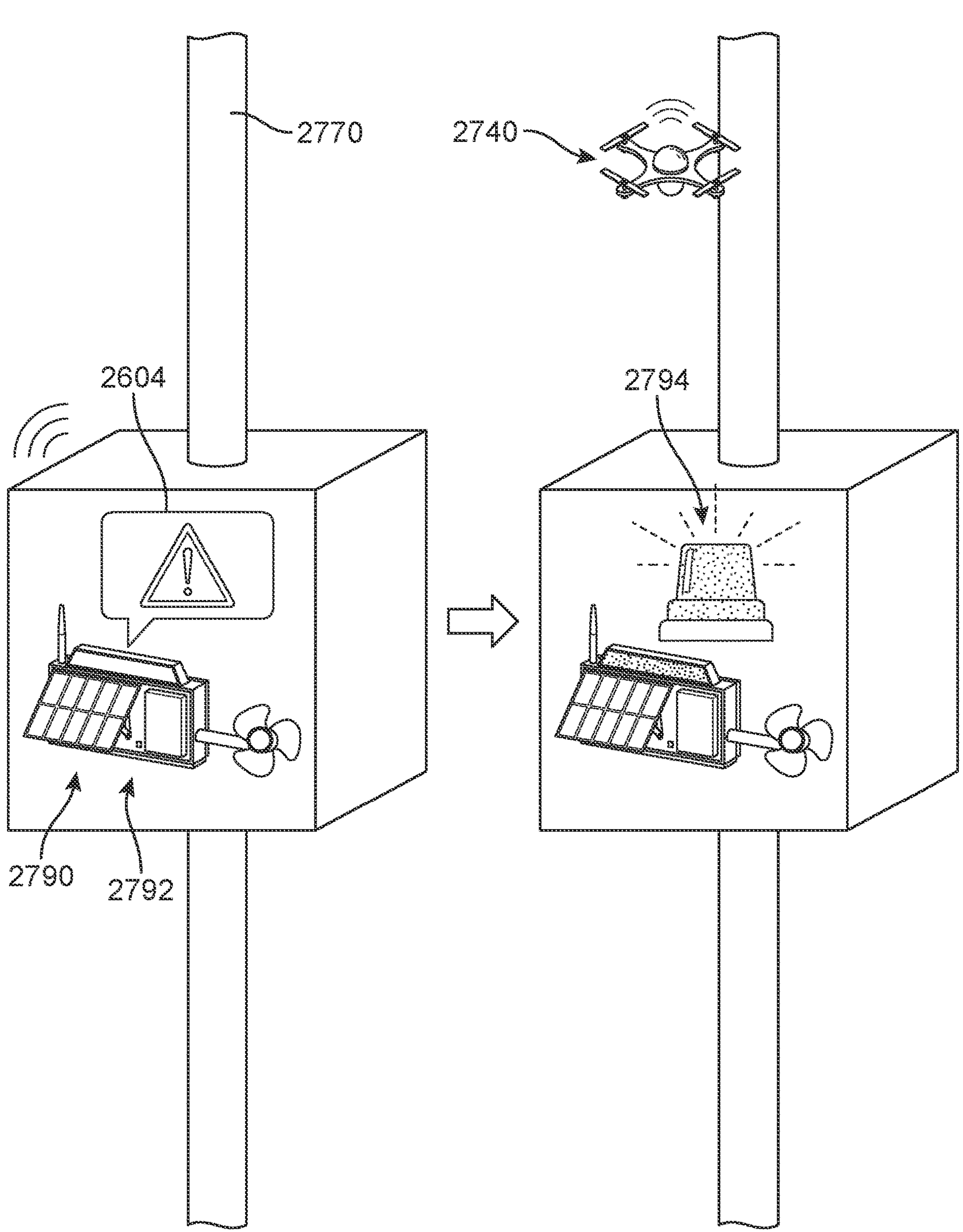
FIG. 27 is a schematic flow diagram showing an example process by which emergency messages can trigger a change in the appearance of a communication relay device, according to an embodiment.

In FIG. 27, a local puck 2790, installed on a tower 2770 near the first resident's location, receives the emergency message 2604 and, in response, transitions from a standard or normal status mode 2792 to an urgent status mode 2794. In some embodiments, the urgent status mode 2794 can trigger the presentation of a visual signal, such as a bright light, a pre-selected light flash pattern, a specific light color (e.g., red, orange, etc.), that is especially visible over long distances. In some embodiments, the light may be infrared but detectable by UAV sensors 2740. Once a nearby UAV detects the puck's indication of an emergency, it can automatically prioritize the retrieval of messages from that puck by altering its trajectory and instead flying directly to the puck and enter its signal communications range. Once the message is retrieved, the UAV can then immediately travel to a relay station such as an operational cell phone tower to ensure the urgent message receives precedence.

As noted earlier, in different embodiments, the drone communications system can include provisions for refueling (also interchangeable referred to herein as recharging) its drone fleet. In some embodiments, this process can occur while members of a drone party are still deployed. In other words, rather than requiring each communications drone to return to their "home base" (e.g., UAV repository) to refuel, the drone communications system can provide one or more specially outfitted refueling UAVs that can be dispatched to the drone at its current location in the mesh network and/or at or near one of its waypoints to reduce any downtime in the ad-hoc network and maximize the runtime of each drone while it continues to provide communication services to the impacted area.

Figure 28A:
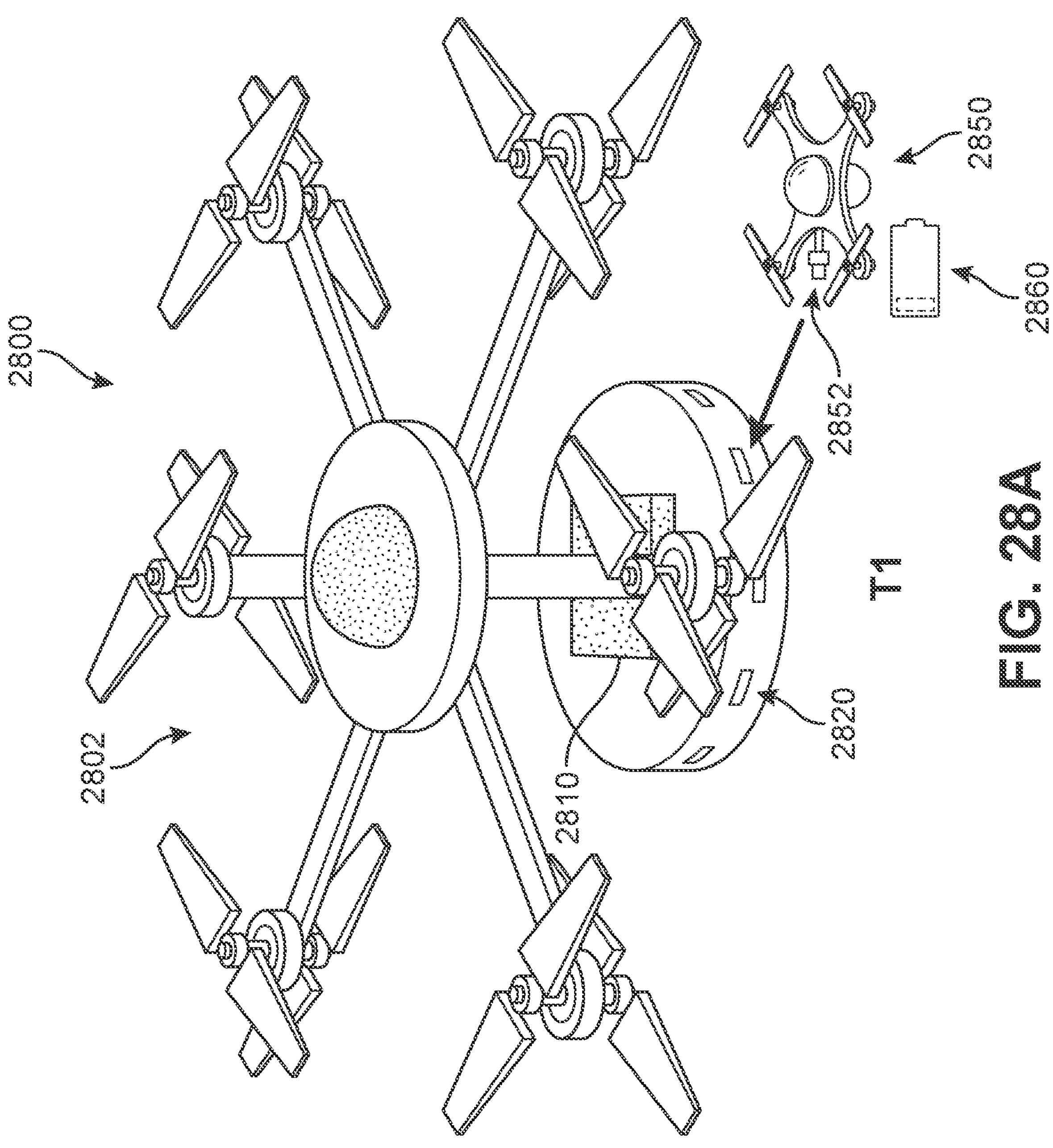
FIGS. 28A and 28B depict an example of a communication drone docking with a refueling drone and complete a refueling, according to an embodiment.

For purposes of illustration, some examples of this type pf dynamic, on-site operation are shown in FIGS. 28A-31. In FIG. 28A, a first refueling drone 2800 is depicted, hovering in mid-air at a first site 2802 that is near to (i.e., within 500 feet) the current location of a first communication drone 2850. In other words, the drone communications system has deployed the first refueling drone 2800 with a flight path that brings the drone to first site 2802 at a first time T1, when the first communication drone 2850 has reached a critical battery level threshold 2860. In different embodiments, the first refueling drone 2800 includes a large capacity battery 2810 with enough reserves to fully charge five or more depleted communication drones and still make the return journey to the UAV repository. In different embodiments, the first refueling drone 2800 can also include provisions for transferring power to another drone. In one embodiment, the refueling drone comprises a large quadcopter capable of accommodating several drones on its upper deck to allow for simultaneous charging of multiple drones.

Figure 28B:
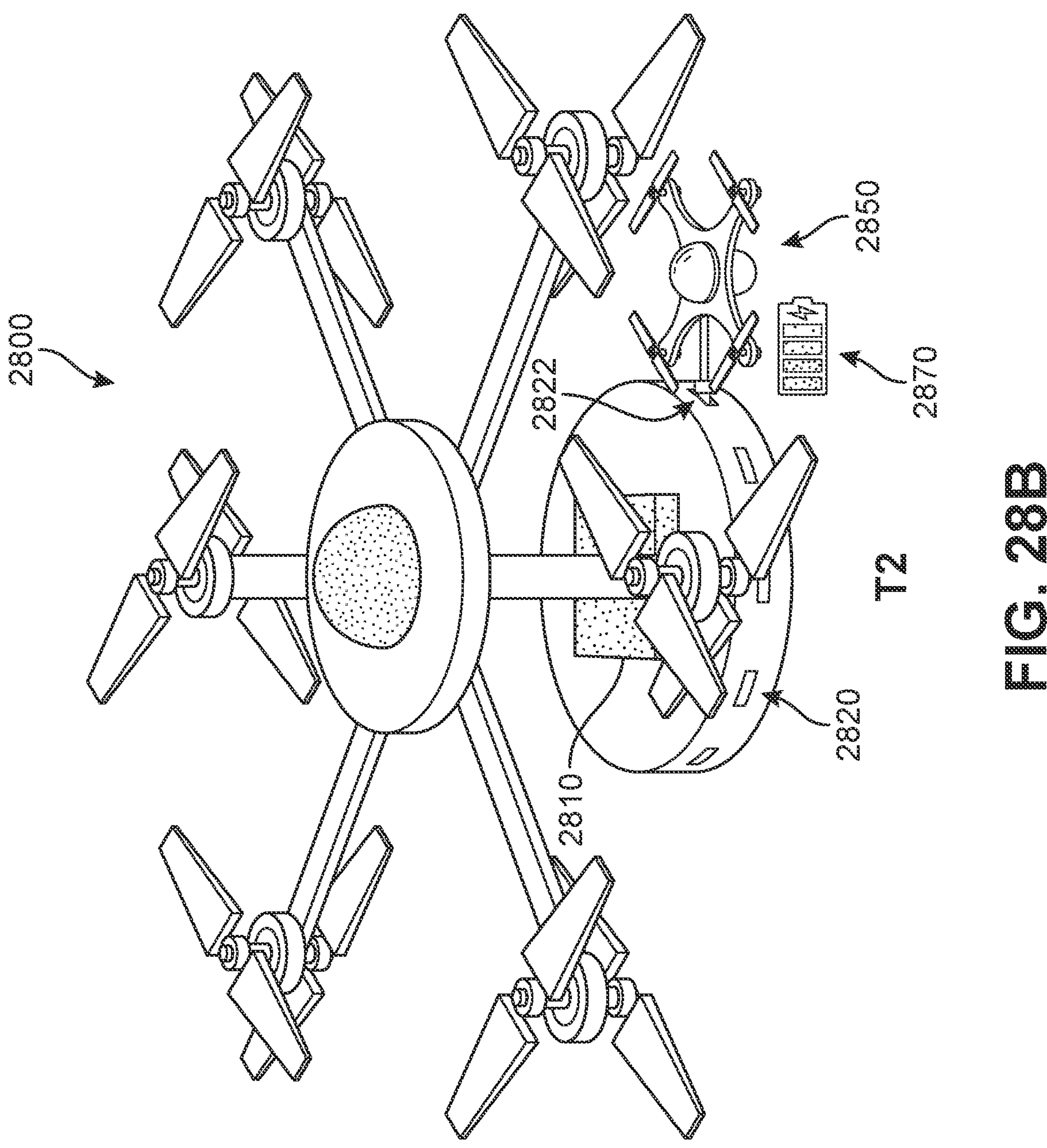

For example, in FIGS. 28A and 28B, the first refueling drone 2800 includes a plurality of charging ports 2820, comprising recessed apertures that are configured to mate or otherwise connect with a corresponding charging connector 2852 that can protrude from the housing of the first communication drone 2850. These two components are arranged to form a stable connection in mid-air. In other embodiments, the charging ports 2820 can comprise protruding portions (male connectors) while the communication drones can include recessed apertures (female connectors) that can be mated mid-air.

For example, as shown at a second time T2 in FIG. 28B, the first communication drone 2850 has traveled the remaining distance between the two devices and docked with a first charging port 2822. In some embodiments, the first refueling drone 2800 can include provisions for fast-charging, and in some cases within only a few minutes the first communication drone 2850 can be sufficiently charged 2870. In some embodiments in which the drone party has formed a mesh network, the first refueling drone 2800 can be deployed to a site directly adjacent to the target communication drone and perform a recharging event while the communication drone continues to serve as a node in the mesh network, thereby ensuring continuous coverage. In another example, in cases where the drones are forming a messenger network, the first refueling drone 2800 can travel to a waypoint to which the communication drone is assigned. When the communication drone arrives at this waypoint, it can dock with first refueling drone 2800 and simultaneously perform its data exchange session of receiving new messages from residents and delivering to the residents any content from friends and family, etc. while being recharged, thereby maintaining its flight path schedule without interruption.

Figure 29:
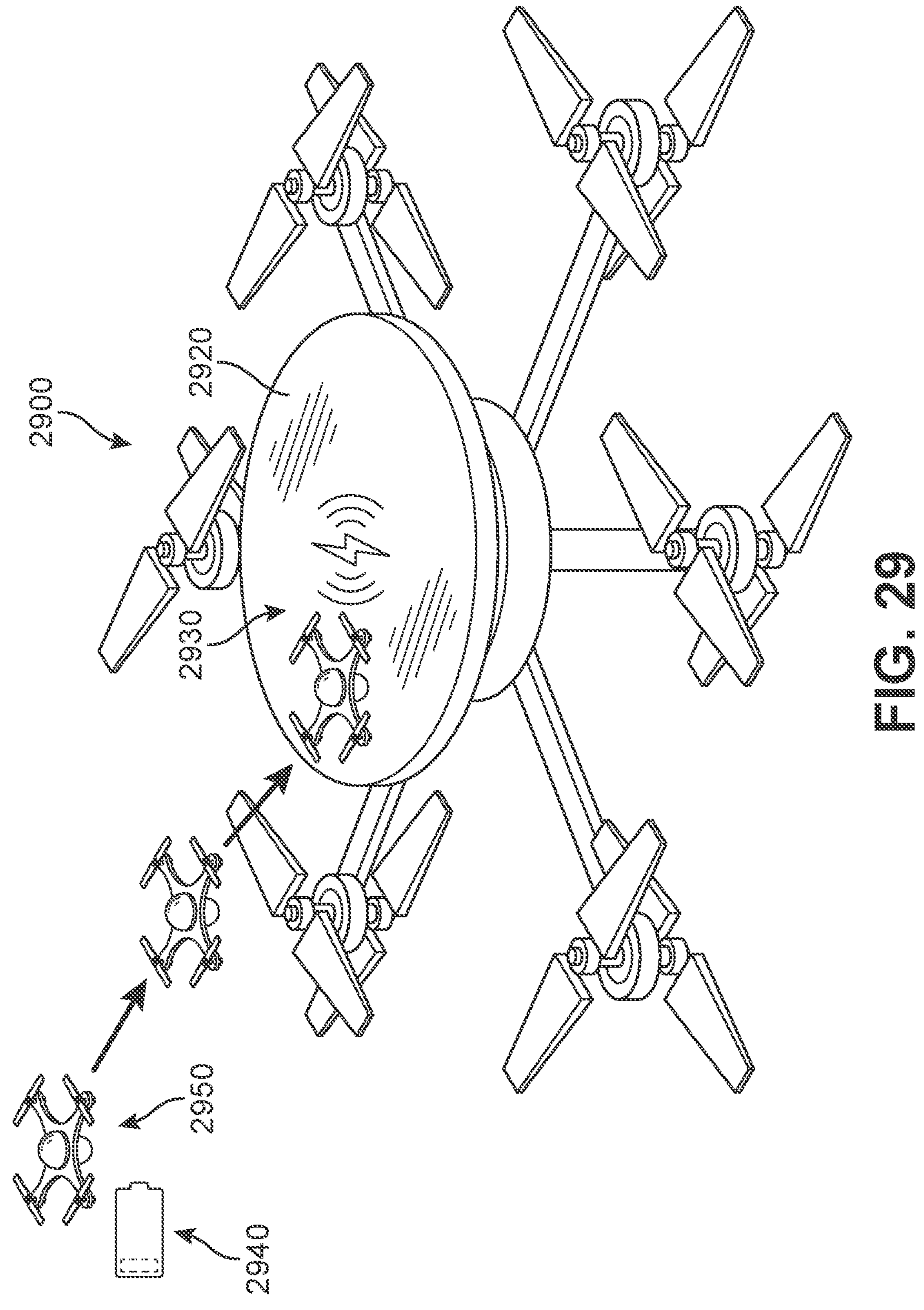
FIG. 29 presents another example of a refueling drone that includes a landing pad with wireless charging capabilities, according to an embodiment.

Some alternate examples of refueling drones are now discussed with reference to FIGS. 29, 30, and 31. In FIG. 29, a second refueling drone 2900 is depicted, having traveled to a second site that is near to a second communication drone 2950 that is serving as a member of a drone party forming an ad-hoc network. The second refueling drone 2900 differs from the refueling drone of FIGS. 28A and 28B in that rather than including charging ports, has a landing pad 2930 provided along its upper deck. Thus, in some embodiments, the recharge point comprises a landing pad so the communication drone can land on a surface of the refueling drone and receive charge. In this example, the second communication drone 2950 is shown with a low battery 2940 as it navigates to a position directly atop the landing pad 2930. In some embodiments, as soon as the second communication drone 2950 makes contact with the landing pad 2930, a wireless charging event 2930 can be triggered, whereby the onboard battery for the second refueling drone 2900 automatically transfers power to the battery of the second communication drone 2950 via the landing pad 2930 (surface-to-surface proximity charging).

Thus, in different embodiments, the second refueling drone 2900 can include a wireless charging component. Wireless charging components can send and receive wireless power (electricity) using magnetic resonance or electromagnetic induction. For example, a particular type of wireless power that may be used by the onboard wireless charging component may be Qi charging. The Qi standard is an open interface standard that defines wireless power transfer using inductive charging over distances up to 4 cm. The system uses a charging pad and a compatible device, which may be placed on top of the pad, charging via resonant inductive coupling. However, Qi charging is only any example and other forms of wireless charging such as Power Matters Alliance (PMA) charging may be used in other embodiments. Thus, while the wireless charging is referred to as Qi charging by way of example in this disclosure, this is not to be taken as limiting. Also, in some embodiments, the wireless power (which may be Qi charging) may not be limited to transmitting power, but may also serve as a carrier for data. The wireless charging component may communicate updates from the drone communication system and/or other drones that have previously charged at this refueling drone, and/or receive updates from the communication drone that can be shared with other drones that will be charged at the refueling drone.

Figure 30:
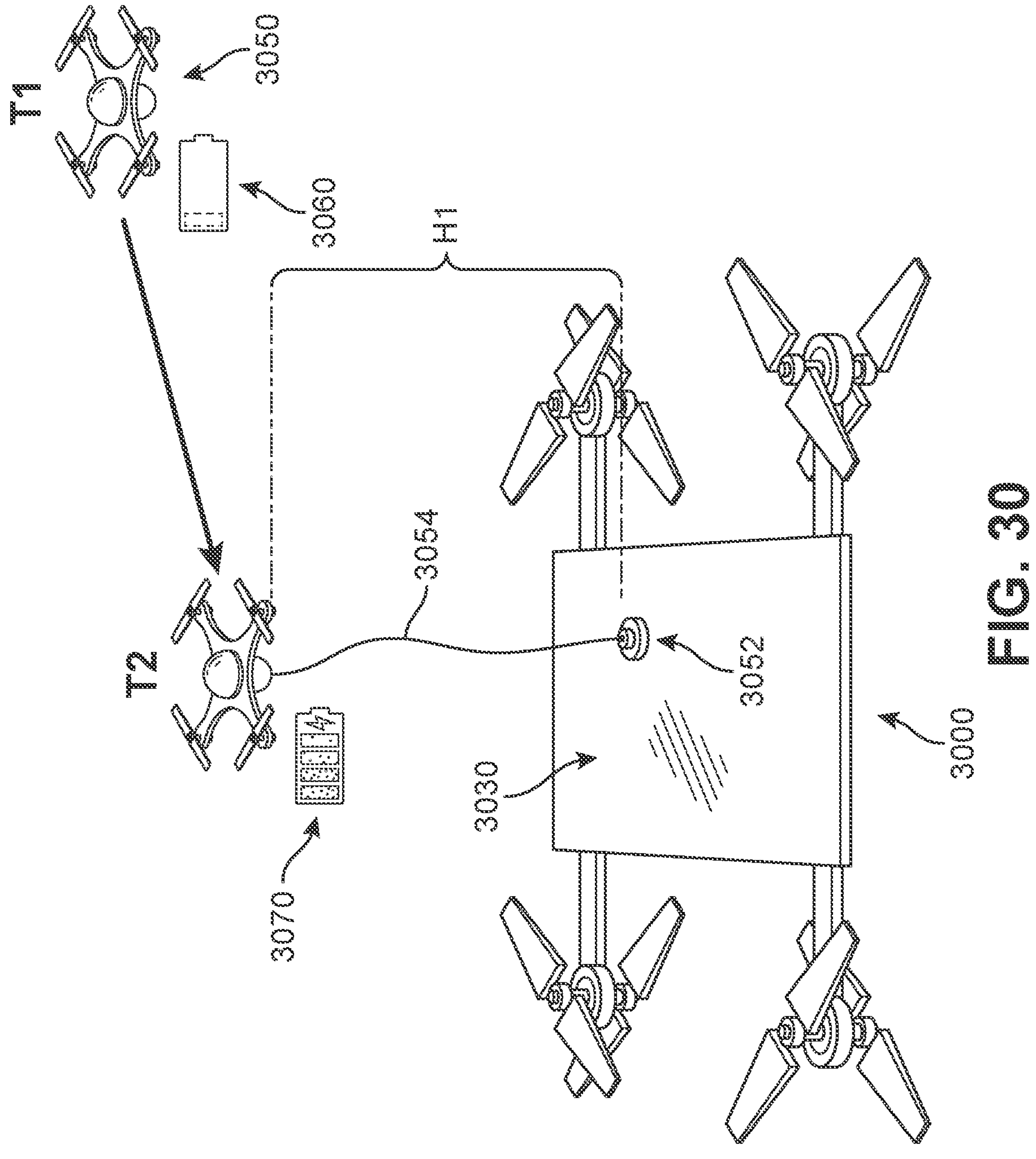
FIG. 30 presents another example of a refueling drone that includes an upwardly-facing surface with magnetic fasteners for connecting with a tether dropped down from a communication drone, according to an embodiment.

In FIG. 30, another example is illustrated by depiction of a third refueling drone 3000. The third refueling drone 3000 has traveled to a third site that is near to a third communication drone 3050 that is serving as a member of a drone party also providing an ad-hoc network. The third refueling drone 3000 differs from the refueling drone of FIGS. 28A, 29B, and 30 in that rather than including charging ports or a landing pad, there is a magnetic fastener platform 3030 provided along its upper deck. The third communication drone 3050 is shown as it approaches, with a low battery 3060, covering the short distance to hover directly above the third refueling drone 3000. As shown in FIG. 30, in some embodiments, the recharge point can comprise a magnetic fastener portion 3052 that can extend across the upper surface area of the magnetic fastener platform 3030. The third refueling drone 3000 could then accept a metallic charging tether 3054 lowered from the third communication drone 3050 that would be attracted to the magnetic fastener portion 3052. Once the tether 3054 becomes attached or bonded to the magnetic fastener portion 3052, onboard batteries 3070 of third communication drone 3050 can be recharged through the tether 3054. In this case, the third communication drone 3050 simply maintains a relative position of a vertical distance or height H1 above the third refueling drone 3000 and unwinds or lowers its cable or tether 3054 until the distal end of the tether 3054 contacts the surface of the magnetic fastener platform 3030. Once contact is detected, the charging process can be automatically initiated and continue for as long as the tether is in contact with the platform or the communication drone's onboard battery is fully charged or the refueling drone's high-capacity battery is depleted.

Figure 31:
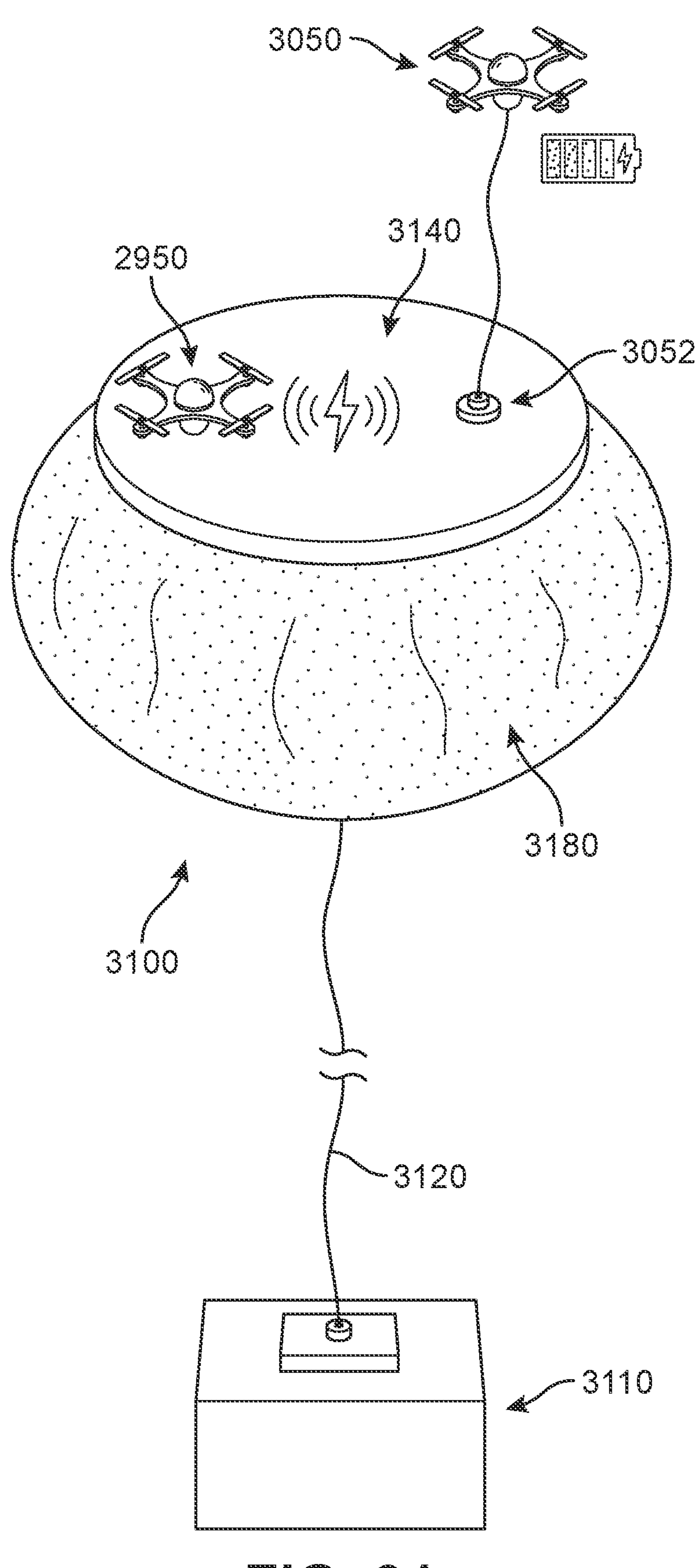
FIG. 31 presents another example of a refueling drone that includes a gas-filled balloon and a landing pad with wireless charging capabilities as well as magnetic fasteners, according to an embodiment.

Moving now to FIG. 31, another example of a refueling operation is depicted. In FIG. 31, a fourth refueling drone 3100 comprises a lighter-than-air craft or blimp 3180. In some cases, the blimp 3180 can itself be tethered to the ground via a cable 3120 and receive line power through the tether so it remains fully charged at all times via power source 3110. Some cables for tethered drones include one or more fiber optic elements for communications, and/or materials such as Kevlar®, Vectran®, Spectra®, Dyneema®, and other materials, including braided materials, that allow for the transfer of power and data between the ground vehicle and the airborne beacon.

In some embodiments, fourth refueling drone 3100 can include a large upper flight deck-based landing pad 3140, similar to that described with respect to FIG. 29 that can accommodate several landed communications drones at once (such as second communication drone 2950) and provide a base for wireless charging functionality. The upper flight deck can also include a large number of magnetic fasteners 3052 so the fourth refueling drone 3100 can recharge both those drones that have landed on the landing pad 3140 as well as drones (e.g., third communication drone 3050) hovering above the flight deck that have lowered their charging cables to connect to the magnetic fasteners provided on the portions of the upper surface of the landing pad 3140.

In different embodiments, the UAVs described herein can include gas bags(s) filled with lifting gases powered with propellers and controlled through rudders. For purposes of this disclosure, such a drone may also be referred to as an aerostat. Aerostats are lighter than most other types of UAVs, and typically refer to unpowered balloons or dirigibles that gain lift through the use of a buoyant gas. Dirigibles are lighter-than-air aircraft, such has an airship or dirigible balloon, that can navigate through the air under its own power. Dirigible UAVs may gain their lift from a gas bag(s) filled with a lifting gas, such as hydrogen or helium, that is less dense than the surrounding air. Similar to rotary-wing UAVs (see below), dirigible UAVs may be employed to hover within a proximity of a fix position. However, dirigible UAVs generally use a more limited amount of energy than either rotary-wing or fixed-wing UAVs.

In some embodiments, a dirigible UAV as shown in FIG. 31 may comprise one or more gas bags filed a lifting gas coupled to a rudder to steer the UAV and a propeller of some form to provide motion. The propeller may be coupled to an engine, which may include, but is not limited to, an internal combustion or solar powered engine, to provide power to the propeller. Additionally, dirigible UAVs may contain a mechanism to release or filled the gas bag(s) with the contained lifting gas. Such a mechanism may be coupled to a compressor that contains the appropriate lifting gas under pressure. In some examples, a dirigible UAV may be free floating. In some embodiments, the mechanism can be activated or triggered via an activation signal generated by the drone communication system following a charging decision event.

As shown in the drawings, in some examples, an aerostat UAV may be anchored to the ground vehicle and connected to its power source by, for example, one or more cables. In such examples, the anchors/tether can be employed to steer (e.g., wrench) a respective aerostat UAV into position. In some embodiments, dirigible UAVs may optionally include a height sensor, a processing unit, a compressed lifting gas storage device, an intake valve, and a release value. The height sensor may determine a height and, based on instructions received from a relay control device (at the drone communication system or a communication drone) may determine, though the processing unit, to increase the buoyancy of the UAV by filling, though the intake value, the gas bag(s) with a determined amount of the lifting gas contained within the lifting gas storage device. Alternatively, the processing unit may determine, based on the received instructions, to decrease the buoyancy of the UAV by releasing a determined amount of lifting gas from the gas bag(s) though the release value.

In other embodiments not illustrated in the drawings, the engines for a UAV may include internal combustion engines that consume various forms of fuel or use solar energy collected using on-board solar panels. In other embodiments, the drones can alternatively comprise a fixed-wing type UAV that includes a rigid wing that has a predetermined airfoil, which make flight capable by generating lift caused by the UAV's forward airspeed. This airspeed is generated by forward thrust by the means of, for example, a propeller being turned by an internal combustion engine or electric motor, or a jet engine. Control of this type of UAV comes from control surfaces built into the wing itself, these may also include ailerons, an elevator, and a rudder. The elevator controls the pitch (lateral axis). The ailerons control the roll (longitudinal axis). The rudder controls the yaw (vertical axis). A fixed-wing aircraft, such as, for example, a kite or glider, may also glide on moving air. Variable-sweep wing aircraft as well as aircraft that employ wing warping are also considered fixed-wing UAVs.

In still other embodiments, the drones can comprise UAVs that are rotary-wing type aircraft. A rotary-wing type UAV includes one or more rotor blades or wings that revolve around a fixed mast. During flight, the fixed mast revolves many times per minute. A rotary-wing UAVs obtains lift resulting from the constant movement of the rotor blades rotating around the mast producing the required airflow over blades. Rotor blades may be airfoil-shaped, or they may have a flatter slope. The entire assembly of rotor blades and fixed mast is called a rotor. The number of rotor blades and rotors on a given UAV may vary. A quadcopter has four arms, with a rotor on each arm. In some cases, an additional engine is used either for upward lift or forward thrust to reach greater heights and speeds. Rotors may be setup in various configurations. For example, a tricopter has twin rotors on each arm, one pointing upwards and one pointing downwards whereas an X8 consists of a quadcopter with twin motors on each arm. Other common types of rotary-wing UAV include helicopters, cyclocopters, autogyros, and gyrodynes.

Figure 32:
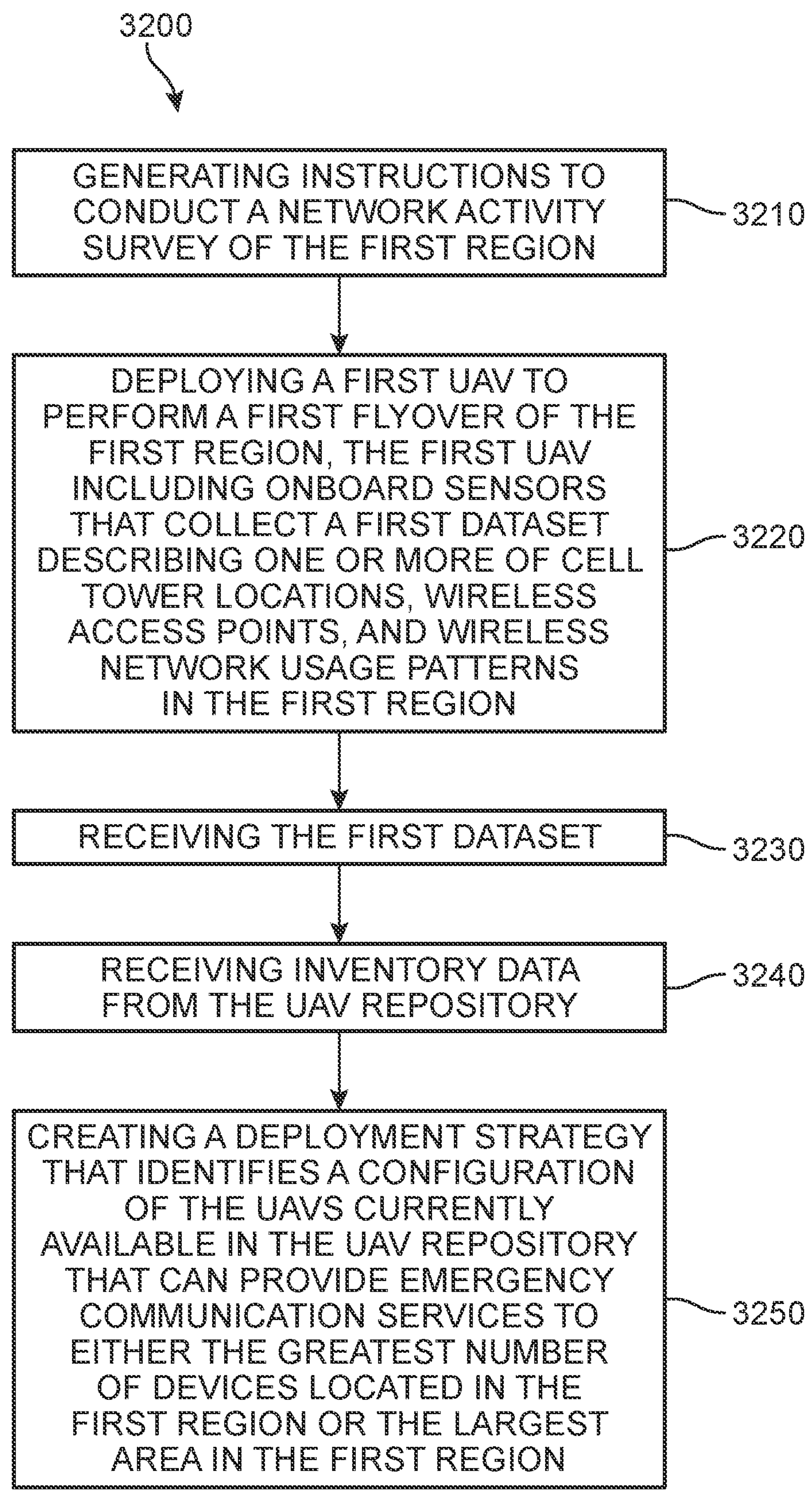
FIG. 32 is a flow chart depicting a process of creating a custom deployment strategy for one or more unmanned aerial vehicles (UAVs) to form an ad-hoc network, according to an embodiment.

FIG. 32 is a flow chart illustrating an embodiment of a method 3200 of creating a custom deployment strategy for one or more unmanned aerial vehicles (UAVs) to form an ad-hoc network. The method 3200 includes a first step 3210 of generating, by a drone communications system and in response to a prediction that a network outage will occur in a first region, instructions to conduct a network activity survey of the first region. A second step 3220 includes deploying, via a UAV repository and in response to the instructions, a first UAV to perform a first flyover of the first region, the first UAV including onboard sensors that collect a first dataset describing one or more of cell tower locations, wireless access points, and wireless network usage patterns in the first region. In addition, a third step 3230 includes receiving, at the drone communications system, the first dataset, and a fourth step 3240 includes receiving, at the drone communications system, inventory data from the UAV repository. Furthermore, a fifth step 3250 includes creating, based on the first dataset and the inventory data, a deployment strategy that identifies a configuration of the UAVs currently available in the UAV repository that can provide emergency communication services to either the greatest number of devices located in the first region or the largest area in the first region.

In other embodiments, the method may include additional steps or aspects. In some examples, the method includes additional steps of receiving, at the drone communications system, a second dataset including an environmental disaster forecast; and predicting, at the drone communications system and based on the second dataset, there is a high likelihood of an impending disaster event impacting the first region that will cause the network outage. In one example, the method also includes generating, by the drone communications system and based on the second dataset, a graphical heat map characterizing wireless network traffic for the first region, where the deployment strategy is based on the graphical heat map. In some embodiments, the configuration describes an arrangement of the UAVs to form either an ad-hoc mesh network or an ad-hoc messenger network. In another example, the method includes determining, at the drone communications system, that the inventory data indicates there is a sufficient number of UAVs available to form an ad-hoc mesh network in the first region, and the deployment strategy implements an ad-hoc mesh network. In some embodiments, the method also includes determining, at the drone communications system, that the inventory data indicates there is an insufficient number of UAVs available to form an ad-hoc mesh network in the first region, and the deployment strategy implements an ad-hoc messenger network. In one example, the method includes receiving, at the drone communications system, near-real-time operational data from a cellular network service provider, and the deployment strategy is further based on the operational data.

Other methods can also be contemplated within the scope of this disclosure. For example, a computer-implemented method of creating a custom deployment strategy for one or more unmanned aerial vehicles (UAVs) to form an ad-hoc network is disclosed. The method includes a first step of receiving, at a drone communications system, a first dataset including an environmental disaster forecast, and a second step of predicting, at the drone communications system and based on the first dataset, there is a high likelihood of an impending disaster event impacting the first region that will cause a network outage. The method also includes a third step of receiving, at the drone communications system, near-real-time operational data from a cellular network service provider for one or more cell towers in the first region, and a fourth step of receiving, at the drone communications system, inventory data from a UAV repository. In addition, the method includes a fifth step of creating, based on the operational data and the inventory data, a deployment strategy that identifies a configuration of the UAVs currently available in the UAV repository that can provide emergency communication services to either the greatest number of devices located in the first region or the largest area in the first region.

In other embodiments, the method may include additional steps or aspects. In some examples, the method includes generating, by the drone communications system and based on the operational data, a graphical heat map characterizing wireless network traffic for the first region, where the deployment strategy is based on the graphical heat map. In some embodiments, the configuration describes an arrangement of the UAVs to form either an ad-hoc mesh network or an ad-hoc messenger network. In another example, the method further includes determining, at the drone communications system, that the inventory data indicates there is a sufficient number of UAVs available to form an ad-hoc mesh network in the first region, and the deployment strategy implements an ad-hoc mesh network. In some embodiments, the method also includes determining, at the drone communications system, that the inventory data indicates there is an insufficient number of UAVs available to form an ad-hoc mesh network in the first region, and the deployment strategy implements an ad-hoc messenger network. In one embodiment, the method also includes generating, by the drone communications system and in response to the prediction, instructions to conduct a network activity survey of the first region.

In general, a cellular tower or network base station can be a cellular tower or other cell site, or other base station that serves as a hub or main communication point for one or more wireless mobile devices. The base station will typically include a transmission and reception station in a fixed location, consisting of one or more receive/transmit antenna, microwave dish, and electronic circuitry for handling network traffic.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smartphones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. For each of the exemplary processes described above including multiple steps, it may be understood that other embodiments some steps may be omitted and/or reordered. In some other embodiments, additional steps could also be possible. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of creating a custom deployment strategy for one or more unmanned aerial vehicles (UAVs) to form an ad-hoc network, the method comprising:

- generating, by a drone communications system and in response to a prediction that a network outage will occur in a first region, instructions to conduct a network activity survey of the first region;
- deploying, via a UAV repository and in response to the instructions, a first UAV to perform a first flyover of the first region, the first UAV including onboard sensors that collect a first dataset describing one or more of cell tower locations, wireless access points, and wireless network usage patterns in the first region;
- receiving, at the drone communications system, the first dataset;
- receiving, at the drone communications system, inventory data from the UAV repository; and
- creating, based on the first dataset and the inventory data, a deployment strategy that identifies a configuration of the UAVs currently available in the UAV repository that can provide emergency communication services to either the greatest number of devices located in the first region or the largest area in the first region.

2. The method of claim 1, further comprising:

receiving, at the drone communications system, a second dataset including an environmental disaster forecast; and predicting, at the drone communications system and based on the second dataset, there is a high likelihood of an impending disaster event impacting the first region that will cause the network outage.

3. The method of claim 1, further comprising generating, by the drone communications system and based on the second dataset, a graphical heat map characterizing wireless network traffic for the first region, wherein the deployment strategy is based on the graphical heat map.

4. The method of claim 1, wherein the configuration describes an arrangement of the UAVs to form either an ad-hoc mesh network or an ad-hoc messenger network.

5. The method of claim 4, further comprising determining, at the drone communications system, that the inventory data indicates there is a sufficient number of UAVs available to form an ad-hoc mesh network in the first region, and the deployment strategy implements an ad-hoc mesh network.

6. The method of claim 4, further comprising determining, at the drone communications system, that the inventory data indicates there is an insufficient number of UAVs available to form an ad-hoc mesh network in the first region, and the deployment strategy implements an ad-hoc messenger network.

7. The method of claim 1, further comprising receiving, at the drone communications system, near-real-time operational data from a cellular network service provider, and the deployment strategy is further based on the operational data.

8. A method of creating a custom deployment strategy for one or more unmanned aerial vehicles (UAVs) to form an ad-hoc network, the method comprising:

receiving, at a drone communications system, a first dataset including an environmental disaster forecast;

predicting, at the drone communications system and based on the first dataset, there is a high likelihood of an impending disaster event impacting the first region that will cause a network outage;

receiving, at the drone communications system, near-real-time operational data from a cellular network service provider for one or more cell towers in the first region;

receiving, at the drone communications system, inventory data from a UAV repository; and creating, based on the operational data and the inventory data, a deployment strategy that identifies a configuration of the UAVs currently available in the UAV repository that can provide emergency communication services to either the greatest number of devices located in the first region or the largest area in the first region.

9. The method of claim 8, further comprising generating, by the drone communications system and based on the operational data, a graphical heat map characterizing wireless network traffic for the first region, wherein the deployment strategy is based on the graphical heat map.

10. The method of claim 8, wherein the configuration describes an arrangement of the UAVs to form either an ad-hoc mesh network or an ad-hoc messenger network.

11. The method of claim 10, further comprising determining, at the drone communications system, that the inventory data indicates there is a sufficient number of UAVs available to form an ad-hoc mesh network in the first region, and the deployment strategy implements an ad-hoc mesh network.

12. The method of claim 10, further comprising determining, at the drone communications system, that the inventory data indicates there is an insufficient number of UAVs available to form an ad-hoc mesh network in the first region, and the deployment strategy implements an ad-hoc messenger network.

13. The method of claim 8, further comprising generating, by the drone communications system and in response to the prediction, instructions to conduct a network activity survey of the first region.

14. A system for creating a custom deployment strategy for one or more unmanned aerial vehicles (UAVs) to form an ad-hoc network, the system comprising a processor and machine-readable media including instructions which, when executed by the processor, cause the processor to:

generate, by a drone communications system and in response to a prediction that a network outage will occur in a first region, instructions to conduct a network activity survey of the first region;

deploy, via a UAV repository and in response to the instructions, a first UAV to perform a first flyover of the first region, the first UAV including onboard sensors that collect a first dataset describing one or more of cell tower locations, wireless access points, and wireless network usage patterns in the first region;

receive, at the drone communications system, the first dataset;

receive, at the drone communications system, inventory data from the UAV repository; and create, based on the first dataset and the inventory data, a deployment strategy that identifies a configuration of the UAVs currently available in the UAV repository that can provide emergency communication services to either the greatest number of devices located in the first region or the largest area in the first region.

15. The system of claim 14, wherein the instructions further cause the processor to:

receive, at the drone communications system, a second dataset including an environmental disaster forecast; and predict, at the drone communications system and based on the second dataset, there is a high likelihood of an impending disaster event impacting the first region that will cause the network outage.

16. The system of claim 14, wherein the instructions further cause the processor to generate, by the drone communications system and based on the second dataset, a graphical heat map characterizing wireless network traffic for the first region, wherein the deployment strategy is based on the graphical heat map.

17. The system of claim 14, wherein the configuration describes an arrangement of the UAVs to form either an ad-hoc mesh network or an ad-hoc messenger network.

18. The system of claim 17, wherein the instructions further cause the processor to determine, at the drone communications system, that the inventory data indicates there is a sufficient number of UAVs available to form an ad-hoc mesh network in the first region, and the deployment strategy implements an ad-hoc mesh network.

19. The system of claim 17, wherein the instructions further cause the processor to determine, at the drone communications system, that the inventory data indicates there is an insufficient number of UAVs available to form an ad-hoc mesh network in the first region, and the deployment strategy implements an ad-hoc messenger network.

20. The system of claim 14, wherein the instructions further cause the processor to receive, at the drone communications system, near-real-time operational data from a cellular network service provider, and the deployment strategy is further based on the operational data.

* * * * *